United States Patent [19]

Ikedo et al.

[11] Patent Number: 5,504,729
[45] Date of Patent: Apr. 2, 1996

[54] MULTI-TRAY DISK PLAYER WITH SELECTIVE TRAY LATCHING

[75] Inventors: Yuji Ikedo; Isami Kenmotsu; Masakazu Yamashita; Shogo Sato; Tomohiro Mizuno, all of Tokorozawa, Japan

[73] Assignee: Pioneer Electronic Corporation, Tokyo, Japan

[21] Appl. No.: 973,954

[22] Filed: Nov. 9, 1992

[30] Foreign Application Priority Data

| Nov. 13, 1991 | [JP] | Japan | 3-297499 |
| Nov. 13, 1991 | [JP] | Japan | 3-297500 |
| Nov. 13, 1991 | [JP] | Japan | 3-297501 |

[51] Int. Cl.$^6$ ............................ G11B 17/04; G11B 25/04
[52] U.S. Cl. ........................... 369/75.1; 360/99.07
[58] Field of Search .............................. 369/75.1, 75.2, 369/77.1, 36, 39, 34, 35, 178, 258, 261, 292, 197, 265; 360/99.02, 99.07

[56] References Cited

FOREIGN PATENT DOCUMENTS

| 0261384 | 3/1988 | European Pat. Off. . | |
| 0380238 | 8/1990 | European Pat. Off. . | |
| 60-18855 | 1/1985 | Japan | 369/75.1 |
| 61-248262 | 11/1986 | Japan | 369/75.2 |
| 62-28966 | 2/1987 | Japan | 369/258 |
| 63-53746 | 3/1988 | Japan . | |
| 63-53747 | 3/1988 | Japan . | |
| 63-266683 | 11/1988 | Japan | 369/258 |
| 1-184753 | 7/1989 | Japan . | |
| 1-178163 | 7/1989 | Japan | 369/258 |
| 3-290862 | 12/1991 | Japan | 369/75.1 |
| 4-44662 | 2/1992 | Japan | 369/258 |

OTHER PUBLICATIONS

Patent Abstracts of Japan, Publication No. JP1184753, Jul. 24, 1989, one page, Title: "Disk Loading Device".

*Primary Examiner*—Stuart S. Levy
*Assistant Examiner*—Kevin M. Watkins
*Attorney, Agent, or Firm*—Perman & Green

[57] ABSTRACT

A compatible disc player includes a first tray for carrying an LD arranged to protrude and withdraw from and into a player housing and a second tray for carrying a CD mounted on the first tray, in such a manner as to be movable in directions of the movement of the first tray, and the first and second trays are latched or released to and from each other by use of a latch mechanism in response to a selected one of an LD playing mode and a CD playing mode. The disc player is provided with a single position signal generating switch for sensing positions of the trays, for example, a position in which the trays are completely protruded, and the timing of operation of the switch is changed depending on whether the first tray is moved or the second tray only is moved. Further, the operation of the latch mechanism is controlled by an engagement of a pickup of the player with the latch mechanism.

3 Claims, 43 Drawing Sheets

MULTI-TRAY DISK PLAYER WITH SELECTIVE TRAY LATCHING

BACKGROUND OF THE INVENTION

1. Field of the Invention

The present invention relates to a compatible disc player designed for playing recording discs of different types.

2. Description of Background Information

The so-called compatible disc player is already known, such disc players are designed to be capable of playing several types of discs produced according to different standards, with different disc diameters, for instance. Examples of such discs are Laser Disc (hereinafter, abbreviated as LD) and Compact Disc (hereinafter, abbreviated as CD).

One such conventional disc player, disclosed in Japanese Patent Application Laid Open No. 63-53746, is shown in FIG. 1.

As illustrated in FIG. 1, the conventional player has a tray 201 on which are provided three concentrically arranged circular concave portions 201a through 201c respectively for accommodating therein each of the above-mentioned discs of different sizes. The disc, when mounted on the tray 201, is transported by the protruding or withdrawing movement of the tray with respect to a housing 202 of the player.

With compatible disc players having the above-described structure, if the manner of use of the player by the user is such that the CDs are frequently played as the player's usual playing media and the LDs are played occasionally, then the protruding and withdrawing movements of the tray 201 having a larger size than CDs, which movements occur each time a CD is played, appear to be clumsy and give an impression that the scale of the disc transportation part is excessive.

For eliminating the drawback of the compatible player shown in FIG. 1, a compatible player disclosed, for example, in Japanese Patent Application No. 63-53747 and depicted in FIGS. 2 and 3 of the present application was proposed. As shown in FIGS. 2 and 3, this compatible player is provided with a first tray 211, on which are provided two concentrically arranged circular concave portions 211a and 211b capable of accommodating therein the LDs having diameters of 30 cm and 20 cm (not shown) respectively, for transporting the discs carried thereon. The player is also provided with a second tray 202, on which is provided a circular concave portion 212a capable of accommodating therein the CD having a diameter of 12 cm (not shown), for transporting the CD carried thereon. The first and second trays 211 and 212 are arranged in parallel relation with each other, and the transportation of the disc to be played is performed by the protruding and withdrawing movement of respective one of trays 211 and 212 with respect to a housing 213 of the player. In this structure of compatible player, the second tray 212 is further provided with a semicircular concave portion 212b designed for receiving a part of the LD having the maximum diameter (about 30 cm) when the disc is mounted on the first tray 211. The second tray 212 is protruded and withdrawn together with the first tray 211 when the LD is transported. When, on the other hand, the CD is transported, only the second tray 212 is protruded and withdrawn with respect to the housing 213.

As explained above, with the conventional compatible player shown in FIGS. 2 and 3, the drawback of the conventional compatible player shown in FIG. 1 has been relieved since protrusion and withdrawal of only the relatively small-sized second tray 212 are performed when the CD is played.

In the case of the conventional compatible player shown in FIGS. 2 and 3, two driving force apply devices are provided for respectively driving each of the couple of trays 211 and 212. The driving force apply devices include, for example, a toothed rack portion formed on each of the trays 211 and 212 in the direction extending along the direction of the movement of the trays, and a pinion gear meshed with each of the toothed rack portions. Since the first and second trays 211 and 212 are arranged in parallel with each other, the position of the circular concave portions 211a and 211b for supporting an LD and the position of the circular concave portion 212a for holding a CD are spaced apart by a relatively long distance. As a result of this configuration, it was not possible to provide only a single spindle motor and only a single pickup for playing all types of discs, so that a pair of spindle motors and a pair of pickups are employed respectively for playing the LDs and for playing the CDs. Thus, along with the necessity of the above-described provision of the two driving force apply devices, the provision of the two spindle motors and the two pickups has been causing the structure of the compatible player to become complicated, and also causing increase in cost.

OBJECT AND SUMMARY OF THE INVENTION

The present invention has been made in view of the aforenoted drawbacks of the conventional compatible disk players, and an object of the present invention is to provide a compatible disc player, in which the manner of disc transportation is optimized for both of a first type disc of a larger diameter and for a second type disc of a smaller diameter, capable of performing an overall disc transportation operation that gives an impression of a smart operation, and of which a cost reduction is achieved by employment of a simple internal structure.

According to a first aspect of the present invention, a compatible disc player includes a disc transporting mechanism for transporting a first disc of a larger diameter or a second disc of a smaller diameter to be played, between a playing position and a loading-unloading position respectively inside and outside a player housing; and command means for commanding, in response to a manual operation, setting and canceling respectively of playing modes for the first and second discs, wherein the disc transporting mechanism comprises a first tray, capable of protruding and withdrawing from and into the player housing and capable of carrying the first disc, a second tray mounted at a center position of the first tray, in such a manner as to be movable in directions of the movement of the first tray, capable of protruding from the player housing independently of the first tray, and capable of carrying the second disc, and a latch mechanism for latching the first and second trays with each other and for releasing the first and second trays from each other, a drive means for driving the second tray, and a position sensing means for sensing the position of the first and second trays, wherein the position sensing means comprises a tray position signal generating switch, an operating element for turning on and off the tray position signal generating switch, and a transmission mechanism for transmitting movements of the first and second trays to the operating element, the transmission mechanism being constructed to differentiate a timing of transmission of movement of the second tray when the second tray only is moved, from a timing of transmission of movement of the first tray.

According to another aspect of the invention, a compatible disc player includes a disc transporting mechanism for transporting a first disc of a larger diameter or a second disc of a smaller diameter to be played by a playing means including a pickup, between a playing position and a loading-unloading position respectively inside and outside a player housing; and command means for commanding, in response to a manual operation, setting and canceling respectively of playing modes for the first and second discs, wherein the disc transporting mechanism comprises a first tray, capable of protruding and withdrawing from and into the player housing and capable of carrying the first disc, a second tray mounted at a center position of the first tray, in such a manner as to be movable in directions of the movement of the first tray, capable of protruding from the player housing independently of the first tray, and capable of carrying the second disc, and a latch mechanism for latching the first and second trays with each other and for releasing the first and second trays from each other, drive means for driving the second tray, wherein the disc player further comprises a pickup position control means for positioning the pickup at one of play start positions of the first and second discs and for holding the pickup to stand by at the play start position, and wherein the latch mechanism is restricted its operation by an engagement between the pickup and the latch mechanism.

According to a further aspect of the present invention, a compatible disc player includes a disc transporting mechanism for transporting a first disc of a larger diameter or a second disc of a smaller diameter to be played, between a playing position and a loading-unloading position respectively inside and outside a player housing; and command means for commanding, in response to a manual operation, setting and canceling respectively of playing modes for the first and second discs, wherein the disc transporting mechanism comprises a first tray, capable of protruding and withdrawing from and into the player housing and capable of carrying the first disc, a second tray mounted at a center position of the first tray, in such a manner as to be movable in directions of the movement of the first tray, capable of protruding from the player housing independently of the first tray, and capable of carrying the second disc, and a latch mechanism for latching the first and second trays with each other and for releasing the first and second trays from each other, and drive means for driving the second tray, the compatible player further comprising control means for causing the latch mechanism to perform latching and releasing operations in response to a setting command and a releasing command by the commanding means.

DETAILED DESCRIPTION OF PREFERRED EMBODIMENTS

Embodiments of the compatible disc player according to the present invention will be described in detail hereinafter with reference to the accompanying drawings.

Figure 1:
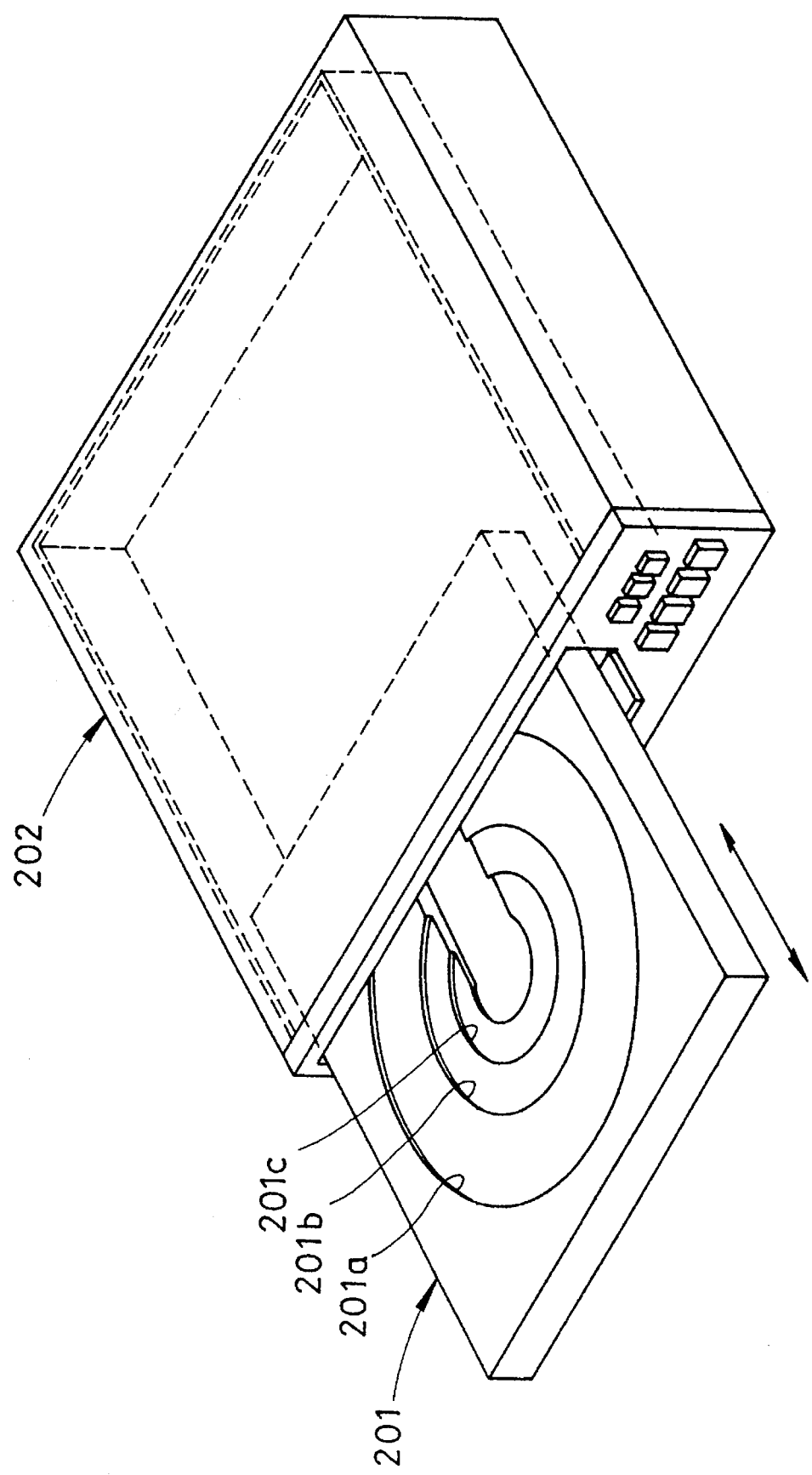
FIG. 1 is an oblique external view of a conventional compatible player.
Figure 2:
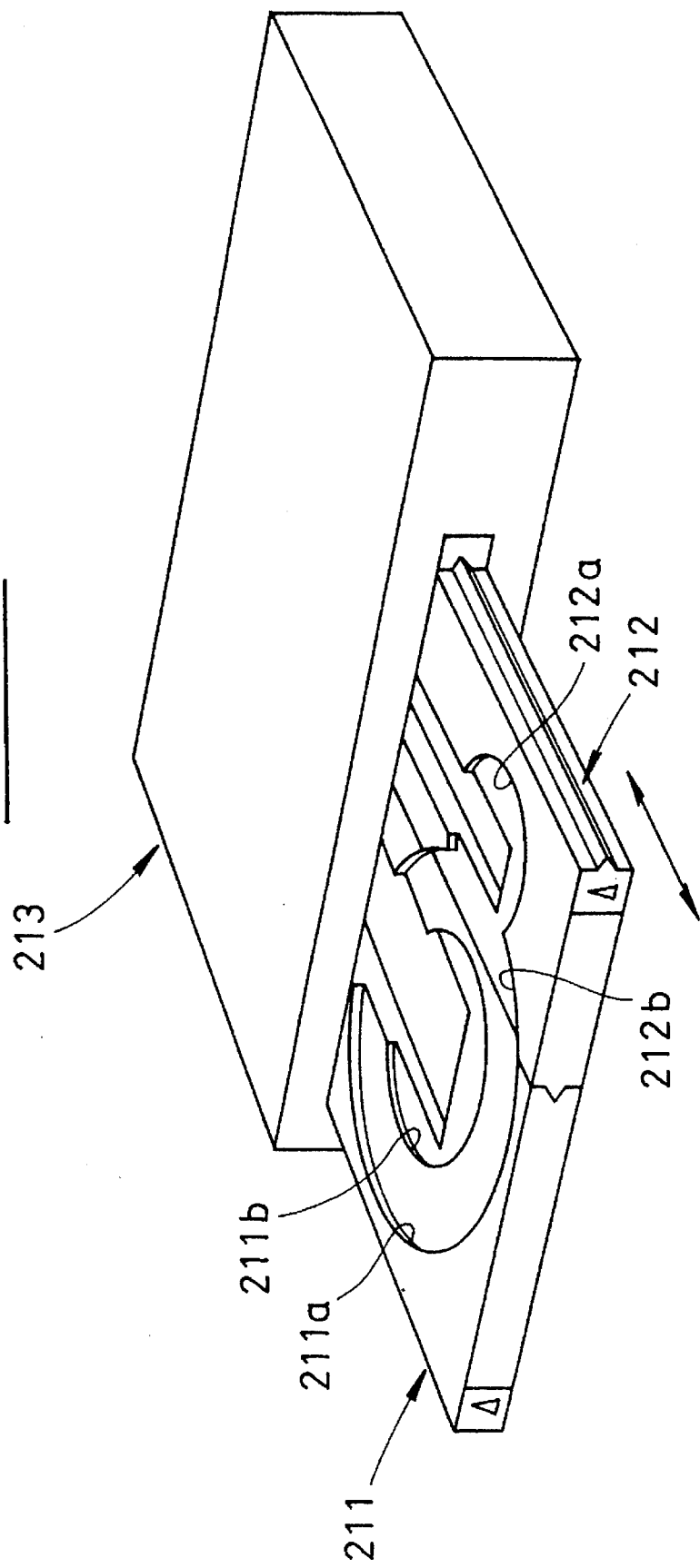
FIG. 2 is an oblique external view of another conventional compatible player.
Figure 3:
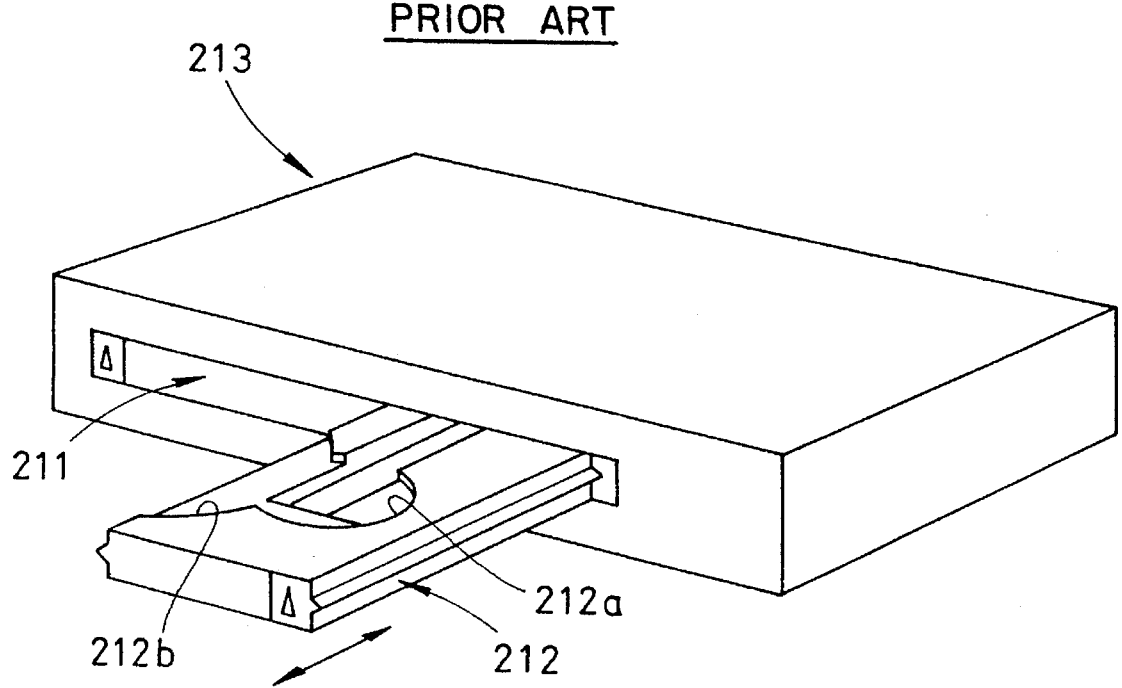
FIG. 3 is an oblique external view of the compatible player shown in FIG. 2, showing a different state of operation.
Figure 4:
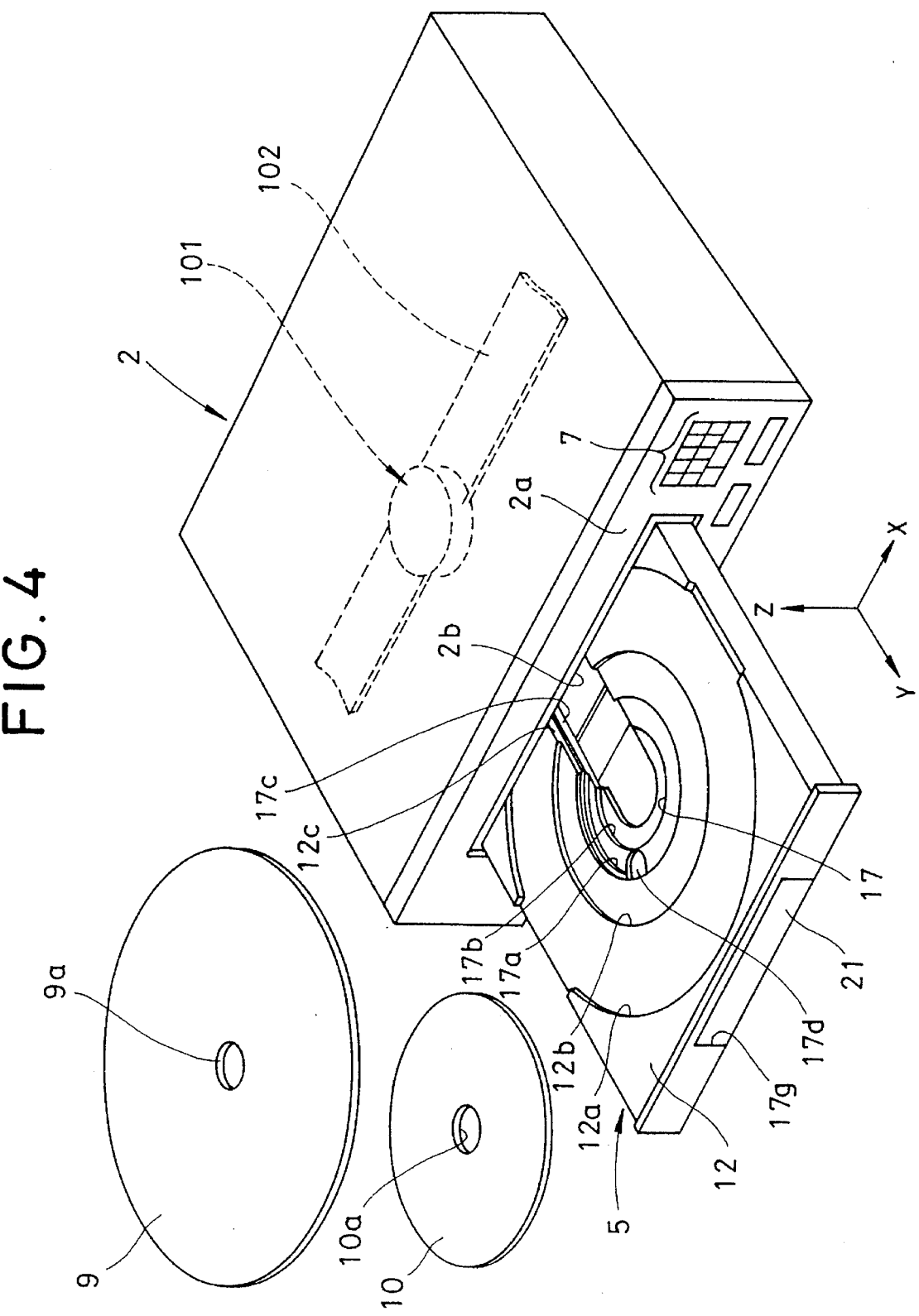
FIG. 4 is an oblique external view of an embodiment of a compatible player according to the present invention, showing a state that a first tray for transporting an LD is protruded together with a second tray for transporting a CD, in which LDs to be transported are also illustrated.
Figure 5:
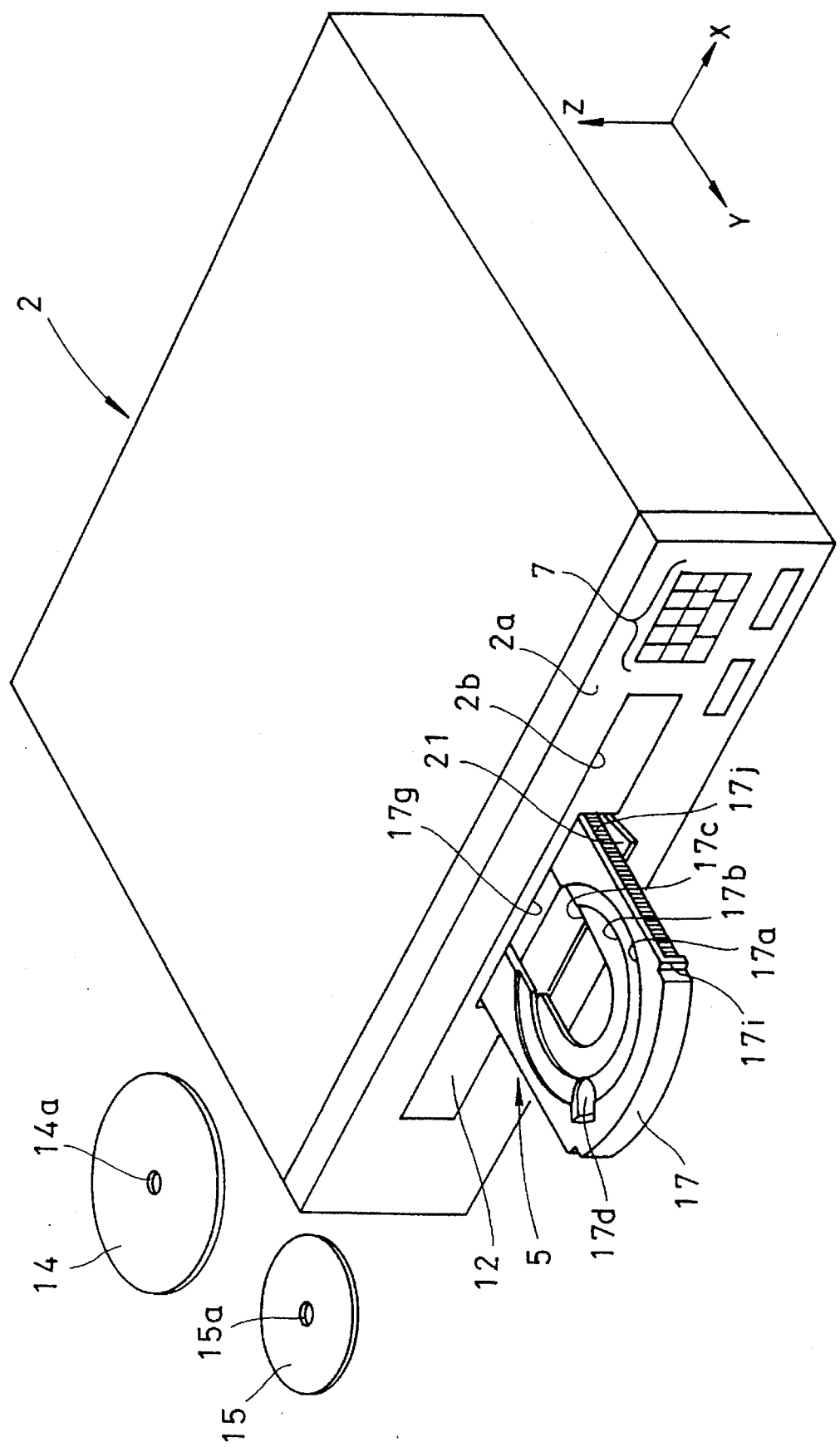
FIG. 5 is an oblique external view of the embodiment shown in FIG. 4, showing a state that only the second tray for transporting a CD is protruded, in which CDs to be transported are also shown.

As shown in FIGS. 4 and 5, the first embodiment of the compatible disc player according to the present invention has a player housing 2 whose front panel 2a is provided with a rectangular opening 2b laterally extending between the right-hand and left-hand ends of the front panel 2a. A disc carrying part 5 is provided such that its protrusion and withdrawal from and into the player housing 2 is performed through the opening 2b. On the front panel 2a, a control section 7 for allowing various operations of the compatible disc player is also provided. In FIGS. 4 and 5, right-hand direction of the lateral directions in the above-description corresponds to the direction by arrow X. Similarly, the frontward direction is indicated by arrow Y, and the upward direction is indicated by arrow Z.

A disc transporting mechanism, including the above-described disc carrying part 5, for transporting various discs to be played between the playing position and loading-unloading position within and outside the player housing will now be described.

The structure of the disc carrying part 5 will be explained first.

As illustrated in FIGS. 4 through 12, the disc carrying part 5 includes a first tray 12 having a general square and planar shape, capable of carrying, as the first disc, an LD 9 having a diameter of about 30 cm and an LD having a diameter of about 20 cm, and capable of protruding through the opening 2b of the player housing 2. The disc carrying part 5 also includes a second tray 17 having a general rectangular planar shape, capable of carrying, as the second disc, a CD 14 having a diameter of about 12 cm and a CD having a diameter of about 8 cm, mounted at a center portion of the first tray 12 in such a manner as to be movable along directions of the movement of the first tray 12, and capable of independently protruding outside the player housing 2. The first and second trays 12 and 17 are made of a resin, for example. More specifically, the first tray 12 is guided by a guide member (not shown in the figure) mounted on a base member (to be described later) in the player housing 2, in such a manner as to be linearly movable back and forth along the direction of arrow Y or a direction opposite to arrow Y. Two circular concave portions 12a and 12b respectively capable of accommodating the LD 9 and LD 10 are formed concentrically and stepwise in a main surface of the first tray 12. In the rear part of the first tray 12, an elongated aperture 12c extending along the frontward and backward directions (the direction of arrow Y and the direction opposite to arrow Y) is formed to allow an access to the LD on the first tray 12, of a playing means including a turn table and an optical pickup which will be explained later.

The second tray 17, on the other hand, is slidably fitted to the under face of the first tray 12, and a couple of circular concave portions 17a and 17b capable of accommodating the CDs 14 and 15 are formed concentrically and stepwise, in an upper side of a front end part thereof. An elongated aperture 17c, capable of facing the elongated aperture 12c of the first tray 12, is provided in the second tray 17 for allowing an access to the CD on the second tray 17 of the above-mentioned playing means. Furthermore, in the upper face of the second tray 17, a recess 17d for allowing an access to the CD accommodated in the concave portion 17a or 17b from beneath, by the thumb of an operator for example, is provided near the outer peripheral portions of the circular concave portions 17a and 17b.

Figure 6:
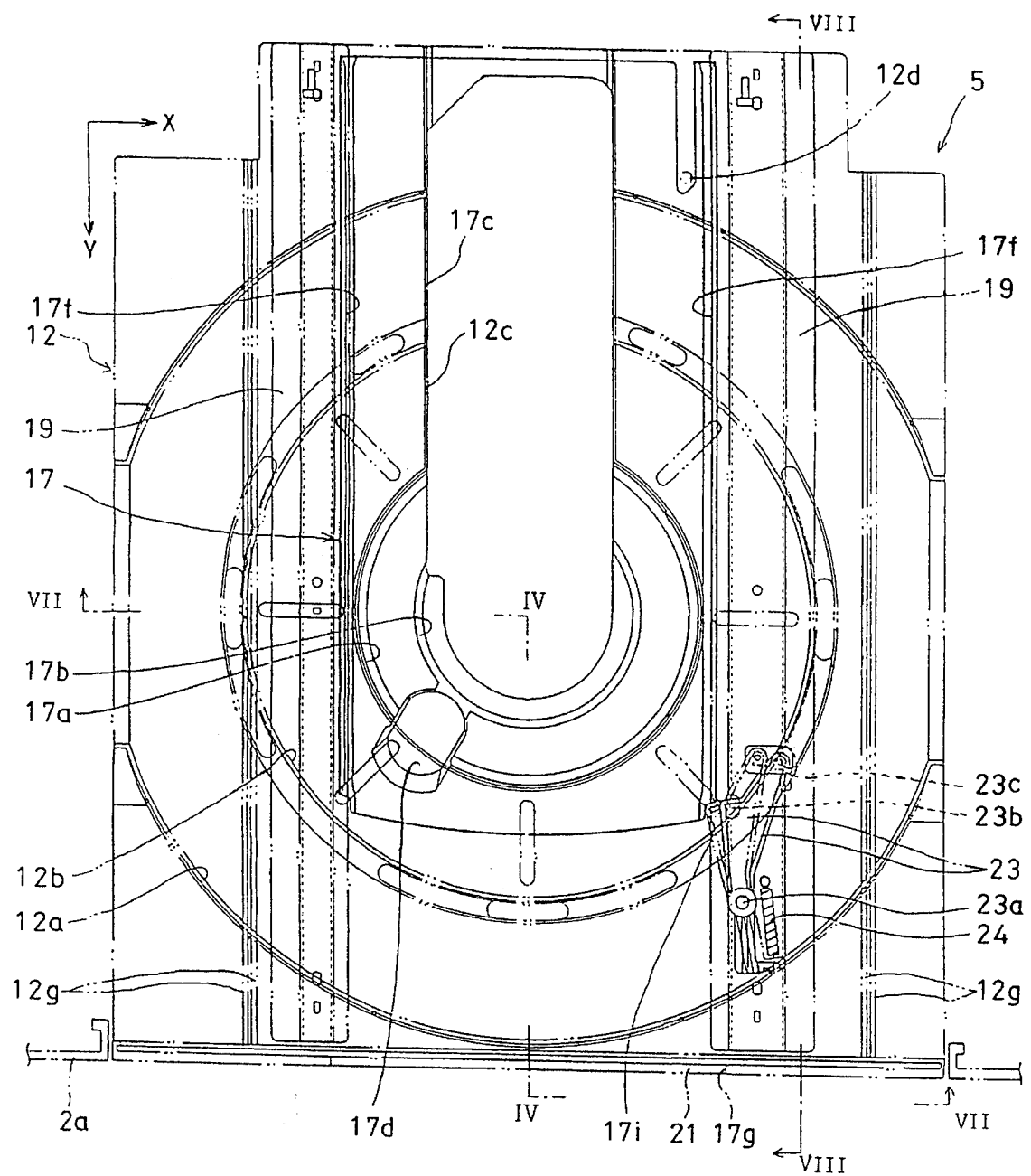
FIG. 6 is a plan view showing a disc carrying part which comprises the first and second trays shown in FIG. 4, and a part of a player housing.
Figure 7:
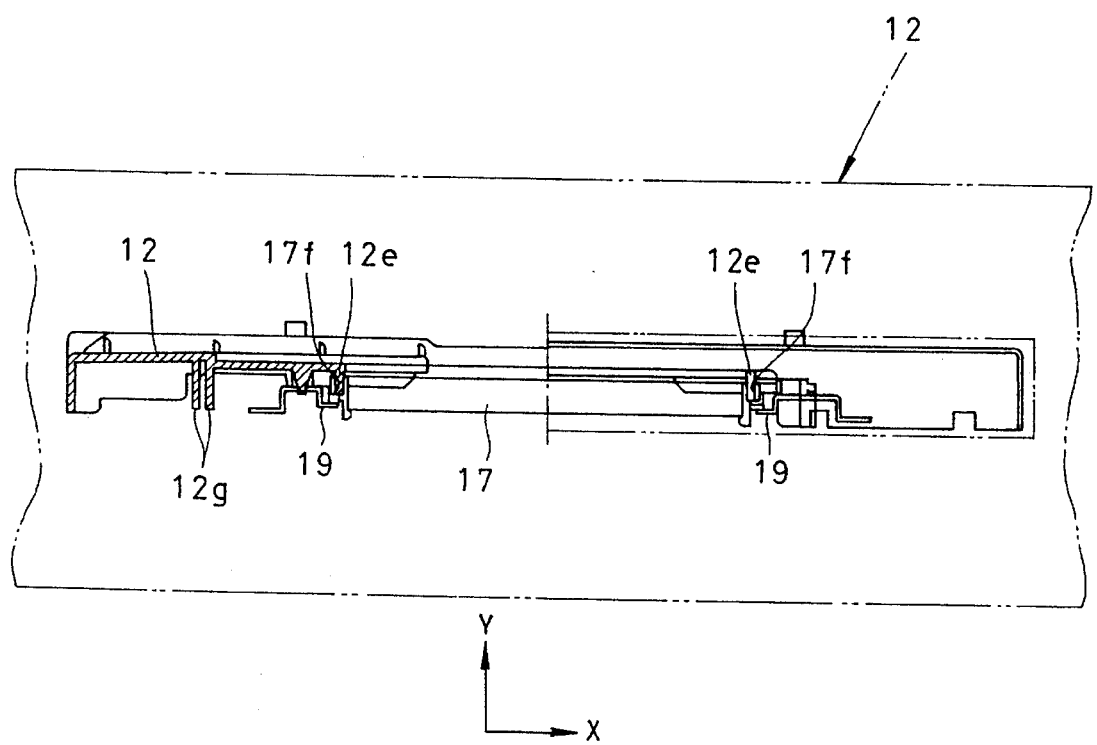
FIG. 7 is a partly cross-sectional view along the stepped line VII—VII in FIG. 6.
Figure 9:
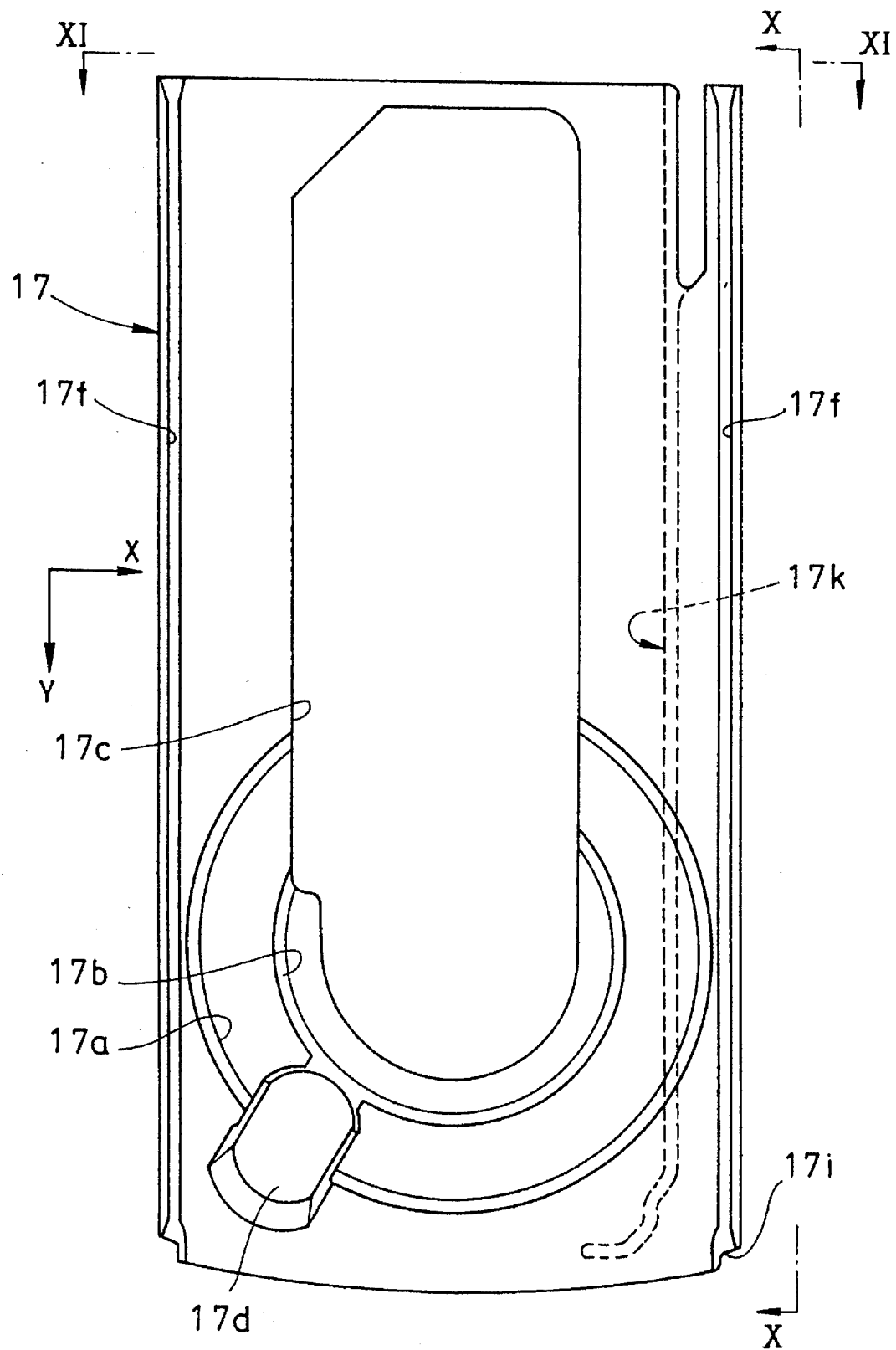
FIG. 9 is a plan view of the second tray shown in FIGS. 4 and 5.
Figure 10:
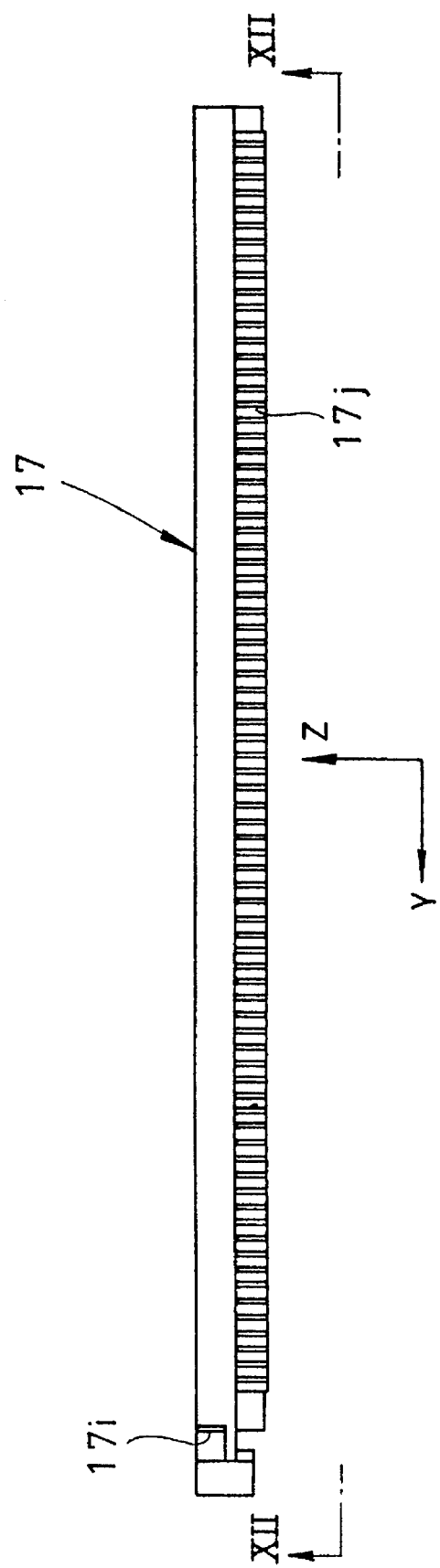
FIG. 10 is a view from the position indicated by the line X—X in FIG. 9.

Referring to FIGS. 6, 9 and 10, there are provided, in the left and right ends of the upper face of the second tray 17, a pair of guide grooves 17f extending along the front and backward directions (the direction of arrow Y and the direction opposite to arrow Y) along which the second tray 17 is moved. As shown in FIG. 7, a pair of guide protrusions 12e extending in the frontward and backward directions are provided symmetrically on the under face of the first tray 12. The second tray 17 is guided for movement in the frontward and backward directions by the engagement between the guide projections 12e and corresponding guide grooves 17f. Furthermore, as shown in FIGS. 6 and 7, a pair of metal stop plates 19 are fixed to the under face of the first tray 12 by using screws so as to support the second tray 17 from underneath and preventing the guide projections 12e from coming off the guide grooves 17f.

As described above, the second tray 17 is fitted to the under face of the first tray 12 so as to be movable in the frontward and backward directions. As shown in FIGS. 4 through 6, a rectangular opening 17g extending in the left and right directions is formed on the front end of the first tray 12, for allowing protrusion and withdrawal of the second tray 17 with respect to the first tray 12. As is clear from these figures, a lid 21 for closing the opening 17g is hingedly connected, at its lower edge part, to the first tray 12. A resilient force in a closing direction is continuously applied to the lid 21 by means a spring member (not shown), and the lid 21 is pushed open when the front end of the second tray 17 is moved in the projecting direction and comes to abut the back of the free end of the lid 21.

Now, the latch mechanism for the mutual latching and disengagement between the above described first and second trays 12 and 17 will be explained.

Figure 8:
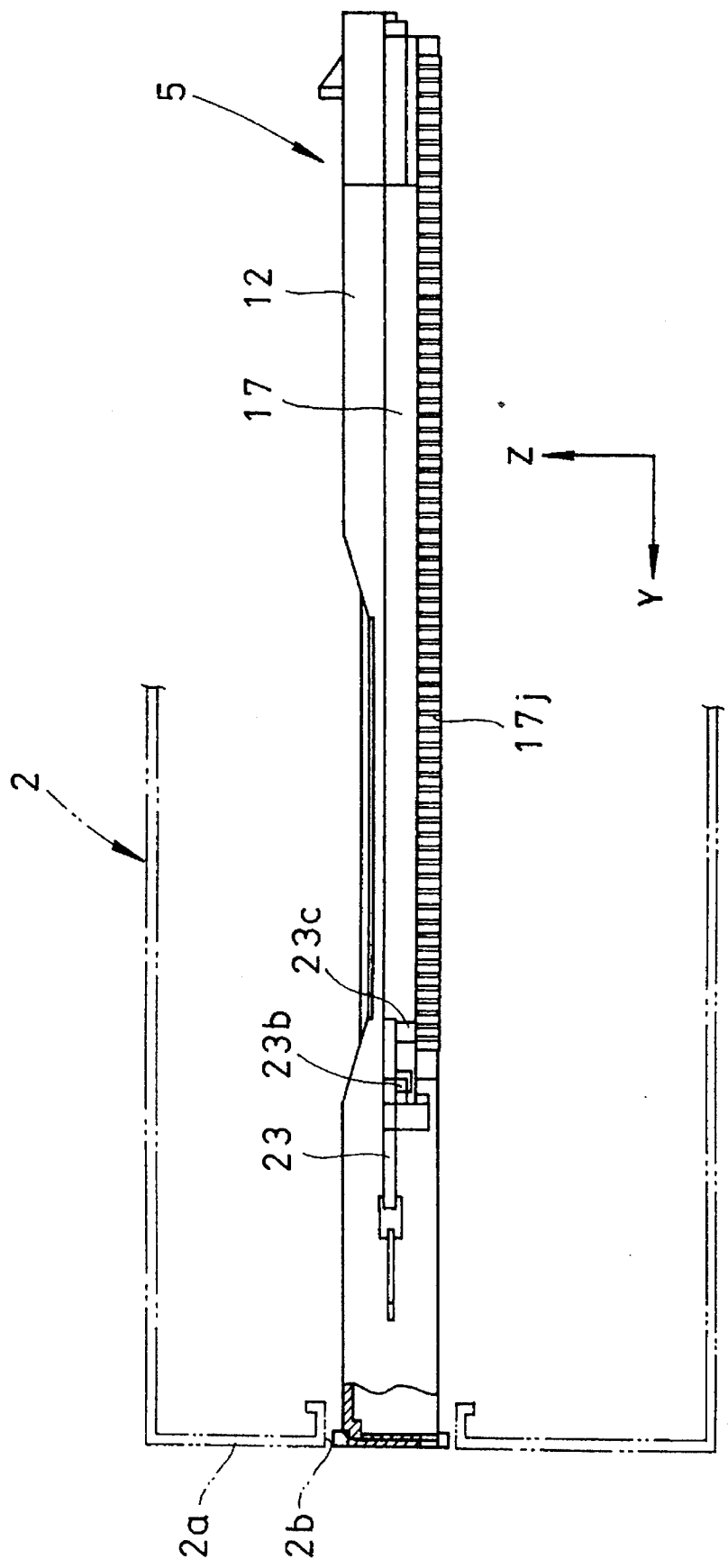
FIG. 8 is a partly cross-sectional view along the line VIII—VIII in FIG. 6.
Figure 13:
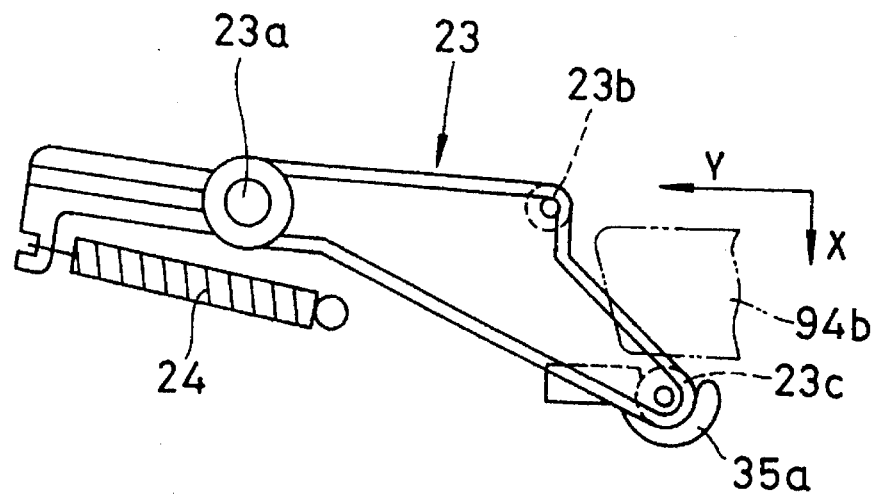
FIG. 13 is a plan view of a latch lever for mutually latching and releasing the first and second trays shown in FIG. 6.
Figure 14:
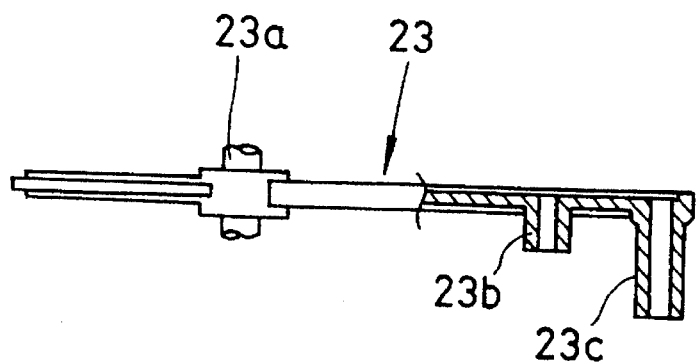
FIG. 14 is a partly cross-sectional front view of the latch lever shown in FIG. 13.
Figure 15:
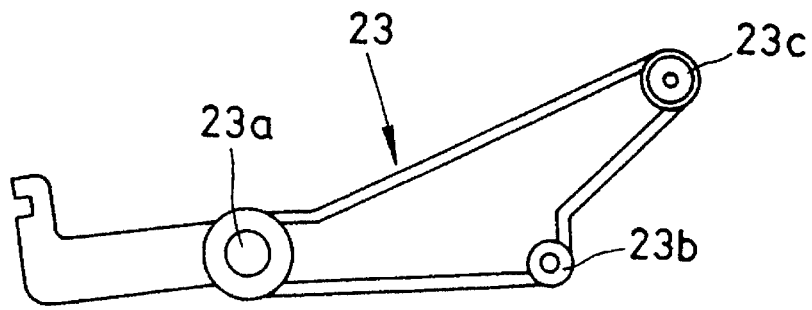
FIG. 15 is a bottom view of the latch lever shown in FIGS. 13 and 14.

As shown in FIGS. 6 and 8, in the vicinity of the left front end of the under face of the first tray 12, a latch or stop lever 23 is arranged to extend almost along the forward and backward directions. The latch lever 23 is connected, through a pivot shaft 23a, to the first tray 12 in such a manner that a swinging motion in a horizontal plane is permitted. FIGS. 13 through 15 show the details of the latch lever 23. The latch lever 23 has a pin 23b near its rear end. As shown in FIGS. 5, 6, 9, 10 and 11, the second tray 17, on the other hand, is provided with a latch recess 17i at the front right-hand end thereof, so that the pin 23b of the latch lever 23 can be latched in the latch recess. By the engagement of the pin 23b and the latch recess 17i, the second tray 17 is latched in a retained position with respect to the first tray 12. Furthermore, as shown in FIG. 6, a coil spring 24 is connected to the front end part of the latch lever 23 for applying, to the latch lever 23, a resilient force for rotating the lever 23 in the counter-clockwise direction, i.e. the direction to move the pin 23b toward the latch recess 17i.

The above-mentioned stop lever 23, the pivot shaft 23a for pivotally bearing the stop lever 23, the coil spring 24, and the latch recess 17i formed on the second tray 17 together constitute the latch mechanism for the engagement and disengagement between the first tray 12 and the second tray 17.

The structure of the driving means for driving the second tray 17 will be explained hereinafter.

Figure 11:
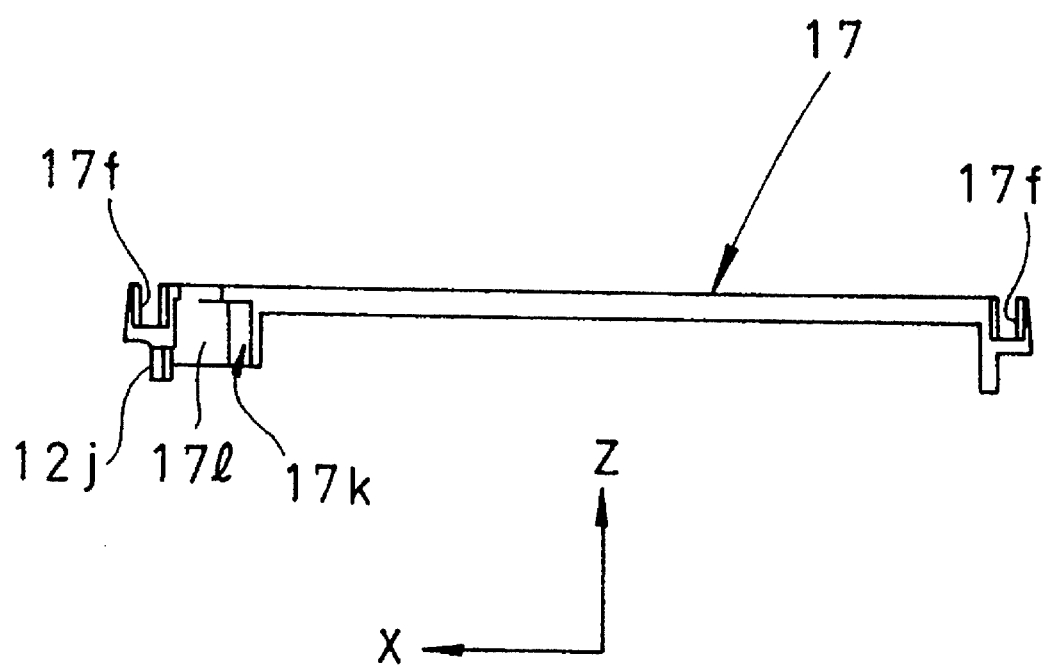
FIG. 11 is a view from the position indicated by the line XI—XI in FIG. 9.
Figure 12:
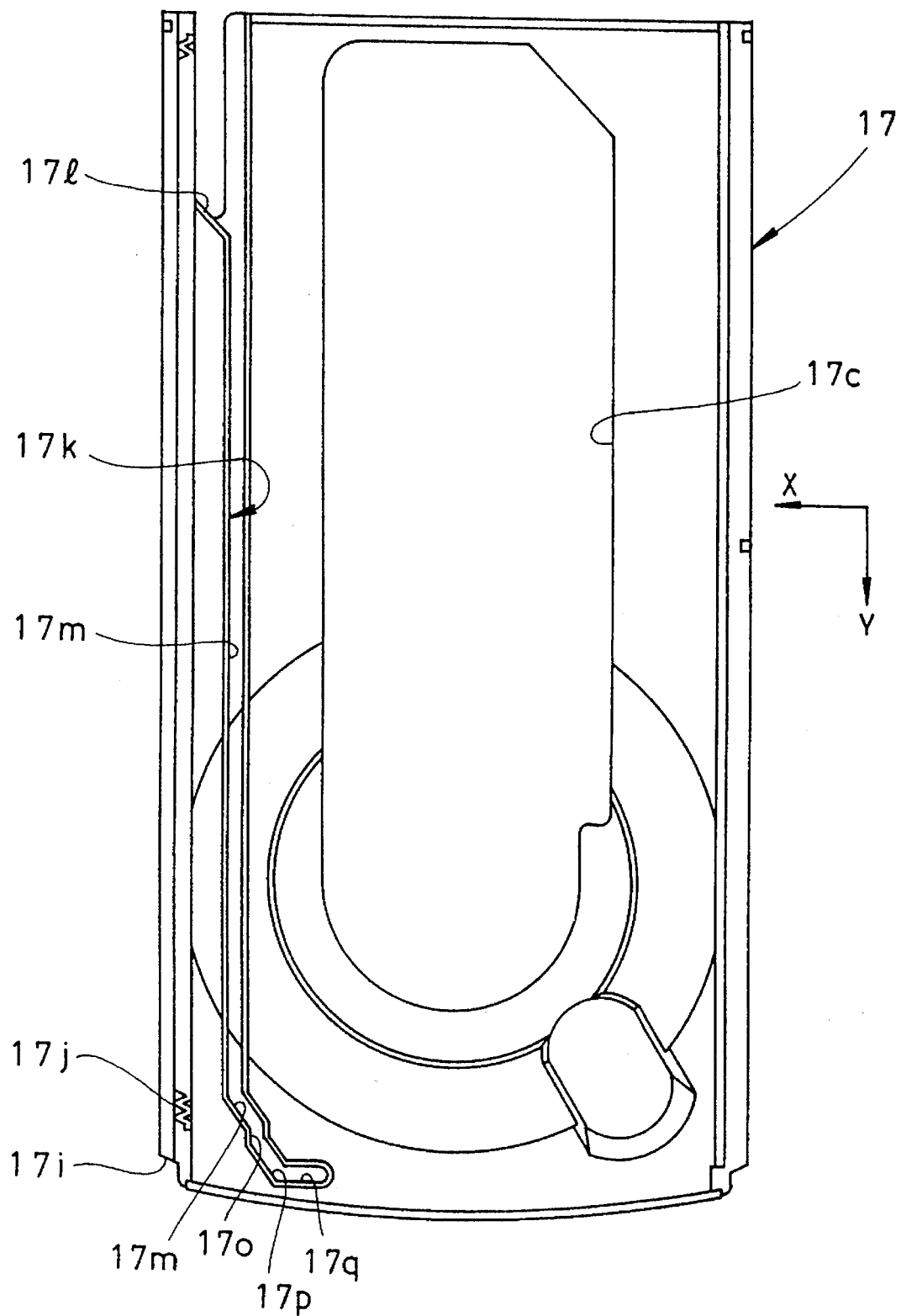
FIG. 12 is a view from the position indicated by the line XII—XII in FIG. 10.

As shown in FIGS. 5, 8, 10 through 12, a toothed rack 17j is formed on the left side face of the second tray 17, in such a manner as to extend in the directions along which the second tray is to be moved, i.e., the frontward and backward directions. Similarly, as shown in FIGS. 9, 11 and 12, a cam groove 17k generally extending in the frontward and backward directions is formed in the under face of the second tray 17, near the right-hand end thereof. As is clear from FIG. 12, the cam groove 17k is constituted by a first inclined section 17l that is located at the rear end and tilted inwards along the frontward direction (the direction of arrow Y), a long first straight section 17m that is connected to the first inclined section 17l and extends straight in the frontward direction, a second inclined section 17n that is connected to the first straight section 17m and tilted inwards along the frontward direction, a short second straight section 17o that is connected to the second inclined section 17n and extends in parallel with the first-straight section 17m, a third inclined section 17p that is connected to the second straight section 17o and tilted inwards along the frontward direction, and a third straight section 17q that is connected to the third inclined section 17p and extends straightly inwards.

Figure 16:
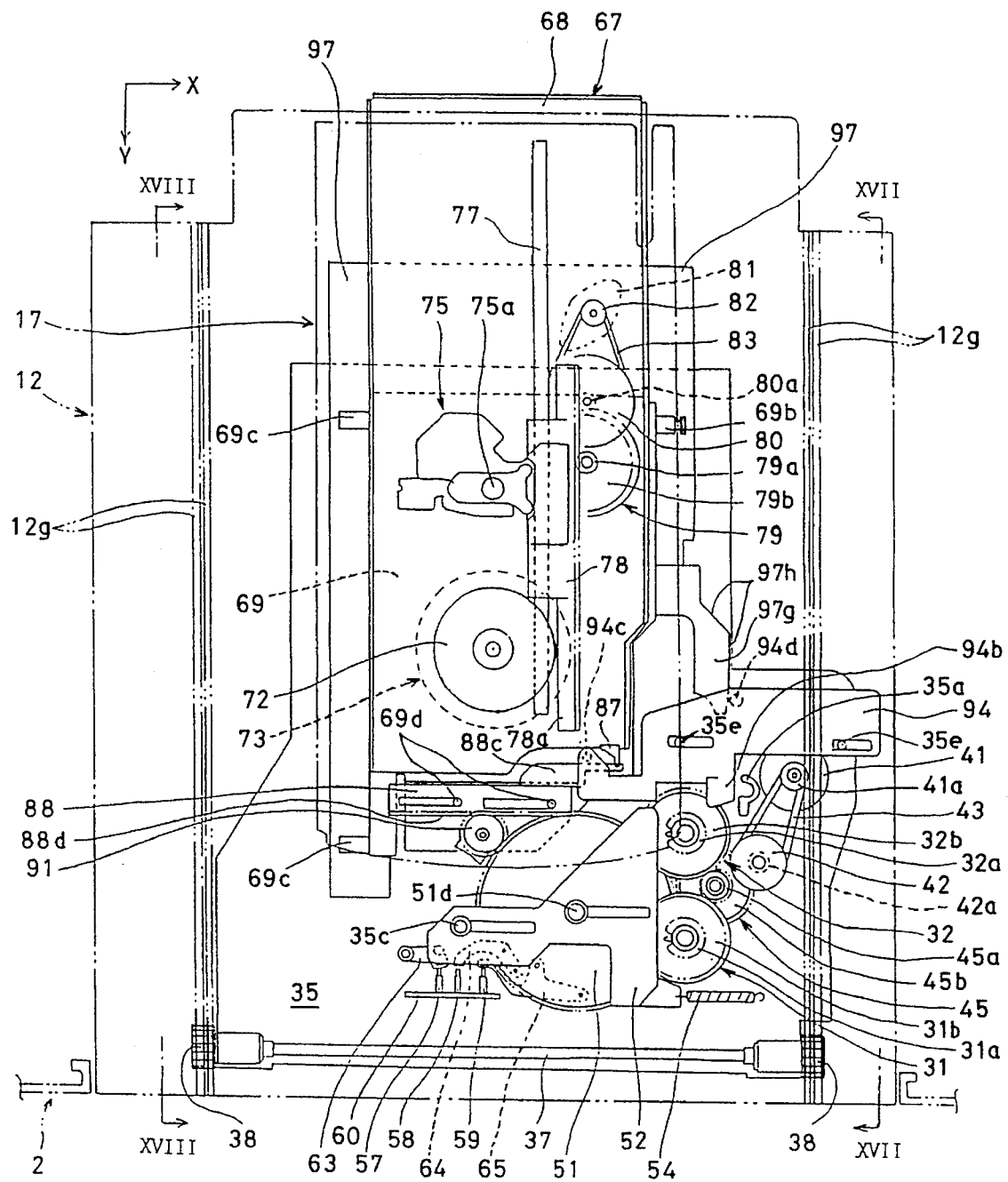
FIG. 16 is a plan view of a mechanism provided in the interior of the compatible disc player shown in FIGS. 4 and 5.
Figure 17:
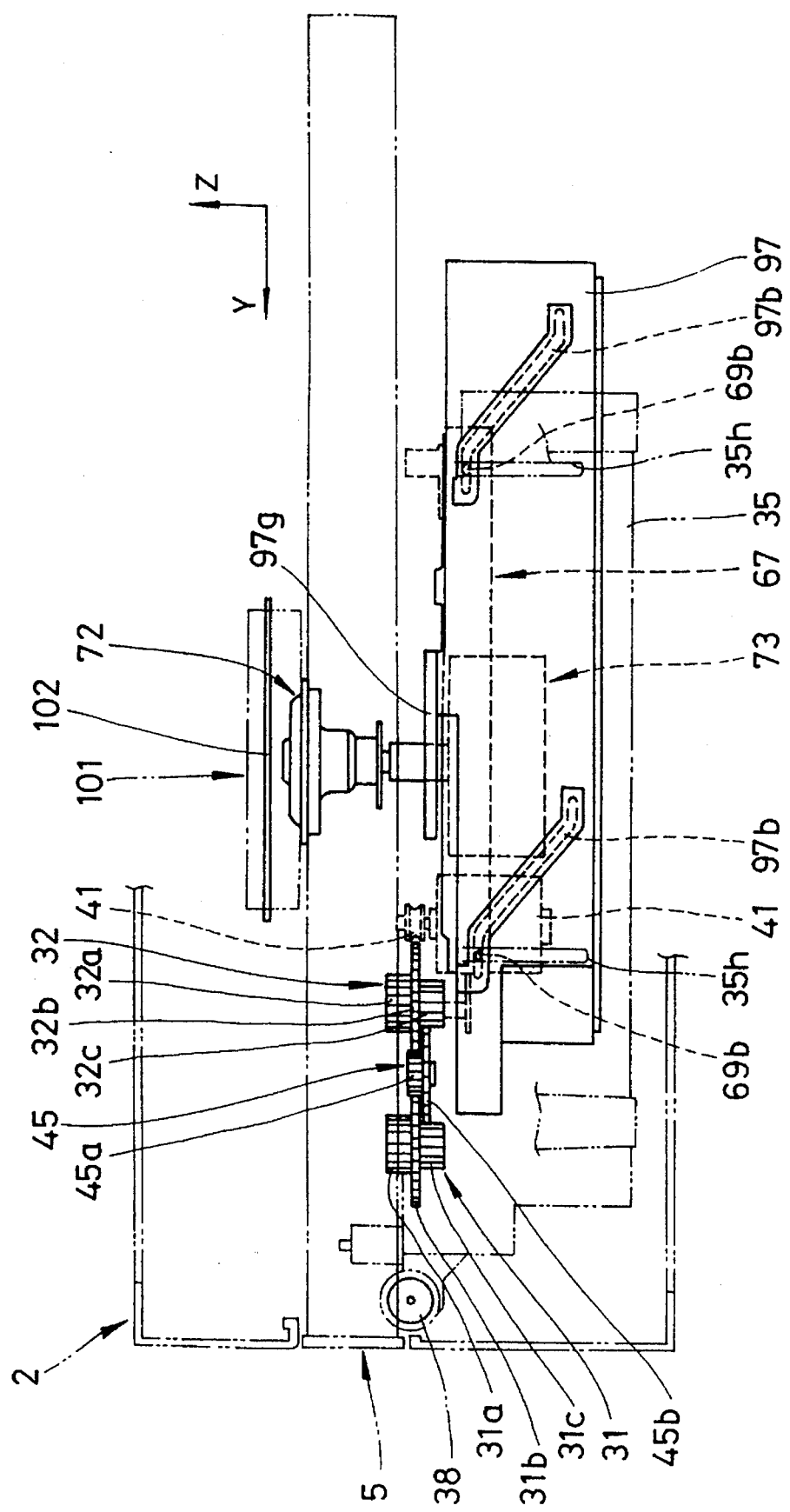
FIG. 17 is a view from the position indicated by the line XVII—XVII in FIG. 16.

On the other hand, as shown in FIGS. 16 and 17, in the player housing, a pair of gears 31 and 32 are provided in parallel along the direction of the movement of the second tray 17, so that they can be meshed with the toothed rack 17j provided on the second tray 17. Each of the gears 31 and 32 is constituted by three gear portions 31a, 31b and 31c (32a, 32b, and 32c) respectively having a small diameter, a large diameter, and a small diameter along a direction from top to bottom, in which those gear portions are formed into a single member in a concentric manner. The gears 31 and 32 are provided near the right-front end on the upper face of a base member 35 fixed in the player housing 2. The base member 35 is also illustrated in FIG. 18.

Figure 18:
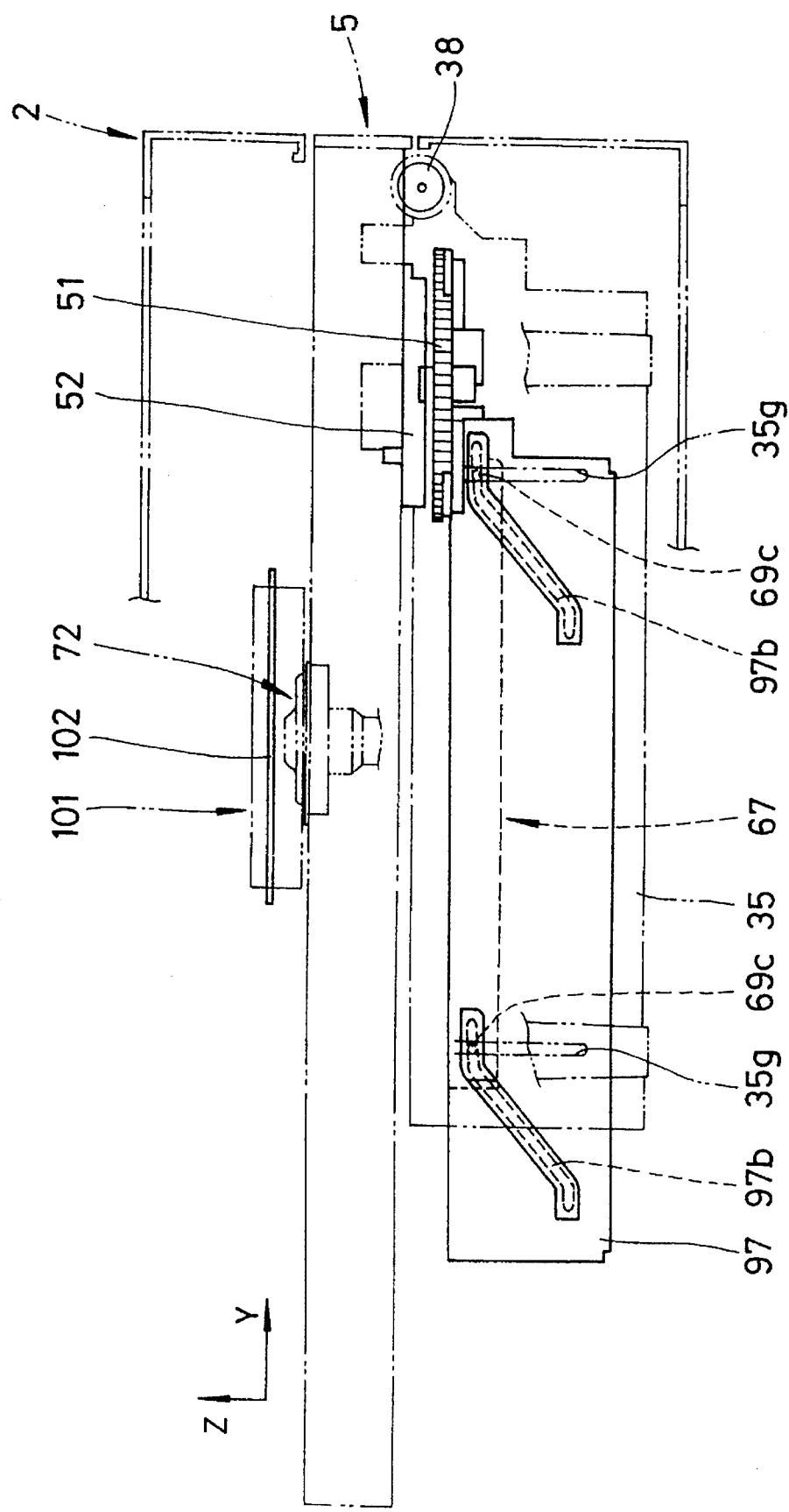
FIG. 18 is a view from the position indicated by the line XVIII—XVIII in FIG. 16.

As illustrated in FIGS. 16 through 18, at the front end of the upper face of the base member 35, a pair of timing gears 38 and 39 fixed immovably with respect to each other via a shaft 37 extending in lateral directions (the direction of arrow X and the direction opposite thereto). A pair of racks 12g (also shown in FIGS. 6 and 7) formed on both sides of the under face of the first tray 12, extending in the frontward and backward directions (the direction of arrow Y and the direction opposite to it) in which the first tray 12 is to be moved, are meshed with the timing gears 38 and 39. With this scheme, movements of the left and right sides of the first tray 12 are synchronized while the first tray 12 is moved together with the second tray 17 for protrusion or withdrawal with respect to the player housing 2. Furthermore, as shown in FIG. 16, a hooked protrusion 35a is formed on the base member 35 near the timing gears 38 and 39, on their left side.

As is clear from FIG. 13, the hooked protrusion 35a is capable of engaging with a pin 23c protruding from the rear end of the latch lever 23 (also shown in FIGS. 6 and 8) for making engagement and disengagement between the first tray 12 and the second tray 17. By this engagement between the hooked protrusion 35a and the pin 23c, the disc carrying part 5 (shown in FIGS. 4 and 5 for instance), consisting of the first tray 12 and the second tray 17, is latched in the retained position with respect to the base member 35, accordingly, with respect to the player housing 2.

A torque apply scheme for applying a driving torque to the gears 31 and 32 on the above-mentioned base member 35 will be explained hereinafter.

As shown in FIG. 16, a motor 41 is arranged on the right-hand side of the gears 31 and 32, and fixed on the base member 35. Furthermore, a large pulley 42 is provided near the gears 31 and 32, and a belt 43 is installed over the large pulley 42 and a small pulley 41a fitted on the output shaft of the motor 41. Between the gears 31 and 32, there is provided a gear 45 having a small gear section 45a and a large gear section 45b stacked axially and formed into a single member. The large gear section 45a of the gear 45 is meshed with a small gear section 42a formed continuously beneath the large pulley 42. The small gear section 45a of the gear 45 is meshed with both of the large gear sections 31a and 31b of the pair of gears 31 and 32. With this configuration, the gears 31 and 32 are driven by the motor 41 in the same direction.

The above-described motor 41, small pulley 41a, large pulley 42 with the small gear section 42a, belt 43, gear 45 together constitute torque apply means for applying driving torque to the pair of gears 31 and 32. The torque apply means and a cam gear wheel and a cam plate, which will be described hereinunder, together constitute drive means for driving the second tray 17. The driving means, first tray 12, second tray 17, latching means (described above) performing engagement and disengagement of the tray, control means to be described later together constitute a disc carrying mechanism for carrying any one of the above described types of discs between the inward position for playing the disc and the externally protruding position for loading and unloading the disc, with respect to the housing 2.

Figure 19:
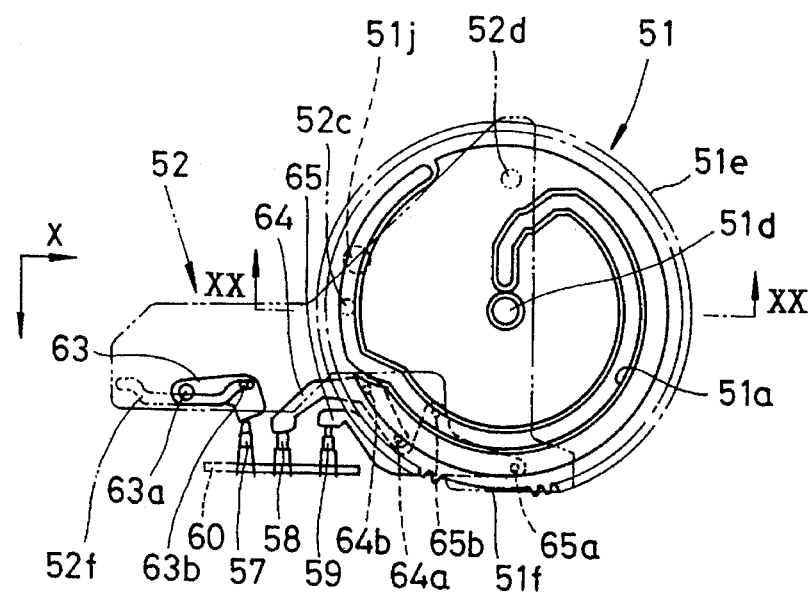
FIG. 19 is a plan view showing a cam gear wheel provided in the mechanism shown in FIG. 16, and its peripheral parts.
Figure 20:
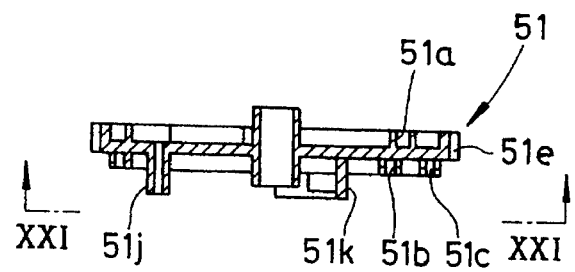
FIG. 20 is a cross-sectional view along the line XX—XX in FIG. 19.
Figure 21:
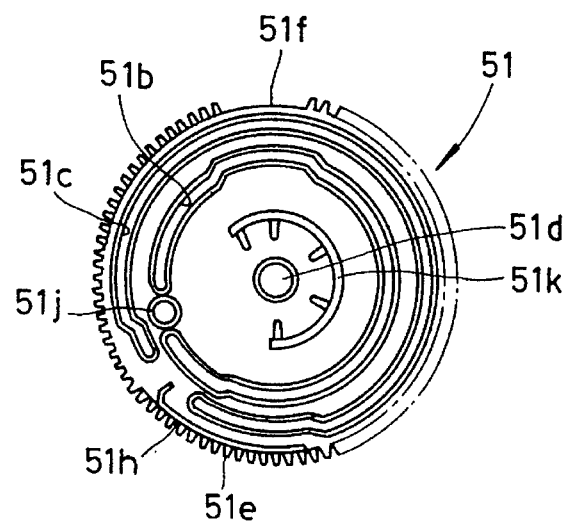
FIG. 21 is a view from the position indicated by the line XXI—XXI in FIG. 20
Figure 25:
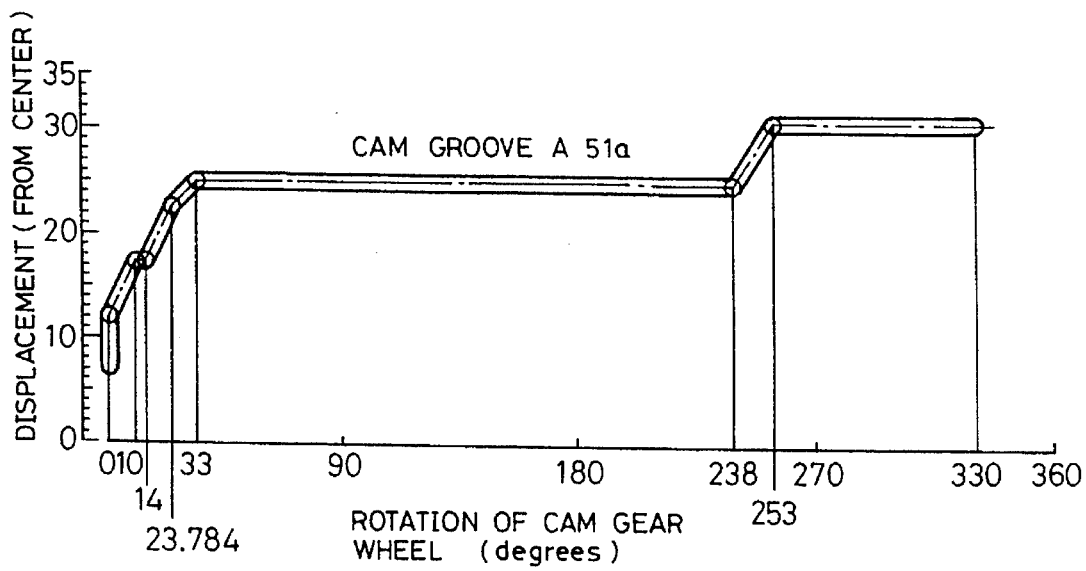
FIG. 25 is an exploded view of a cam groove A formed on the upper face of the cam gear shown in FIGS. 19 through 21.
Figure 26:
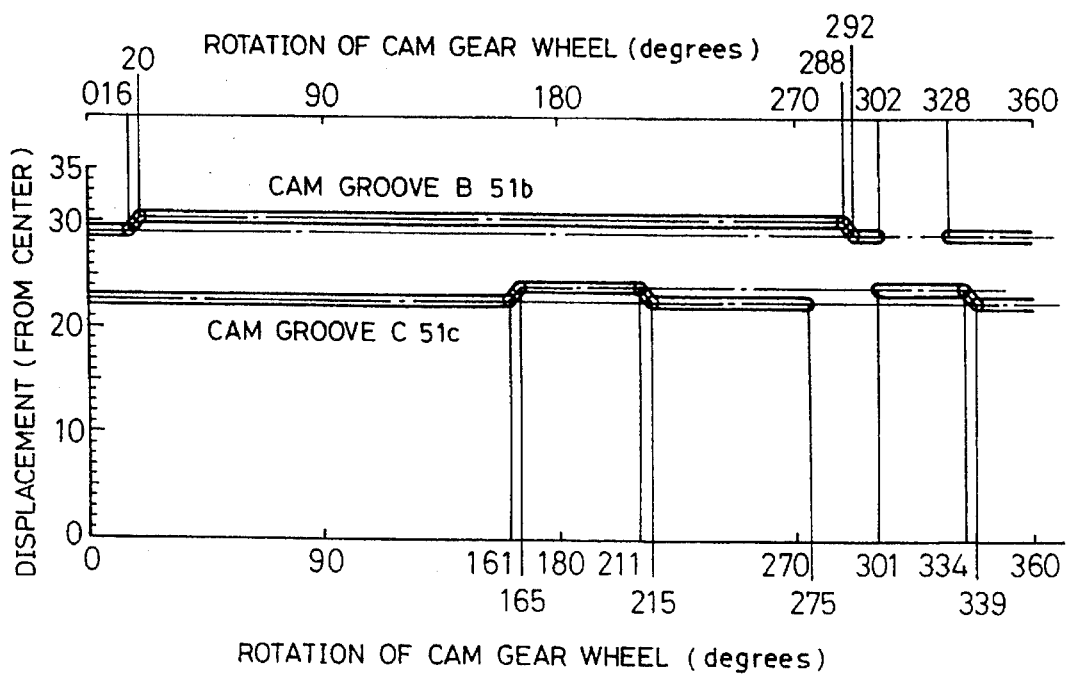
FIG. 26 is an exploited view showing cam grooves B and C formed on the under face of the cam gear shown in FIGS. 19 through 21.

As shown in FIGS. 16 and 18, the cam gear wheel 51 and cam plate 52 are disposed on the base member 35, on the left of the gears 31 and 32. FIGS. 19 through 21 show the details of the cam gear wheel 51, while the details of the cam plate 52 are shown in FIGS. 21 through 24. As shown in FIGS. 19 through 21, the cam gear wheel 51 has a cam groove 51a in its upper face, and a pair of cam grooves 51b and 51c in its under face. The cam gear wheel 51 is pivoted about a pivot shaft 51d fixedly connected to the base member 35 so as to be rotatable with respect to the base member 35. In the outer peripheral portion of the cam gear wheel 51, a gear portion 51e is provided of which a tooth less part 51f is formed in a predetermined position. The details of the cam groove A 51a, and the details of the cam groove B 51b are respectively shown in FIGS. 25 and 26.

Figure 22:
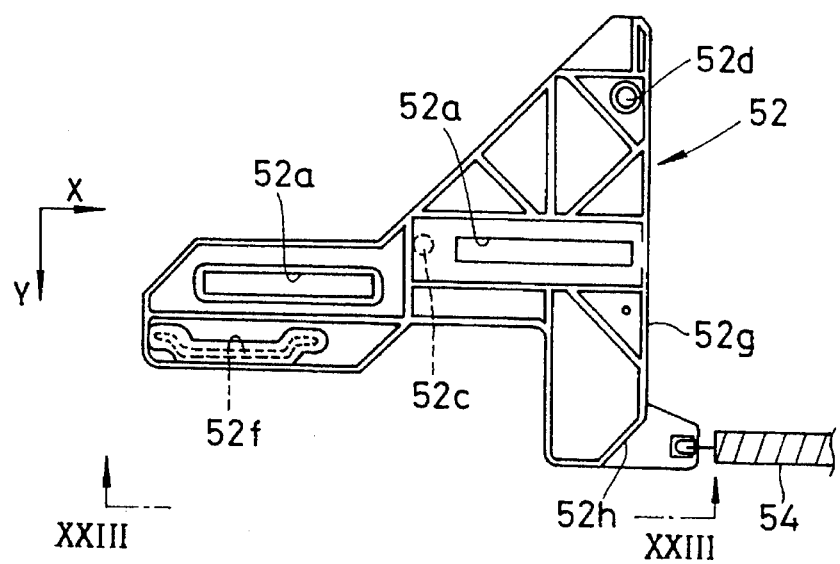
FIG. 22 is a cam plate provided in the mechanism shown in FIG. 16 and a coil spring for urging the cam plate.

The cam plate 52 is disposed above the cam gear 51, and slidably mounted on the base member 35 for reciprocal motion in lateral directions (the direction of arrow X and a direction opposite to arrow X). More specifically, the cam plate 52 is provided with a pair of linearly elongated apertures 52a (see FIGS. 22 and 23), and each of the elongated apertures is slidably engaged with the pivot shaft 51d of the cam gear wheel 51 and a pin 35c (shown in FIG. 16) mounted on the base member 35 to protrude therefrom. As shown in FIGS. 16 and 22, a coil spring 54 for urging the cam plate 52 in the rightward direction (the direction of arrow x) is provided at a front right-hand end of the cam plate 52.

As shown in FIGS. 19 and 22 through 24, at the center position of the under face and the rear right-hand end position of the cam plate 52, there are provided pins 52c and 52d to protrude therefrom. One of the pins 52c is in slidable contact with the cam groove A 51a provided in the upper face of the cam gear wheel 51, and the other of the pins 52d is in slidable contact with the cam groove 17k (shown in FIGS. 9 and 12) provided in the under face of the second tray 17.

Figure 23:
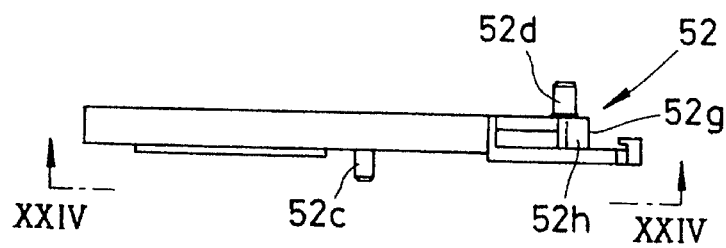
FIG. 23 is a view from the position indicated by the line XXIII—XXIII in FIG. 22.
Figure 24:
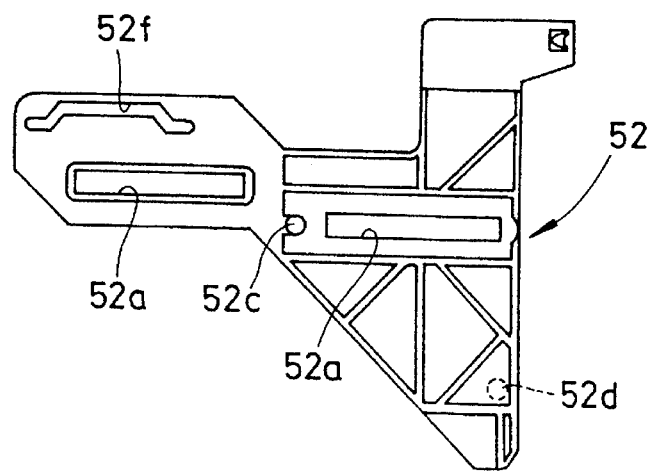
FIG. 24 is a view from the position indicated by the line XIV—XIV in FIG. 23.

As shown in FIG. 6, at the rear-end position of the under face of the first tray 12, there is provided a pin 12d protruding downward. As a part engageable with the pin 12d, a linear cam surface 52g extending along the front-to-rear direction, with an oblique cam surface 52h continuing therefrom is provided, as shown in FIGS. 22 and 23, at the right-hand end of the cam plate 52 so that the cam surfaces 52g and 52h can be in slidable contact with the pin 12d.

At a position near the left-hand end of the cam plate 52, three sensing switches 57 though 59 are linearly arranged along the lateral direction, as shown in FIGS. 16 and 19. The switches 57 through 59 are fixed to the base member 35 via a substrate 60, and the switch 57 operates as a tray position signal generating switch for producing a sensing signal when the first and second trays 12 and 17 are moved to reach the fully protruded position outside the player housing 2. As is particularly clear from FIG. 19, three switch levers 63 through 65 respectively corresponding to the sensing switches 57 through 59 are provided behind the switches 57–59, in a manner that each of the switch levers 63 through 65 are respectively rotatably mounted, via pivot shafts 63a, 64a, and 65a, on the base member 35. A free end of each of the switch levers 63 through 65 is engaged with an operating element of each of the sensing switches 57 through 59, so that the sensing switches 57–59 can be operated by the switch levers 63 through 65. Furthermore, as clearly shown in FIG. 19, pins 63b, 64b, and 65b are provided near the free ends of the switch levers 63 through 65. As shown in FIG. 19, the pin 63b provided for the switch lever 63 is slidably in contact with the cam groove 52f (also shown in FIGS. 22 and 24) provided on the left-hand end of the under face of the cam plate 52. The pins 64b and 65b, provided to protrude from the other two of the switch levers 64 and 65, are respectively in slidable contact with the cam groove C 51c and the cam groove B 51b both formed in the under face of the cam gear wheel 51. For the purpose of clarity, the cam groove B 51b and cam groove C 51c are not shown in FIG. 19, while they are particularly illustrated in FIGS. 20 and 21.

Now the playing means for playing each of the aforesaid discs and associated mechanisms will be described hereinafter.

Figure 27:
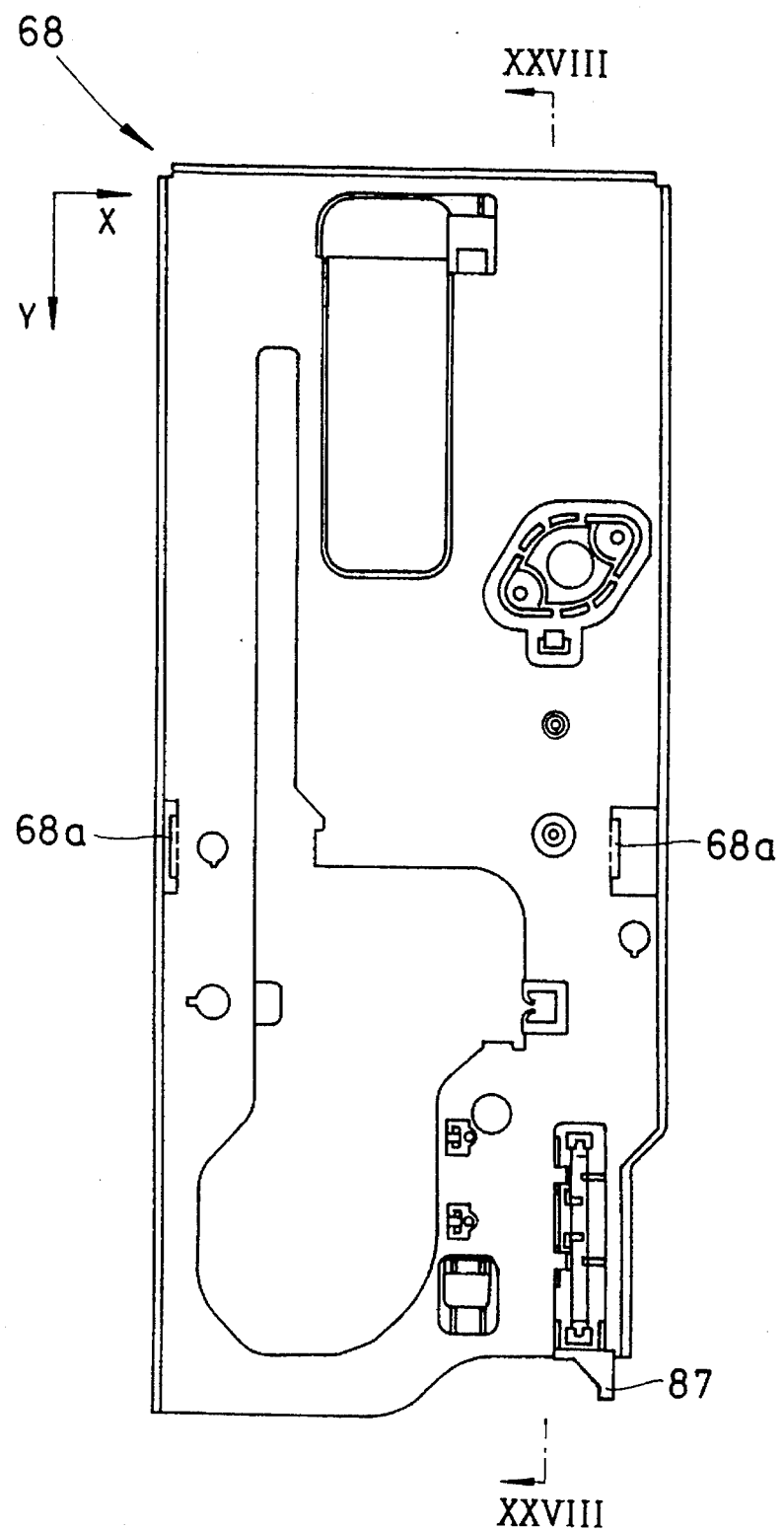
FIG. 27 is a plan view showing a tilt base provided in the mechanism shown in FIG. 16.
Figure 28:
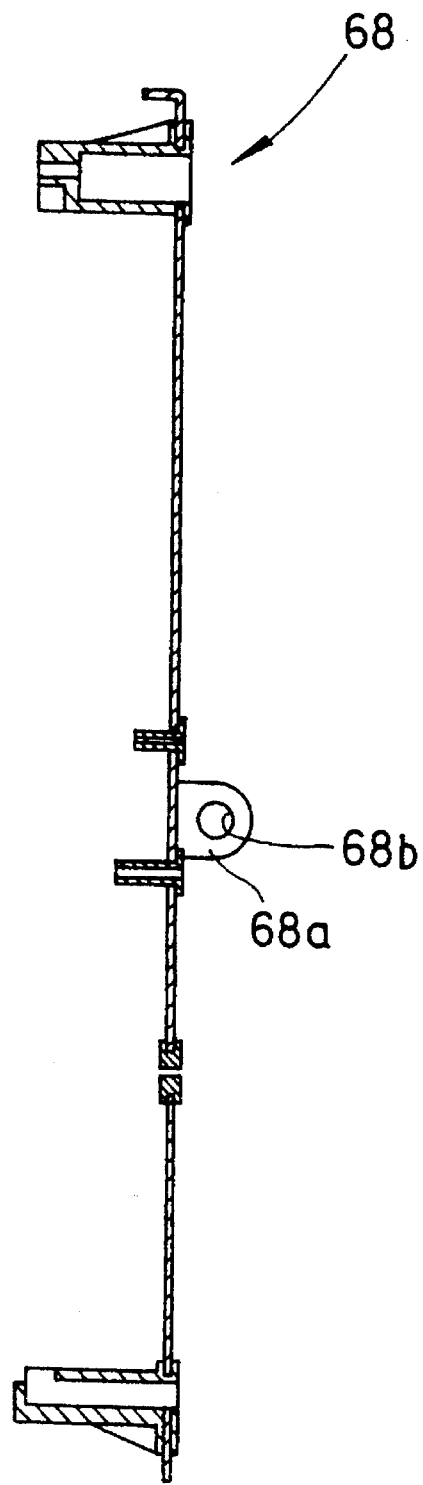
FIG. 28 is a cross-sectional view along the line XXVIII—XXVIII in FIG. 27.
Figure 29:
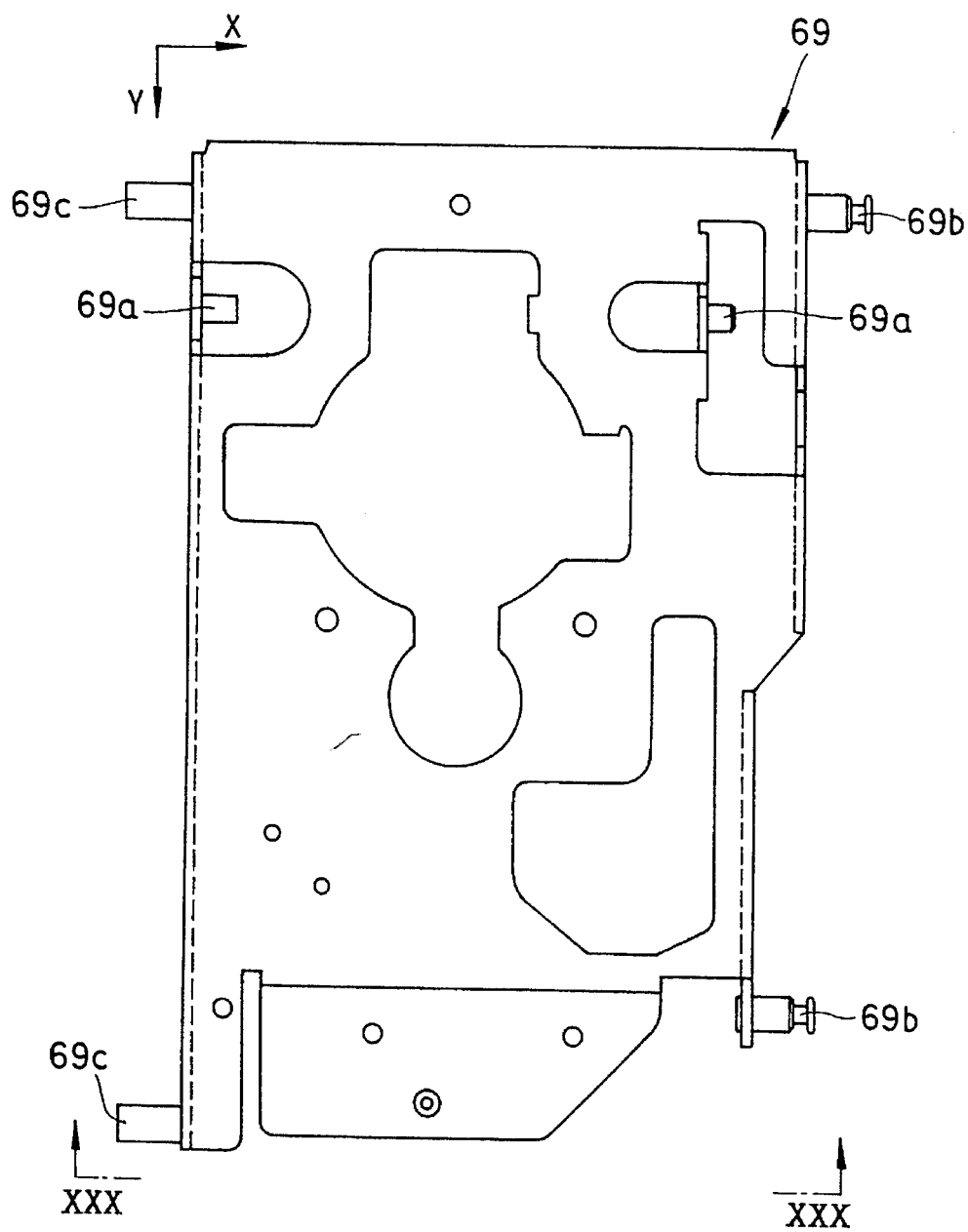
FIG. 29 is a plan view of a motor base provided in the mechanism shown in FIG. 16.
Figure 30:
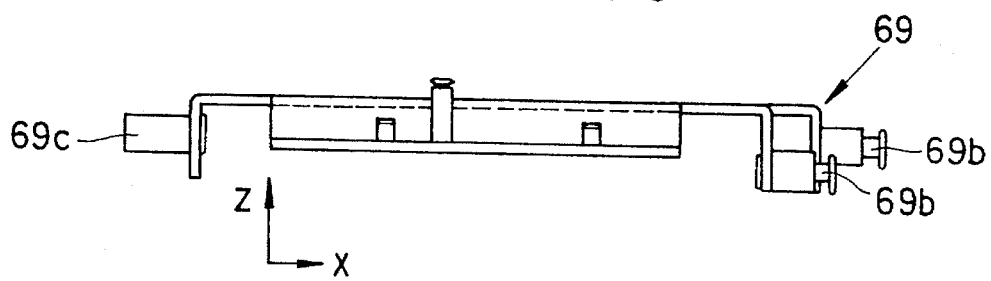
FIG. 30 is a view from the position indicated by the line XXX—XXX in FIG. 29.

As shown in FIGS. 16 through 18, a playing means carrying part 67, which carries the playing means which will be described later, is disposed at the central part of the base member. The playing means carrying part 67 is constituted by a tilt base 68 and a motor base 69, both having a rectangular planer shape, stacked with each other. The details of the tilt base 68 and the motor base 69 are illustrated in FIGS. 27 and 28, and in FIGS. 29 and 30 respectively. The tilt base 68 is provided above the motor base 69, and arranged in such a manner as to be rotatable with respect to the motor base 69 in the upward and downward directions. As shown in FIG. 29, a couple of pins 69a are provided in the rear end portion of the motor base 69, so as to protrude in the rightward direction (the direction of arrow X). The tilt base 68 is provided with a pair of cut-and-lifted portions 68a, and circular apertures 68b formed therein are rotatably fitted on the pins 69a, so as to allow the swinging motion of the tilt base 68.

As shown in FIGS. 16, 17 and 18, a spindle motor 73 with a turntable 72 is mounted on motor base 69 constituting an element of the playing means carrying part 67. On the other hand, an optical pickup including an objective lens 75a, a pickup guiding means which comprises a guide shaft 77 for guiding the optical pickup along the recording surface of a disc being played and other elements, and pickup driving means for driving the optical pickup, are mounted on the tilt base 68. The pickup driving means comprises a toothed rack 78 attached to the optical pickup 75, a gear wheel 79 with a small gear portion 79a in mesh with the toothed rack 78 and a large gear portion 79b together formed as a single element, and a large pulley 80 having, as a part of a single element, a small gear portion 80a in mesh with the large gear portion 79b of gear wheel 79, a motor 81, a small pulley 82 mounted on the shaft of motor 81, and a belt 83 installed on the small pulley 82 and large pulley 83.

The above described spindle motor 73, optical pickup 75, pickup guiding means, pickup driving means together constitute the playing means for playing a disc. The spindle motor 73 is designed to be capable of playing all types of the aforementioned discs. The turntable 72 attached to the spindle motor 73, and a disk clamp mechanism for clamping the disc set on turntable 72 will be described later.

Now, explanation will be made on a tilt base driving means for swinging the aforementioned tilt base 68, to cause a tilting operation of tilt base 68.

Figure 31:
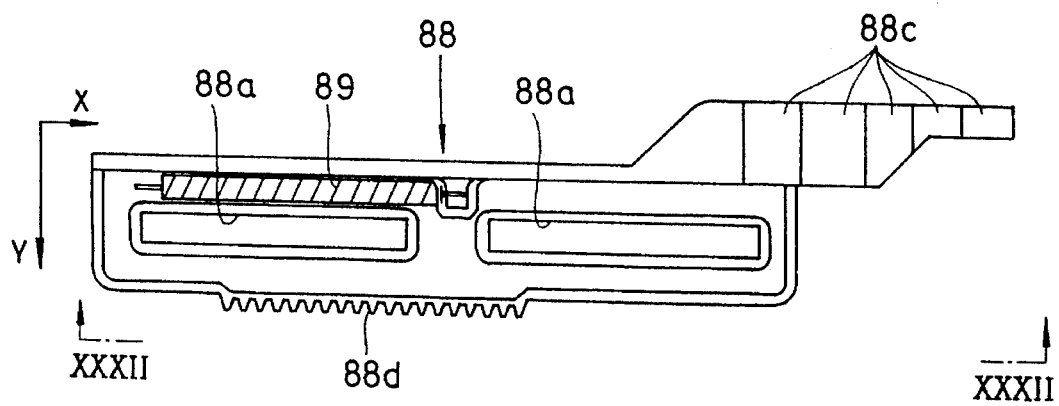
FIG. 31 is plan view of a tilt cam provided in the mechanism shown in FIG. 16, and a coil spring urging the tilt cam.
Figure 32:
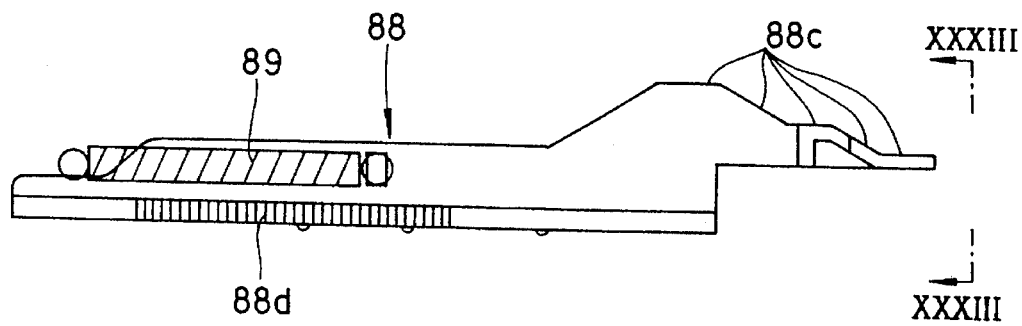
FIG. 32 is a view from the position indicated by the line XXXII—XXXII in FIG. 31.
Figure 33:
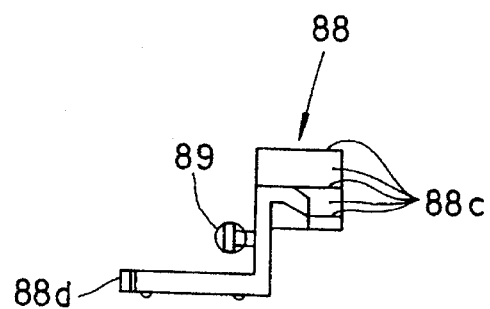
FIG. 33 is a view from the position indicated by the line XXXIII—XXXIII in FIG. 32.

The tilt base 68 has, as shown in FIGS. 16 and 27, a cam follower 87 in the form of a small piece is fixed at the right-front end thereof. A tile cam 88 associated with cam follower 87 is slidably mounted at the front end of the motor base 69 as shown in FIG. 13, to be reciprocally movable along the lateral directions (the direction of arrow X and the opposite direction). The details of the tilt cam 88 are illustrated in FIGS. 31 through 33. As is clear from FIG. 31, two elongated apertures 88a and 88a are formed in the tilt cam 88 in such a manner as to extend in the lateral direction. The tilt cam 88 is slidably mounted on two pins 69d fixed to the motor base 69 to protrude upwardly as shown in FIG. 16, by the elongated apertures 88a. A coil spring 89 (shown in FIGS. 31 through 33) is attached to the tilt cam 88, so that the tilt cam 88 is urged in the leftward direction (the direction opposite to arrow X) by the biasing force of coil spring 89.

Figure 34:
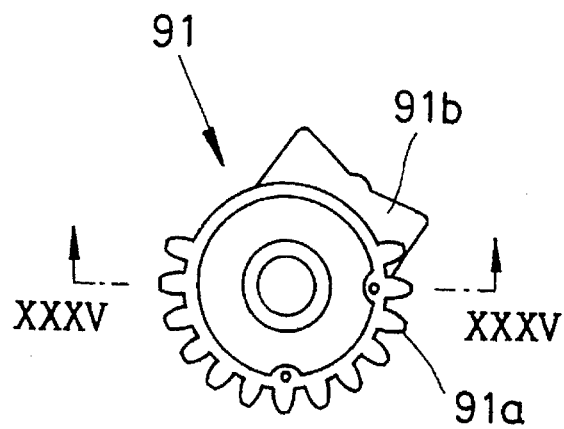
FIG. 34 is a plan view of a tilt gear wheel provided in the mechanism shown in FIG. 16.
Figure 35:
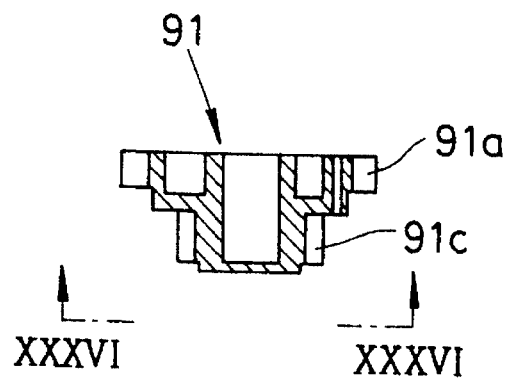
FIG. 35 is a cross-sectional view along the line XXXV—XXXV in FIG. 34.
Figure 36:
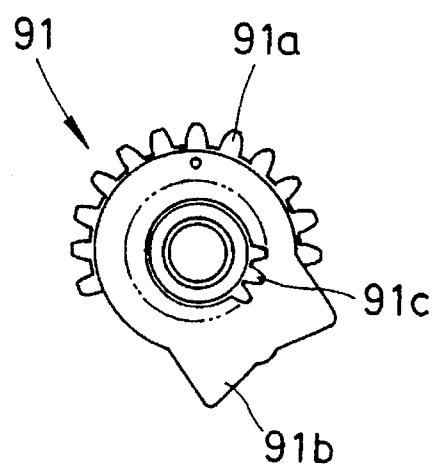
FIG. 36 is a view from the position indicated by the line XXXVI—XXXVI in FIG. 35.

The tilt cam 88 has, at its right-hand end, a cam surface 88c as illustrated in FIGS. 16, 31 through 33, so that the cam surface 88 is slidably in contact with the cam follower 87 from beneath. The tilt cam 88 is further provided, at the front end part thereof, with a toothed rack portion 88d along the lateral directions, i.e., the direction of movement of the tilt cam 88. The toothed rack portion, in turn, is meshed with a tilt gear 91 provided on the top face, at the front end thereof, of motor base 69. FIGS. 34 through 36 illustrate the details of the tilt gear 91. As shown in these figures, the tilt gear 91 has a large-sized gear portion 91a, a cam follower portion 91b, and a small-sized gear portion 91c, forming an upper stage, middle stage, and lower stage, respectively, of the tilt gear 91. The large-sized gear portion 91a has a tooth-less portion in a predetermined angular range. With this configuration, the tilt gear 91 is meshed, at its small-sized gear portion 91c, with the toothed rack portion 88d of the tilt cam 88. The large-sized gear portion 91a of the tilt gear 91 can be meshed with the gear portion 51e (shown in FIG. 19) of the aforementioned cam gear wheel 51. The cam follower portion 91b is operative to control the meshing and disengagement of the tilt gear 91 (with the large-sized gear portion 91a) against the gear portion 51e of the cam gear 51, and it is engaged in a cam groove 51h formed, as illustrated in FIG. 21, in the outer peripheral portion of the under face of the cam gear 51. With this configuration, when the cam gear wheel 51 rotated by the motor 41 comes in mesh with the tilt gear 91, the tilt cam 88 is driven by the rotation of the tilt gear 91, so that the tilt base 68 is moved in a swinging manner.

Now, the structure for actuating the latch lever 23 (shown in FIGS. 6, 8, and 13 through 15) for the mutual latch and release of the first and second trays 12 and 17 will be explained.

Figure 37:
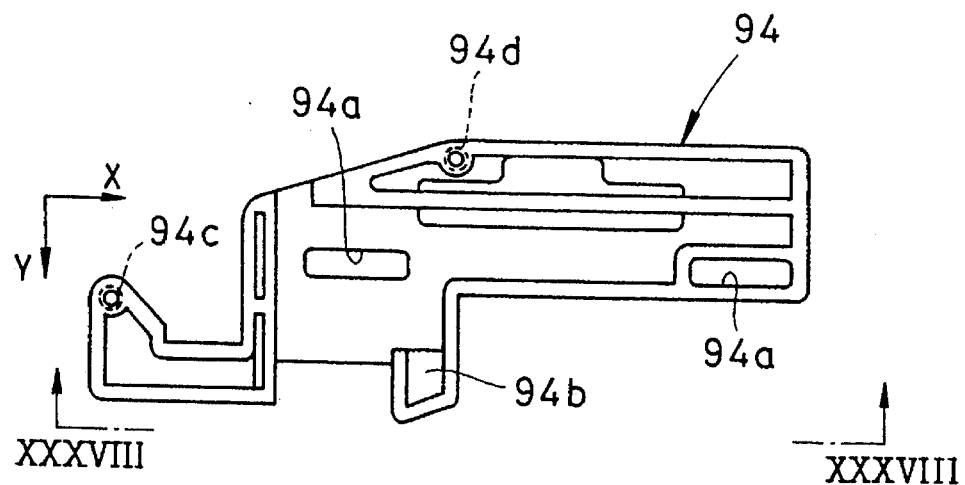
FIG. 37 is a plan view showing a latch plate provided in the mechanism shown in FIG. 16.
Figure 39:
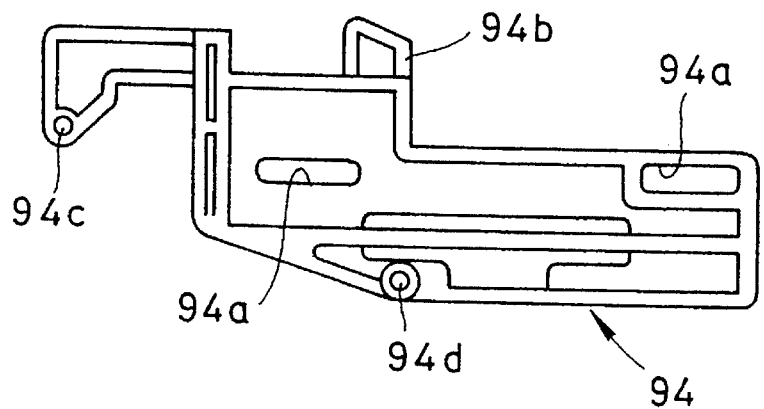
FIG. 39 is a view from the position indicated by the line XXXIX—XXXIX in FIG. 38.

As illustrated in FIG. 16, a latch plate 94 is disposed behind the motor 41, and mounted on the base member 35 in such a manner as to be reciprocally movable in the lateral directions (the direction of arrow X and the opposite direction). Referring to FIGS. 37 and 39 showing its details, the latch plate 94 has a couple of elongated slots 94a and 94a extending in the lateral direction, in which are slidably received the pins 35e fixed on the base member 35, to protrude upward.

Figure 38:
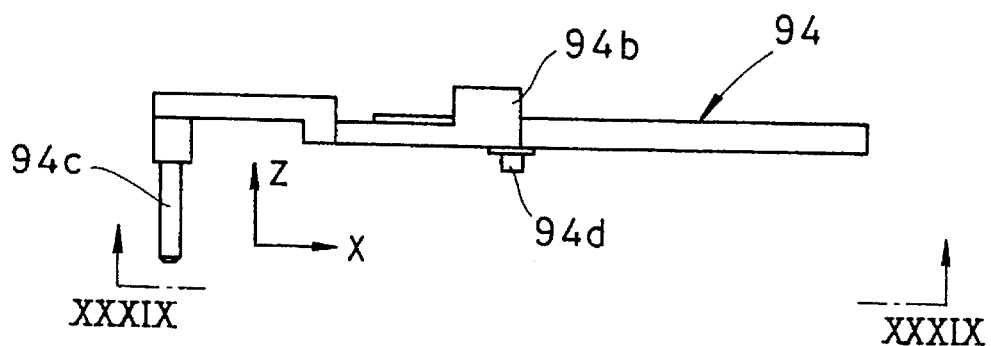
FIG. 38 is a view from the position indicated by the line XXXVIII—XXXVIII in FIG. 37.

An elongated pin 94c is provided at the left-hand end of the latch plate 94, to protrude downward, and a front extended portion 78a of the toothed rack 78 is positioned to be able to abut to the pin 94c, as illustrated in FIG. 16. As shown in FIGS. 37 through 39, a latch projection 94b is formed at the front end of the middle part of the latch plate 94, and as shown in FIGS. 13 and 16 the position of the latch projection 94b corresponds to the position of the hooked projection 35a which is provided, on the base member 35, to be engageable with the pin 23c of the latch lever 23. With this configuration, the pin 23c of the latch lever 23 is sandwiched between the latch projection 94b and the hooked projection 35a.

With the structure described in the foregoing, when the pickup 75 is located at a position shifted forwardly from the position illustrated in FIG. 16, at which the playing of a CD is started, the pin 94c of the latch plate 94 abuts with the front extended portion 78a of the toothed rack 78 attached to the pickup 75. By this abutment, movement of the latch plate 94 from right to left (in the direction opposite to arrow X) is restricted. Therefore, in FIG. 6, the latch lever 23 is held in the position shown by the solid line, so that the first tray 12 and second tray 17 are disengaged with each other. In FIG. 16, on the other hand, when the pickup is moved to the illustrated position for the start of playing an LD, the pin 94c of the latch plate 94 cannot abut with the front extended portion 78a of the toothed rack 78, so that leftward movement of the latch plate 94 is possible. Therefore, in FIG. 6, the latch lever 23 is rotated to the position shown by the two-dot chain line by means of the resilient force of the coil spring 24. By the rotation of the latch lever 23, the pin 23b comes to be engaged in the latch recess 17i of the second tray 17, so that the first and second trays 12 and 17 are maintained to locked to each other.

Now the structure for vertically moving the playing means carrying part 67 on which the aforementioned playing means will be described hereinafter.

Referring to FIGS. 16 through 18, 29 and 30, four pins 69b and 69b, 69c and 69c, are provided on both sides (two pins on each side) of the motor base 69 which forms a part of the playing means carrying part 67, to protrude outwardly. As shown in FIGS. 17 and 18, the pins 69b and 69b, 69c and 69c are slidably received in four guide grooves 35g and 35g, 35h and 35h provided near both sides (two grooves on each side) of the base member 35, to extend vertically. With this configuration, the playing means carrying part 67 is guided in the vertical direction. As illustrated in FIGS. 16 through 18, a moving member 97 is mounted on the base member 35 so that portions of the moving member are inserted between the guide grooves 35g and 35g, 35h and 35h and the playing means carrying part 67, and reciprocally movable in the frontward and backward directions (the direction of arrow Y and the opposite directions). The details of the moving member 97 are shown in FIGS. 40 through 43.

Referring to FIGS. 17, 18, 42 and 43, the moving member 97 is provided with four cam grooves 97b, in such a manner that two can grooves 97b are arranged on each of the left and right sides of the moving member 97. As shown in FIGS. 17 and 18, four pins 69b ad 69b, 69c and 69c of the motor base 69 are slidably engaged with these cam grooves 97b. As illustrated, each of the cam grooves 97b is configured to form a slope descending in the front to rear direction (the direction opposite to arrow Y). With this configuration, the playing means carrying part 67 is elevated or lowered by the backward and forward movements of the moving member 97.

Figure 40:
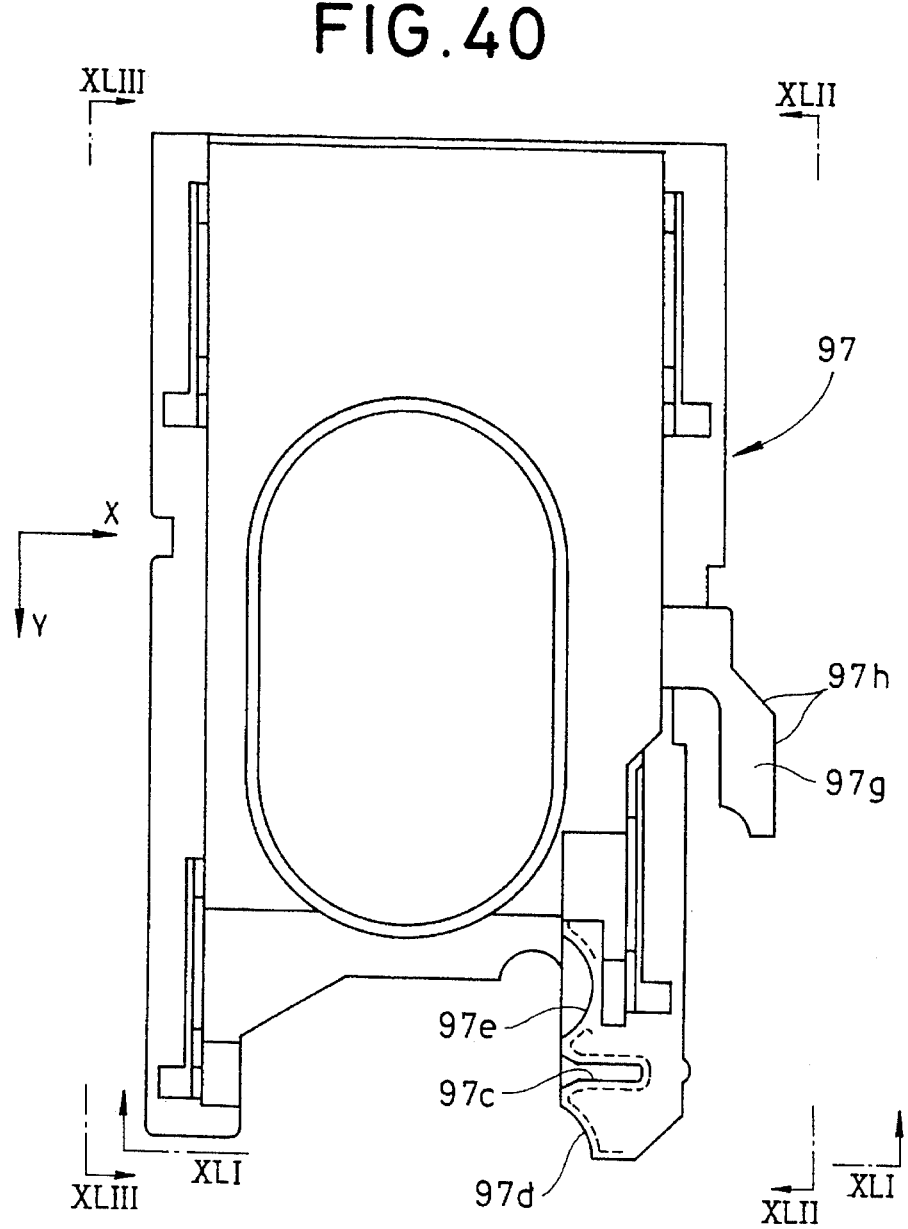
FIG. 40 is a plan view of a moving member provided in the mechanism shown in FIG. 16.
Figure 41:
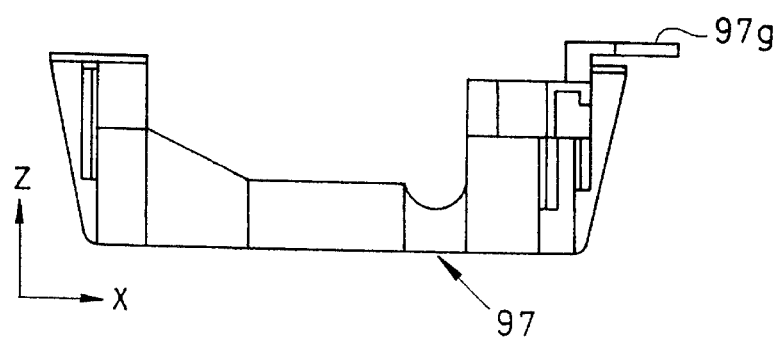
FIG. 41 is a view from the position indicated by the line XLI—XLI in FIG. 40.

The reciprocal movement of the moving member 97 is caused by the cam gear wheel 51 which applies driving force to the first and second trays 12 and 17. To enable this, the moving member 97 is provided with, in its front-right end portion, a groove 97c extending in the lateral direction as illustrated in FIG. 40. In correspondence with this groove 97c, the cam wheel 51 is provided with, on its under face, a pin 51j positioned to be shifted from the central axis of rotation as shown in FIGS. 19 through 21, so that the pin 51j is slidably received in the groove 97c. Furthermore, the cam wheel 51 is provided with, on the central part of the under face thereof, a semicircular projection 51k as illustrated in FIGS. 20 and 21. As shown in FIG. 41, the moving member 97 has, in its front-right end portion thereof, a semicircular gain 97d and a semicircular recess 97e spaced apart by a predetermined distance in the front-to-rear direction. The semicircular projection 51k, semicircular gain 97d and semicircular recess 97e together constitute a means for securing the moving member 97 at the most proceeded position (limit position of backward movement) and the most retroceded position (limit position of frontward movement) respectively, with respect to the base member 35. When the moving member 97 is moved toward the most proceeded position, the playing means carrying part 67 is elevated as aforementioned, so that the spindle motor 73 and pickup 75 mounted on the playing means carrying part 67 are moved to a position accessible to the disc on the disc carrying part 5, and a disc clamping operation will be performed by a disc clamp mechanism (to be descried later) which is standing by at an upward position. Conversely, when the moving member 97 is moved back to the most retroceded position, the playing means carrying part 67 is lowered, to release a disc clamping state, and the disc having been supported on the turntable 72 of spindle motor 73 is mounted on the disc carrying part 5 and the pickup 75 is moved away from the disc.

Figure 42:
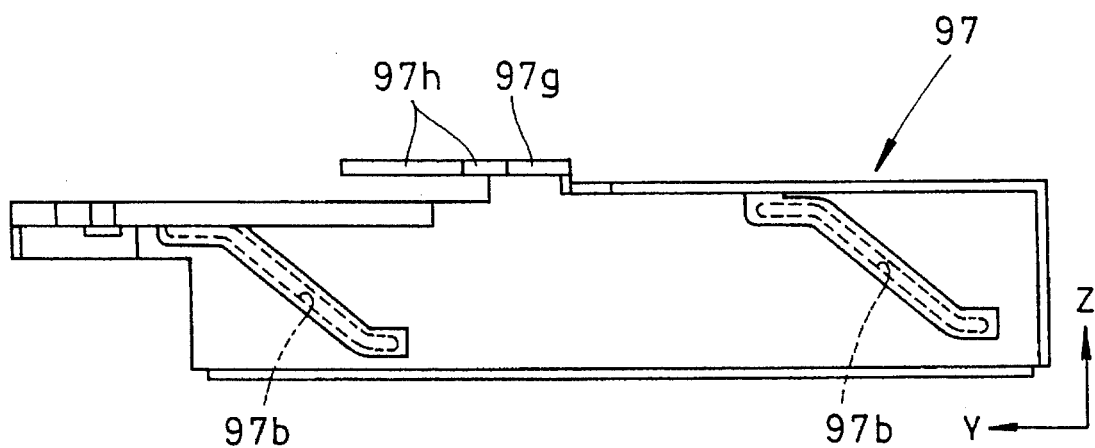
FIG. 42 is a view from the position indicated by the line XLII—XLII in FIG. 40.
Figure 43:
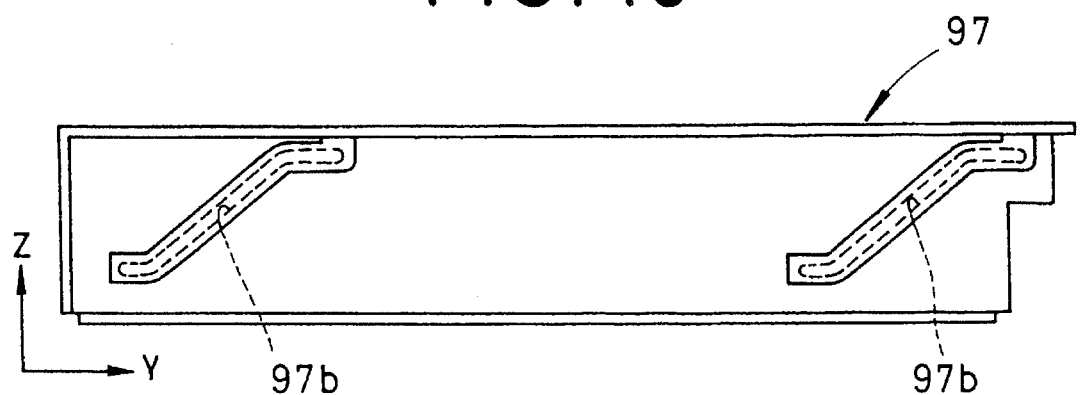
FIG. 43 is a view from the position indicated by the line XLIII—XLIII in FIG. 40.

Referring again to FIGS. 16, 17, and 40 through 42, a protruding piece 97g is formed at the right-hand end portion of the moving member 97. As shown in FIGS. 16, 40 and 42, the protruding piece 97g is provided with a cam surface 97h which comprises a linear portion extending in the frontward and backward directions (in the direction of arrow Y and its opposite direction) and an oblique portion extending obliquely from the rear end of the linear portion. The cam surface 97h is in slidable contact with a pin 94d protruding from the under face of the rear end portion of the latch plate 94, as illustrated in FIG. 16. The pin 94d is shown in FIGS. 37 through 39. While the linear portion of the cam surface 97 is in slidable contact with the pin 94d, the latch plate 94 is secured against the base member 35 at a limit position of the rightward movement, and the latch plate 94 is released when the oblique portion of the cam surface is in slidable contact with the pin 94d by the movement of the moving member 97 in the front-to-rear direction.

The turn table 72 attached to the spindle motor 73 and the disc clamp mechanism for clamping a disc carried on the turntable will be described hereinafter.

Figure 44:
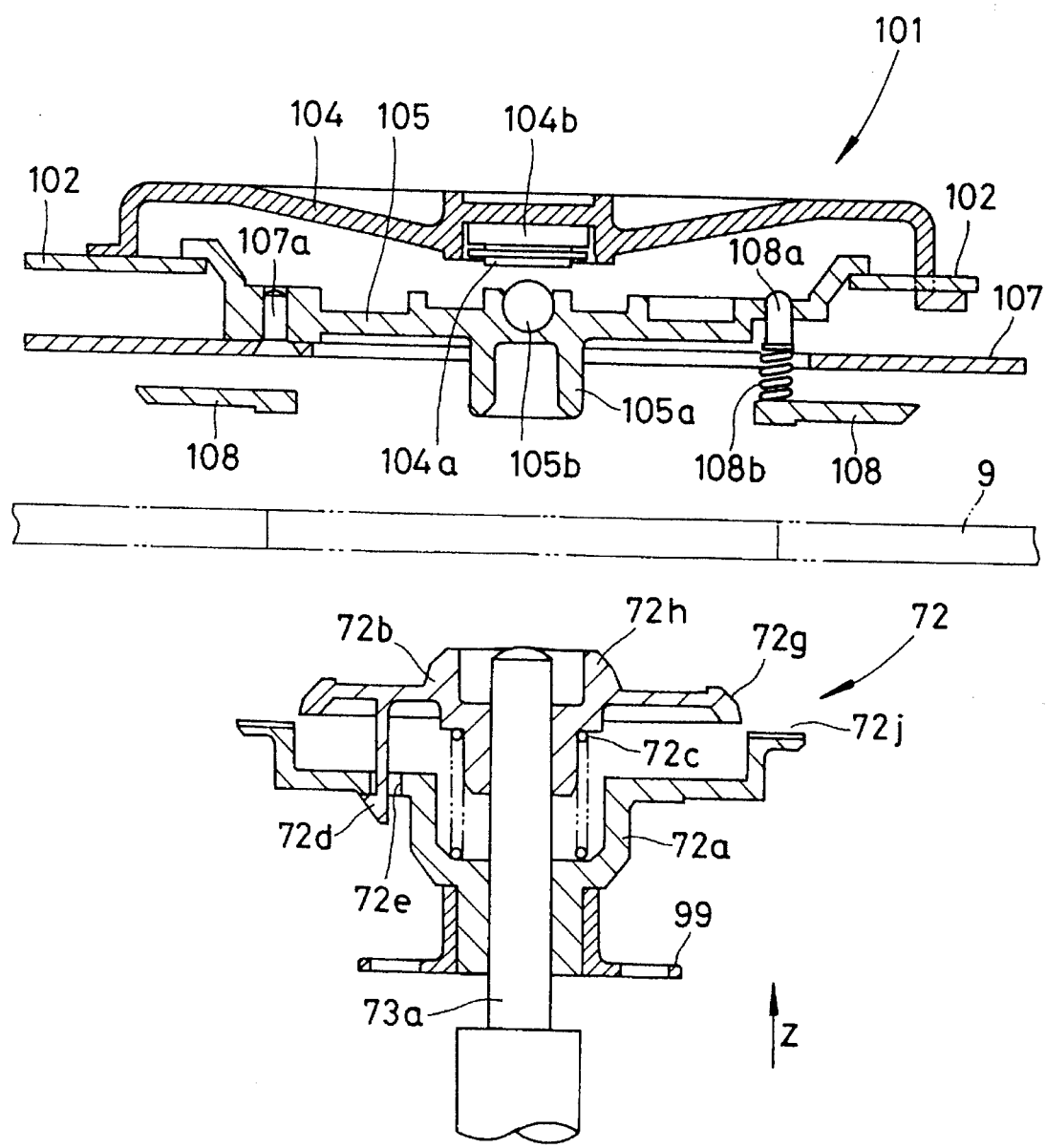
FIG. 44 is a vertical cross-sectional view of a turntable and a disc clamp mechanism provided in the mechanism shown in FIG. 16.

As illustrated in FIG. 44, the turntable 72 comprises a disc carrying member 72a of a cup-shape mounted on the spindle 73a, a centering hub 72b slidably mounted on the spindle 73a, which can be protruded or depressed with respect to the disc carrying surface of the disc carrying member 72a, and a coil spring 72c for urging the centering hub 72b in a protruding direction. A nail portion 72d is provided to protrude downward from the back face of the centering hub 72, and slidably received in an aperture 72e formed in the disc carrying member 72a. The centering hub 72b is further provided with a first tapered portion 72g for performing the centering of an LD 9 or 10 (shown in FIG. 4) by fitting into the central aperture 9a or 10a of the disc, and second tapered portion 72h for performing the centering of a CD 14 or 15 (shown in FIG. 5) by fitting into the central aperture 14a or 15a of the CD. The disc carrying surface of disc carrying member 72a is covered with an annular sheet 72j made of a material having a high frictional factor such as rubber. Similarly, a portion of the centering hub 72b facing to abut with the CD is covered with a sheet (not shown) of the same material. In addition, a light shielding ring 99 is fitted around the lower end portion of the disc carrying member 72a.

The disc clamp mechanism 101, on the other hand, comprises a support member 102 of a plate form fixedly mounted in the player housing (shown in FIGS. 4 ad 5, for example) and extending in the lateral directions (the direction of arrow X and its opposite direction), a circular clamper holder 104 formed into a cup-shape, mounted on the support member in such a manner that its concave side is oriented downward, a clamper head 105 rotatably supported by the supporting member 102, a dish-shaped stabilizer 107 fixed to the lower side of the clamper head 105 by means of screws 107a, and an annular clamper 108 movably connected on the lower side of the clamper head 105 by means of a slipping pins 108a and coil spring 108b so as to be movable upward or downward within a predetermined range. The clamper head 105 further has, on the under face thereof, a cylindrical portion 105a around its center of rotation, and the centering of the clamper head 105 with respect to the spindle 73a is performed by the cylindrical portion 105 being fitted on the spindle 73. The clamper head 105 is further provided with a ball 105b fixedly mounted at the center of its upper face, and a bearing 104a is fixed to the under face of the clamper holder 104 via a rubber sheet 104b, so that the bearing 104a smoothly abuts with the ball 105b.

With the configuration described above, the turntable 72 is elevated to set a disc such as an LD 9 into the disc clamp mechanism 101 while the disc is lifted from the disc carrying part 5 (shown in FIGS. 4 and 5, for example). With this motion, if the disc to be played is an LD, then the tapered portion 72g of the centering hub 72b is fitted into the central aperture of the LD, and the LD is clamped between the disc carrying member 72a and the clamper 108. In this state, the clamper head 105 is moved upwardly to be detached from the supporting member 102, and the ball 105b comes to abut with the bearing 104a. As a result, the LD becomes rotatable, and the operation of the pickup 75 is performed, to read the contents of the LD.

When, on the other hand, the disc to be played is a CD, the clamping operation is performed in a sequence similar to that described above, in which the centering hub 72b is fitted into the central aperture of the CD at the tapered portion 72h having the smaller diameter.

Figure 45:
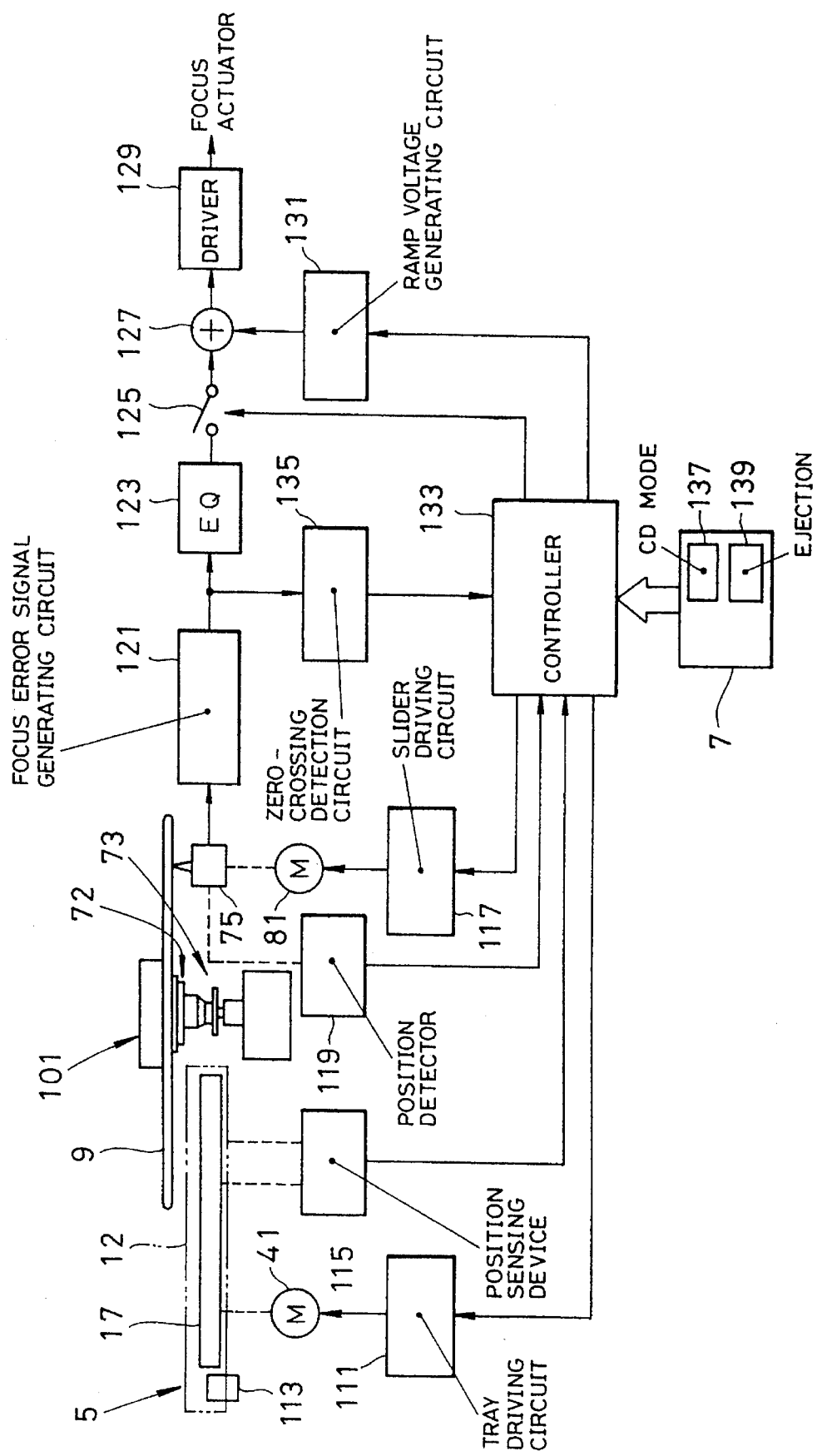
FIG. 45 is a block diagram showing a control system of the compatible player shown in FIGS. 4 and 5.

The structure of a control system of the compatible player will be described with reference to FIG. 45.

As shown in this figure the LD 9, for example, is carried by the first tray 12 contained in the disc carrying part 5, to a position directly above the spindle motor 73, set on the turntable 73 by the elevation of the spindle motor 73, and clamped by the disc clamp mechanism 101, so that the LD 9 is rotated by the spindle motor 73. As aforementioned, the first tray 12 is moved together with the second tray by the driving force of the motor 41 in accordance with a driving signal from the tray driving circuit 111. In this state, the first and second trays 12 and 17 are locked to each other by means of latch mechanism denoted by the numeral 113. The position of the first tray 12 or second tray 17 is arbitrarily sensed by means of a position sensing means 115. As aforementioned, the latch mechanism 113 is constituted by the latch lever 23 (shown in FIG. 6, for example), coil spring 24, and so on. The position sensing means 115 comprises, for example, the sensing switches 57 and 59 shown in FIG. 19, switch levers 63 and 65 as elements for operating the switches 57 and 59, and the transmission mechanism for transmitting the movement of the first and second trays 12 and 17 to the switch levers 63 and 65. The transmission mechanism, for example, comprises the cam gear wheel 51 shown in FIG. 19, cam plate 52, coil spring 54 (shown in FIG. 16) for urging the cam plate 52 in the rightward direction, cam groove 17k (shown in FIGS. 9 and 12) formed on the second tray 17, pin 12d (shown in FIG. 6) protruding from the under face of the first tray 12.

The recorded contents of the LD 9, on the other hand, is read-out by means of the optical pickup 75. The optical pickup 75 incorporates therein an optical system including a semiconductor laser and an objective lens 75a, photo detectors for receiving a light beam reflected by the information recording surface of the LD 9, a focus actuator for positional control of the objective lens 75a in the direction of optical axis, and a tracking actuator for the positional control of a beam spot irradiated from the pickup 75 with respect to the recording track in the direction of disc radius. The pickup 75 is moved by the motor 81 as a source of driving force, in the radial direction of the LD 9 in accordance with a drive signal from a slider driving circuit 117. The position of pickup moved by the above-described structure is sensed by a position detector 119 including an encoder interlocked with the movement of the pickup, or sensed by the on-off state of a switch group (not shown) provided in the traveling path of the pickup, to be switched by abutment with a part of the pickup.

An output signals from photo detectors in the pickup 75 is supplied to a focus error signal generating circuit 121. A focus error signal is generated by the known astigmatic method in the focus error signal generating circuit 121. The focus error signal is treated by an equalizer (EQ) circuit 123 for the compensation of the frequency and phase characteristics, and supplied to an input of an adder 127 through a loop switch 125. The focus error signal past the adder 127 is provided through a driver 129, as a drive signal of the focus actuator incorporated in the pickup 75. The focus actuator has a function to move the objective lens 75a in the pickup in the direction and amount corresponding to the sign and level of the focus error signal.

A focus servo loop is formed by the elements described above, and the loop is closed by the closure of the loop switch 125. With the closed focus servo loop, the light beam spot is accurately focused on the information recording surface of the LD 9 by driving the aforementioned focus actuator in accordance with the focus error signal.

To the other input terminal of the adder 127, a ramp voltage (a voltage varying with time) generated by a ramp voltage generating circuit 131 is supplied. The ramp voltage is generated in response to a focusing command supplied from the controller 113 when the servo loop is open, and supplied to the focus actuator as a drive signal for pulling-in the focus servo loop by a focus sweep operation responsive to the focusing command, by which the objective lens is forcibly moved between positions across an in-focus position of the objective lens. A zero-crossing detection circuit 135 is provided, to detect a condition that the focus error signal level, which exhibits an S-curve characteristic through the focus sweep operation of the objective lens 75a, is near zero level. The detection output of the zero-crossing detection circuit 135 is supplied to the controller 133. Furthermore, the control section 7 is provided with a CD mode key 137 as a commanding means for commanding the setting of a CD play mode or canceling of that mode by a manual operation, an ejection key 139 for commanding the ejection of the disc, and so on.

The controller 133 is constituted by a microcomputer, and in accordance with the operation of its processor, performs various control operations such as a drive control of the above-described disc transporting mechanism, on/off control of the loop switch 125, position control of the pickup 75 by the driving motor 81 via the slider drive circuit 117 on the basis of the positional information from the position detector 119, position control of the first and second trays 12 and 17 by the driving of motor 41 via the tray driving circuit 111 on the basis of the positional information from the position sensing means 115, and issuance of the focusing command to the ramp voltage generating circuit 131. The controller 133 also performs, upon starting of the play of a disc, the disc discrimination between CD and LD. Furthermore, in response to the mode setting command or reset command by the CD mode key 137, the controller 133 performs operations for the mutual latching or disengagement between the first tray 12 and second tray 17 by means of the latch mechanism 113 (shown in FIG. 45).

Figure 47:
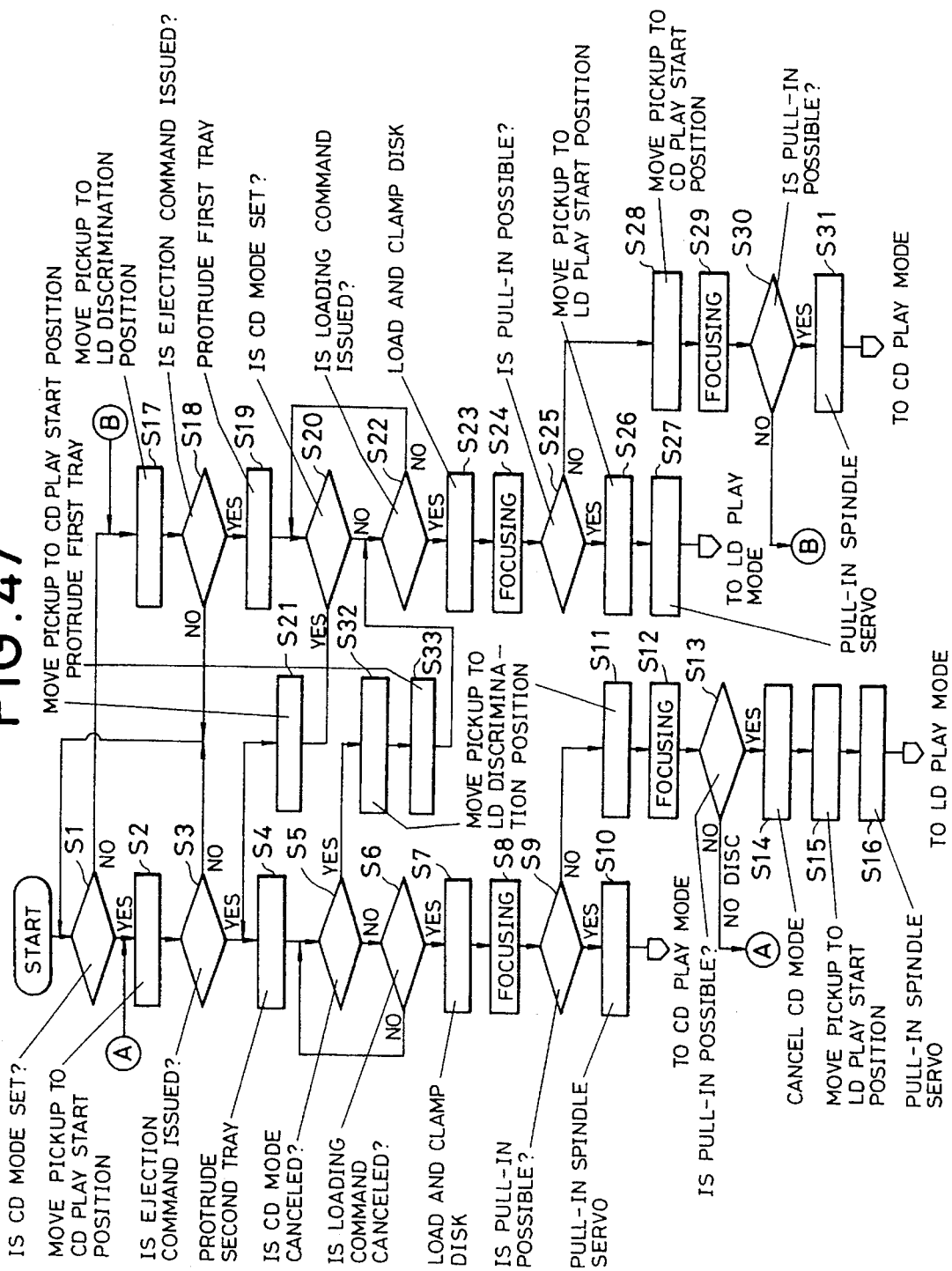
FIG. 47 is a flowchart showing the operation of the mechanism shown in FIG. 16.

Now, the processing procedure upon starting the play of a disc, performed by the processor of the controller 133 will be described with reference to the flowchart of FIG. 47 and explanatory diagrams of FIGS. 48 through 59. In this procedure, it is assumed that the play start position near the lead-in area of CD shown in FIG. 47 is used as a CD discrimination position for the pickup 75, and a predetermined position located outside the outer periphery of a 12 cm CD 14 and inside the outer periphery of a 20 cm CD 10 is used as an LD discrimination position.

Before entering into detailed explanation of each part of the mechanisms contained in the housing, general operation of the player as a whole will be described.

The processor firstly judges whether or not the CD play mode is set (step S1). If the pickup 75 is not in the CD playing position when the CD play mode has been set, the drive control of the motor 81 is performed so that the pickup 75 is transported to the CD play start position, and the pickup 75 is held to stand by at this position (step S2). Then the processor judges whether or not an ejection command is issued by the operation of ejection key 139 (step S3). When the ejection command is not generated, the processor proceeds to step S1. If on the other hand an ejection command is issued, the tray driving circuit 111 is controlled by the processor, to move the second tray 17 to its protruding state (step S4).

At this point of operation, user of the player may cancel the CD play mode. Therefore, the processor judges whether or not the CD play mode is canceled by the operation of the CD mode key 137 (step S5). If the CD play mode has not been canceled, the processor then judges whether or not a loading command is issued (step S6). The loading command is generated, for example, in response to a detection output of a switch (not shown in the drawings) which is arranged to be actuated when the user pushes the tray lightly after setting a disc thereon. When the loading command is issued, the processor starts driving control of the disc transporting mechanism, for the loading and clamping of the disc to be played (step S7). When a loading operation completion signal is generated by a detection switch for detecting the completion of disc loading operation (not shown in the drawings), the processor issues a focusing command to the ramp voltage generating circuit 131 (step S8). In response to the focusing command, the focus servo loop is pulled to a locked condition. In this state, the processor judges whether or not the pull-in of the focus servo loop to a closed state is possible by monitoring the presence of the detection signal of the zero-crossing detection circuit 135 (step S9). If the pull-in of the focus servo loop is possible, the processor then starts the pull-in of the spindle servo loop, while determining that the CD has been set in the playing position (step S10). Subsequently, the processor proceeds to the CD play mode.

Figure 46:
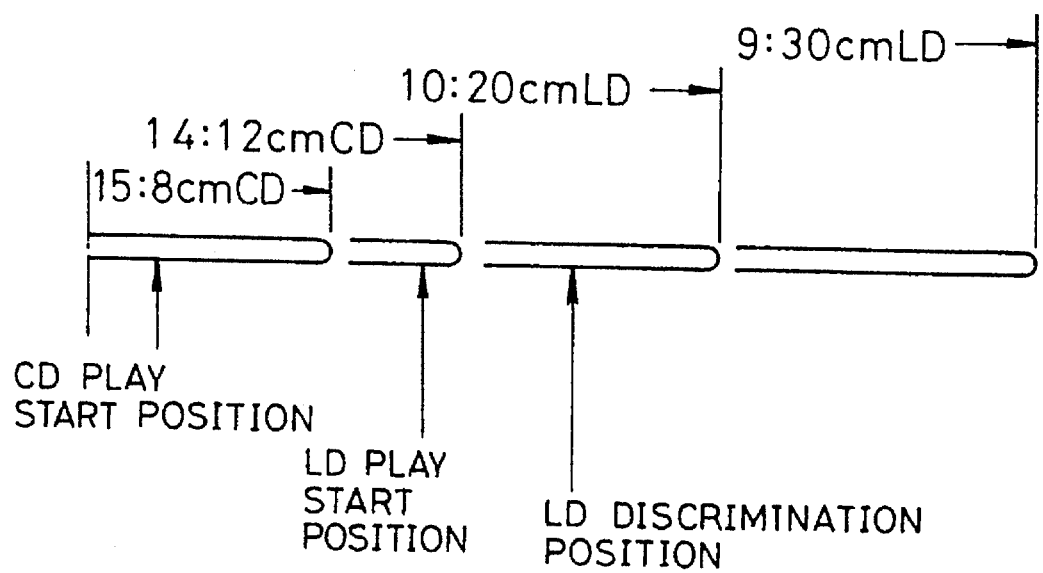
FIG. 46 is a side view of discs to be played in which positions for the positioning of the pickup with respect to the discs are also shown.

In the above operations, however, if the disc is not loaded or an LD instead of a CD is loaded, the pull-in of the focus servo loop is not possible. Therefore, if it is judged in step S9 that the pull-in of the servo loop is not possible, the processor starts the driving control of the motor 81, to transport the pickup 75 to the LD discrimination position (shown in FIG. 46), and makes the pickup 75 stand-by at that position (step S11). Subsequently, the processor supplies the focusing command to the ramp voltage generating circuit 131 (step S12). Then, the processor judges whether or not the pull-in of the focus servo loop is possible (step S13). If the pull-in is possible, the processor cancels the CD play mode while determining that an LD has been set in the playing position (step S14). Then the processor starts driving control of the motor 81, to transport the pickup 75 to the play start position (shown in FIG. 46) near the lead-in area of LD (step S15), and starts the pull-in of the spindle servo loop (step S16). Afterwards, the processor proceeds to the LD play mode. If it is judged in step S13 that the pull-in of the focus servo loop is not possible, it means that no CD or LD is set in the playing position. Therefore, the processor determines that disc is not set, and proceeds to step S2.

When it is determined in step S1 that the CD play mode is not set, the processor starts driving of the motor 81 to transport the pickup 75 to the LD discrimination position when the pickup 75 is not in that position, and makes the pickup 75 stand-by at that position (step S17). Then the processor judges whether or not an ejection command is issued by the key operation of the ejection key 139 (step S18). If the ejection command is not generated, the processor proceeds to step S1. If on the other hand an ejection command is generated, the processor starts driving of the disc transporting mechanism, to move the first tray 12 to the protruded state (step S19). Then the processor judges whether or not the CD play mode is set by a key operation of the CD mode key 137 (step S20). If the CD play mode has been set, the processor starts driving of the motor 81 to move the pickup 75 to the CD play start position, and makes the pickup 75 stand-by at that position (step S21). Subsequently, the processor proceeds to step S4. In addition, when the CD play mode is set while the first tray 12 is moved to the protruded position, it may not be necessary to proceed to step S4 to move the second tray 17 to the protruded position. In such a case, it is possible to arrange that the processor directly proceeds to step S6.

When it is judged in step S20 that the CD play mode has not been set, the processor then judges whether or not the loading command is issued (step S22). If the loading command is issued, the processor starts driving of the disc transporting mechanism, to perform the loading and clamping of the disc (step S23). Subsequently, the processor issues the focusing command to the ramp voltage generating circuit 131 (step S24). Then the processor judges whether or not the pull-in of the focus servo loop is possible (step S25). If the pull-in is possible, the processor drives the motor 81 to move the pickup 75 to the LD play start position while determining that an LD is set in the playing position (step S26). Then, the processor performs the pull-in of the spindle servo loop (step S27), and proceeds to the LD play mode subsequently.

If it is judged in step S25 that the pull-in of the focus servo loop is not possible, it means either that no disc is set, or a CD is loaded. Therefore, the processor drives the motor 81 to move the pickup 5 to the CD play start position and holds the pickup to stand-by at that position (step S28). Then, the processor issues the focusing command to the ramp voltage generating circuit 131 (step S29). Subsequently, the processor judges whether or not the pull-in of the focus servo loop is possible (step S30). If the pull-in is possible, the processor performs the pull-in of the spindle servo loop while judging that the CD is set in the playing position (step S31), and proceeds to the CD play mode subsequently. If it is judged in step S30 that the pull-in of the focus servo loop is not possible, it means that neither CD nor LD is set in the playing position. So the processor proceeds to step S17 while determining that no disc is set.

If, on the other hand, it is determined in step S5 that the CD play mode is canceled, the processor drives the motor 81, to move the pickup 75 to the LD discrimination position, and makes the pickup 75 stand-by at that position (step S32). Then, the processor drives the disc transportation mechanism, to move the first tray 12 to the protruded position (step S33), and proceeds to step S22. With this procedure, setting of an LD on the tray 12 becomes possible.

According to the procedure described above, if the CD play mode has been set by the key operation of the CD mode key 137, an LD discrimination operation is omitted, so that the movement of the pickup 51 in association with this discrimination also become unnecessary. If it is assumed, for example, that loading of a disc in the state that the first tray is protruded takes 3 seconds, and discrimination of a CD by the focusing operation takes 2 seconds, and the pull-in of the spindle servo loop also takes 2 seconds, an overall time required from the start of loading of a disc to the start of playing will be around 7 seconds. If, on the other hand, the CD play mode has been set at the time of playing of an LD, the CD play mode will be automatically canceled when it is judged that an LD is loaded in the playing position. Thus, the operation of the player will be smoothly shifted to the playing of an LD without hindrance. Furthermore, the CD mode after being established will be maintained until it is canceled manually or until an LD is loaded, the mode setting may not be performed each time if discs of the same type are played successively.

Furthermore, when the CD mode is established, energy consumption by the player can be reduced by switching off power supply to the video part.

Although the embodiment having been described is constructed such that a CD mode key 137 is provided so that the CD play mode is set in response to the mode set command by using the CD mode key 137, it is also possible to construct the player in such a manner that an LD mode key is provided instead of the CD mode key 137, and the CD mode is set in response to an LD play mode cancel command by the operation of the LD mode key, whereby obtaining a similar effect as the described embodiment.

Now the disc loading operation and clamping operation, which have been briefly described in connection with the above explanation of general operation of the player, will be described together with the playing operation being performed subsequently, referring to each part of the mechanisms contained in the player housing 2. For disc unloading operation and unclamping operation, explanation other than that given hereinafter will not be given since each steps in those operations are performed in orders reverse to the orders in the disc loading operation and the disc clamping operation.

The loading and clamping operations for the LD 9 and 10 (shown in FIG. 4) will be described first.

Figure 48:
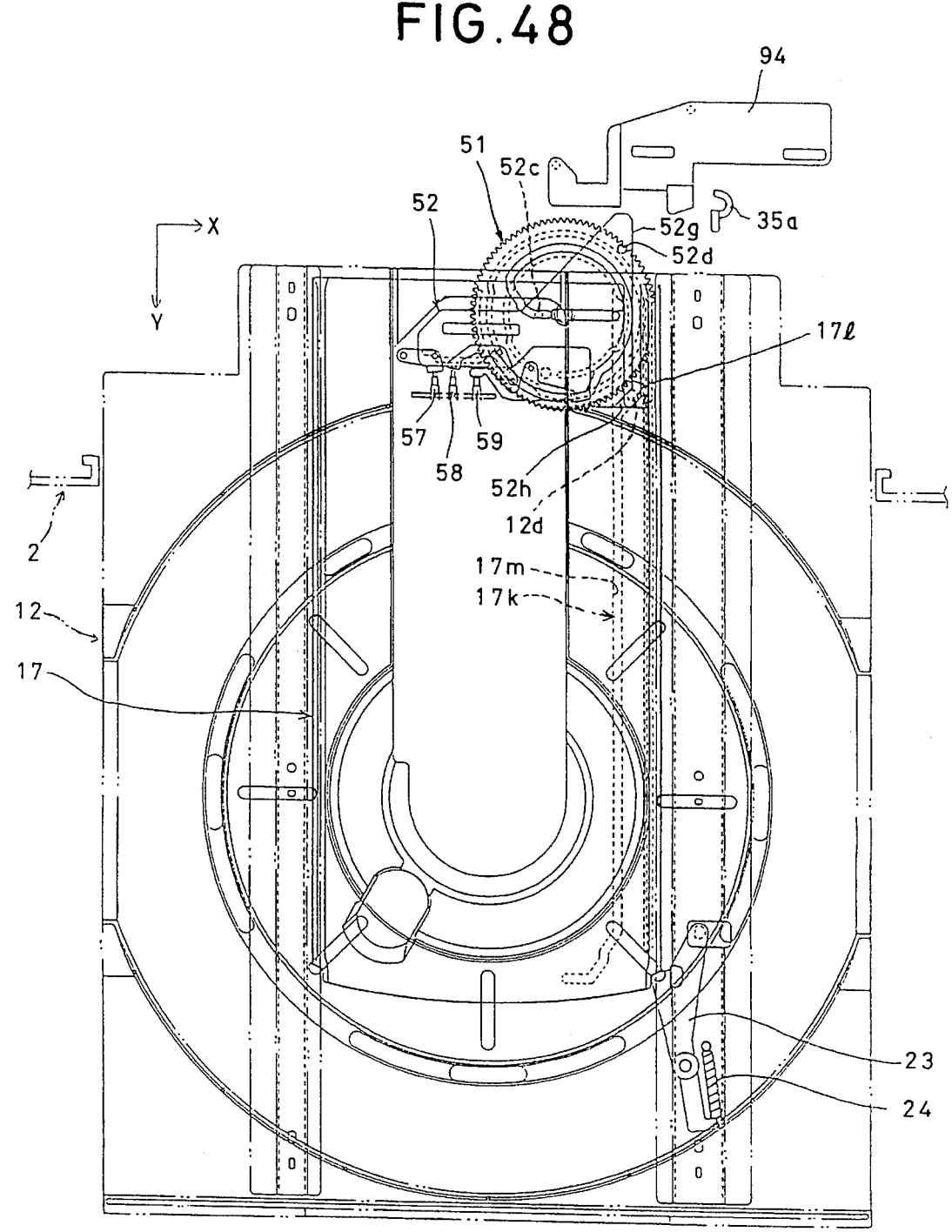
FIGS. 48 through 59 are explanatory views of the mechanism shown in FIG. 16 illustrating various states of operations thereof.

As shown in FIGS. 4 and 48, the first and second trays 12 and 17 are locked to each other, and held in a position protruded outwardly from the player housing 2. In this protruded position, the sensing switch 57 is switched off, as shown in FIG. 48. With this position of the sensing switch 57, the controller 133 (shown in FIG. 45) ensures that the protruding action of the trays 12 and 17 is completed. When the trays 12 and 17 are in the protruded state, the user will place an LD 9 or 10 on the first tray 12, and push the tray 12 lightly by the finger. As a result of such an operation, the sensing switch (not shown in the drawings) is actuated as aforementioned, so that the loading command is produced. In response to the loading command, the controller 113 drives the motor 41 in the normal direction by means of the tray driving circuit 111 (shown in FIG. 45). By the rotation of motor 41, both of the couple of gear wheels 31 and 32, shown in FIG. 16 for example, are rotated in the clockwise direction, so that a driving force in the backward direction is applied to the second tray 17 on which the toothed rack 17j in mesh with the couple of gear wheels 31 and 32 is formed. By this driving force, movement of the second tray 17 together with the first tray 12 latched thereto in the front-to-rear direction will be initiated.

The reason of providing tow gear wheels 31 and 32 will be briefly explained. For applying a driving force to the second tray 17, it is sufficient to provide only a single gear wheel for transmitting the driving force arranged to be meshed with the toothed rack 17j described above. However, two gear wheels 31 and 32 are provided in view of the necessity of securing a stroke of the movements of the first tray 12 carrying an LD of the larger size, as well as a stroke of the protruding and withdrawing movements of the second tray 17 carrying a CD of the smaller size.

Figure 49:
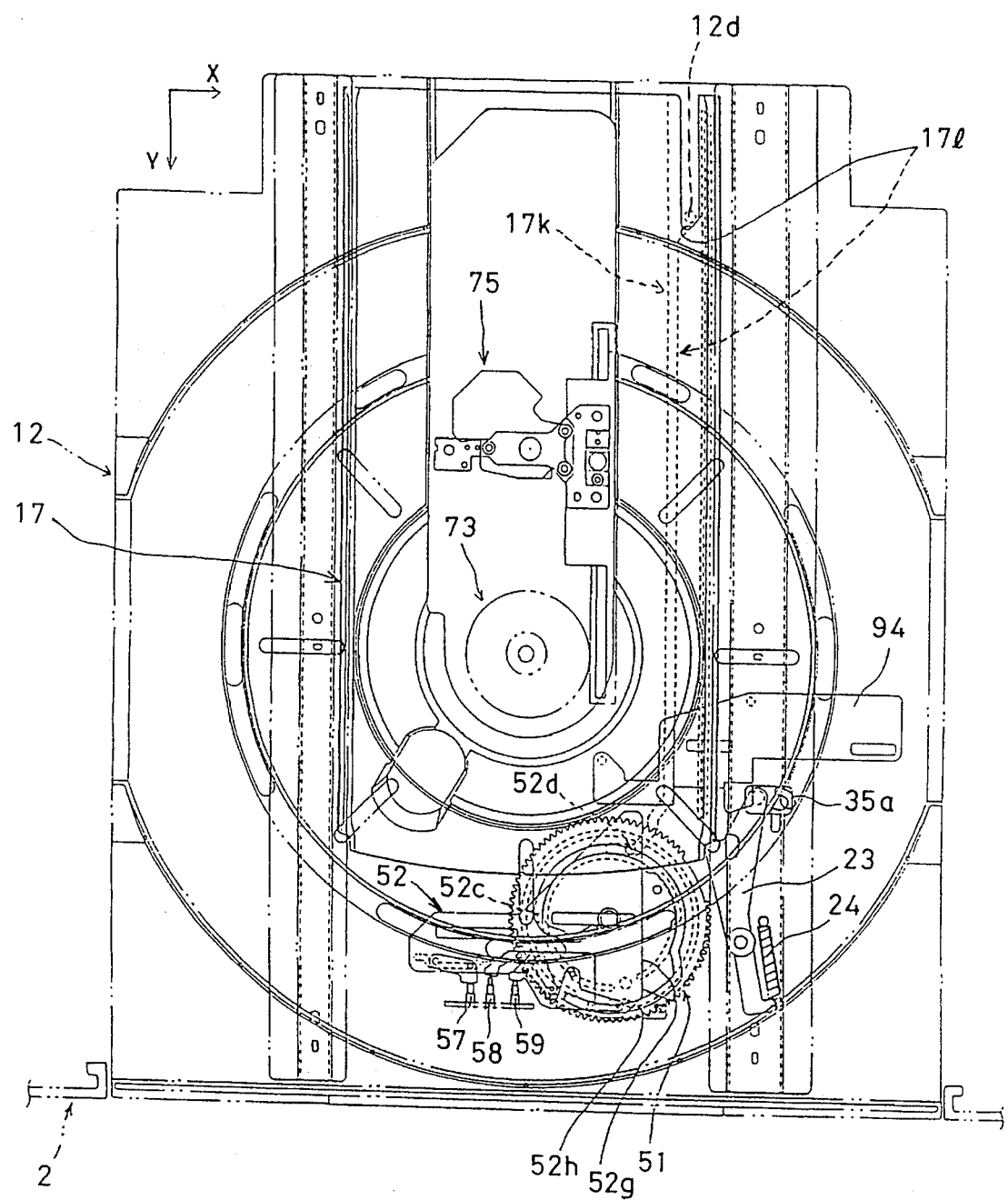

As the gear wheels 31 and 32 rotate, the second tray 17 together with the first tray 12 is moved backward, to be contained within the player housing 2 as illustrated in FIG. 49. The LD mounted on the first tray 12 (not shown in FIG. 49) will then reach a position directly above the spindle motor 73.

Immediately before the trays 12 and 17 reach the completely housed position described above, the pin 52d provided to protrude on the upper surface of the cam plate 52 (shown in FIGS. 22 through 24) will be relatively moved from the first straight section 17m (shown in FIG. 12) of the cam groove 17k provided on the second tray 17, to the second inclined section 17n, as the second tray 17 is moved by the tray driving force. By this relative movement of the pin 52d, the cam plate is slightly moved in the leftward direction (the direction opposite to arrow X). In addition to the pin 52d, the cam plate 52 is provided with the pin 52c protruding downward to engage with the cam groove A 51a of the cam gear wheel 51. When the cam plate 52 is moved leftward as described above, the cam gear wheel 51 is slightly rotated in the clockwise direction in FIG. 49 by the action of the pin 52c and the cam groove 51a engaged therewith. The cam gear wheel 51 whose tooth less part 51f (shown in FIGS. 19 and 21) has been facing with the small-sized gear portion 31c of the gear wheel 31, comes to mesh with the gear wheel 31 by its gear portion 51e. As a result, the driving force of the motor 41 is applied to the cam gear wheel 51 through the gear wheel 31, so that the cam gear wheel 51 is rotated. By the action of the cam groove A 51a formed on the cam gear wheel 51 and the pin 52c of the cam plate 52 engaged therewith, the cam plate 52 is further moved in the leftward direction (the direction opposite to arrow X). As a result of this movement, the other pin 52d provided on the cam plate 52 is relatively moved from the second inclined section 17n of the cam groove 17k (shown in FIG. 12) of the second tray 17, to the third inclined section 17p and to the third straight section 17q successively. By the relative movement of the pin 52d to the third inclined section 17p, the second tray 17 is moved backward, and secured on the base member 35 by the movement of the pin 52d into the third straight section 17q. Furthermore, when the cam plate 52 is moved as described above, the switch lever 63 is actuated by the function of the cam groove 52f formed on the cam plate 52, so that the sensing switch 57 is operated.

Figure 50:
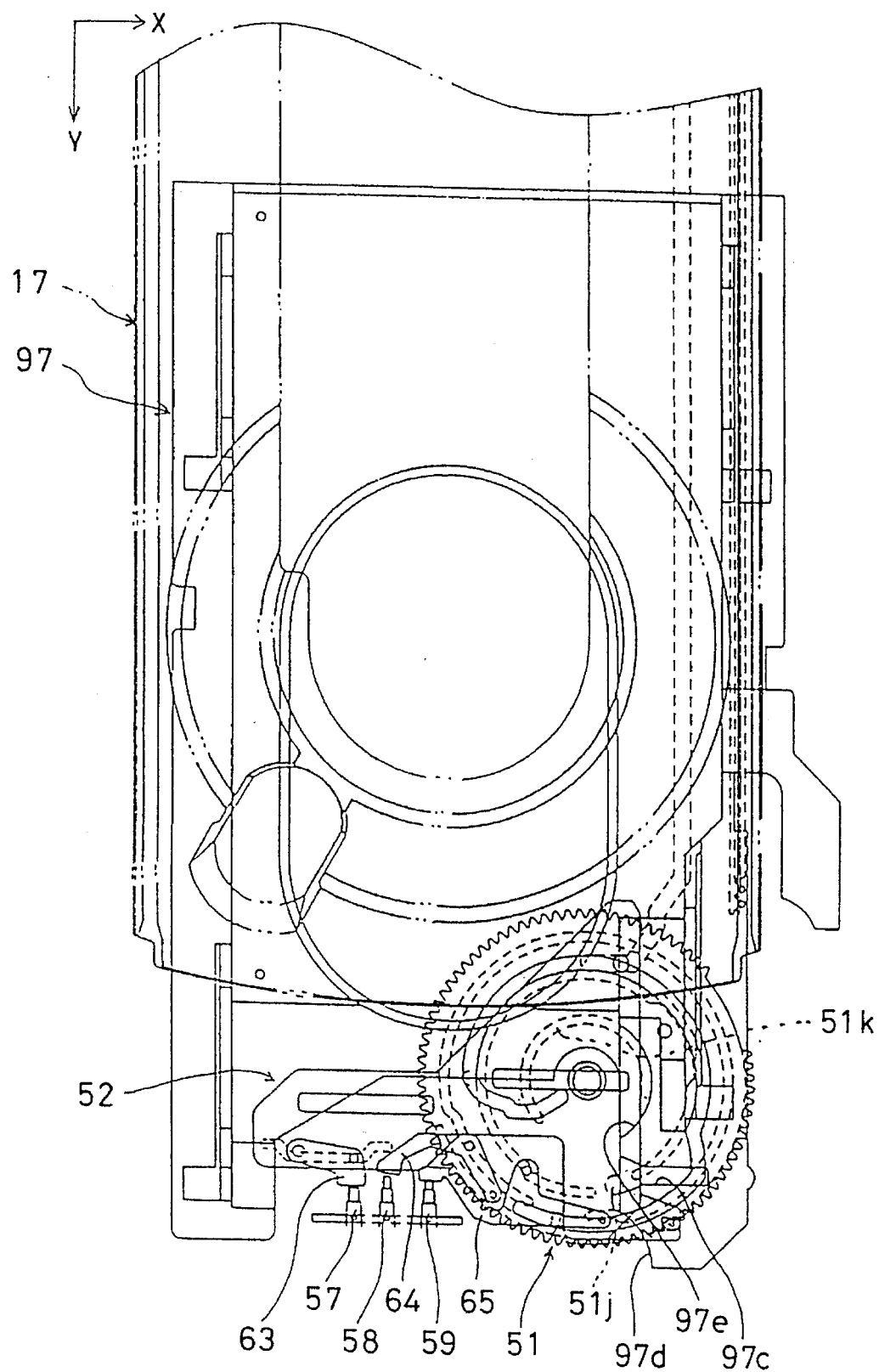
Figure 51:
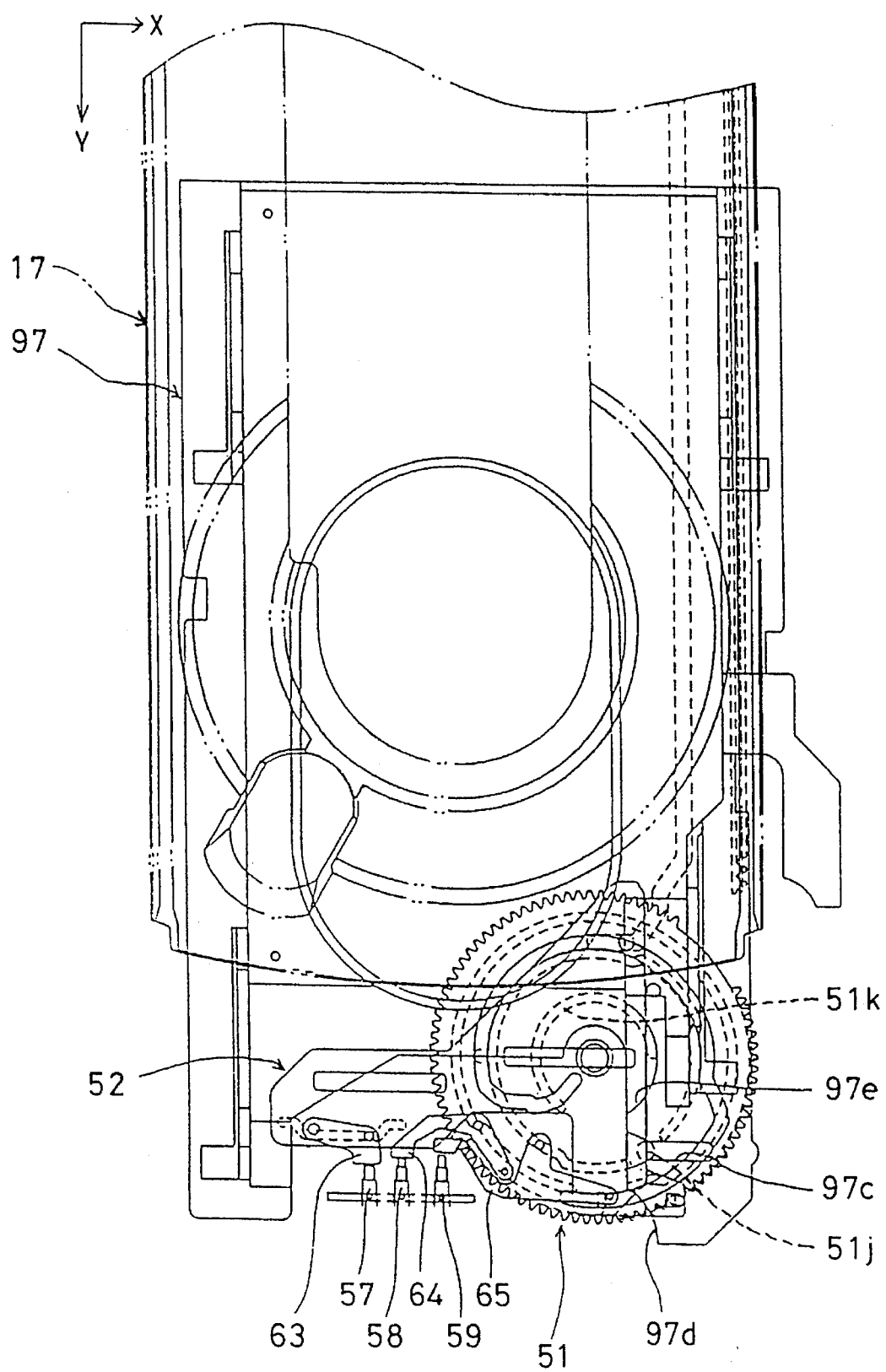
Figure 52:
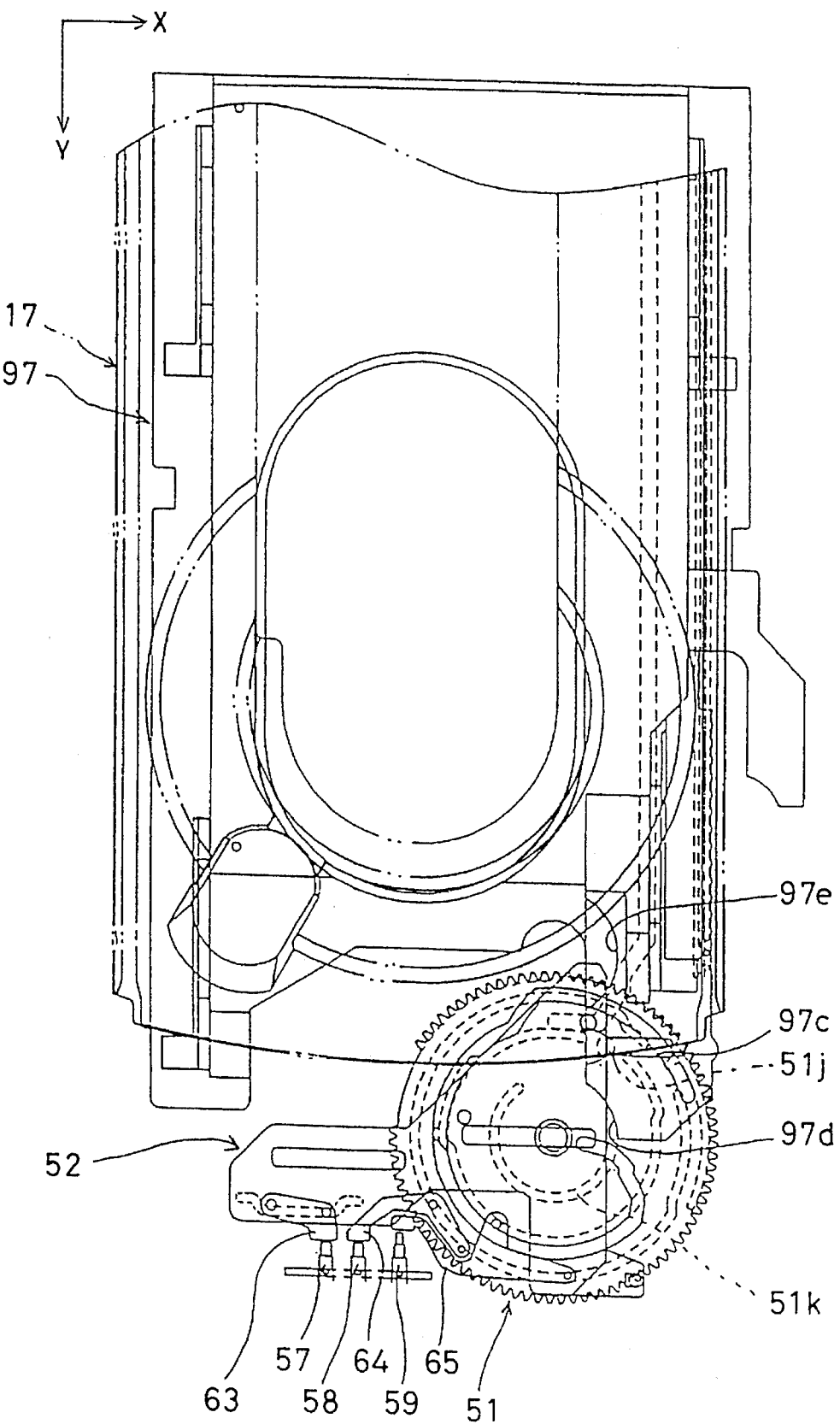
Figure 53:
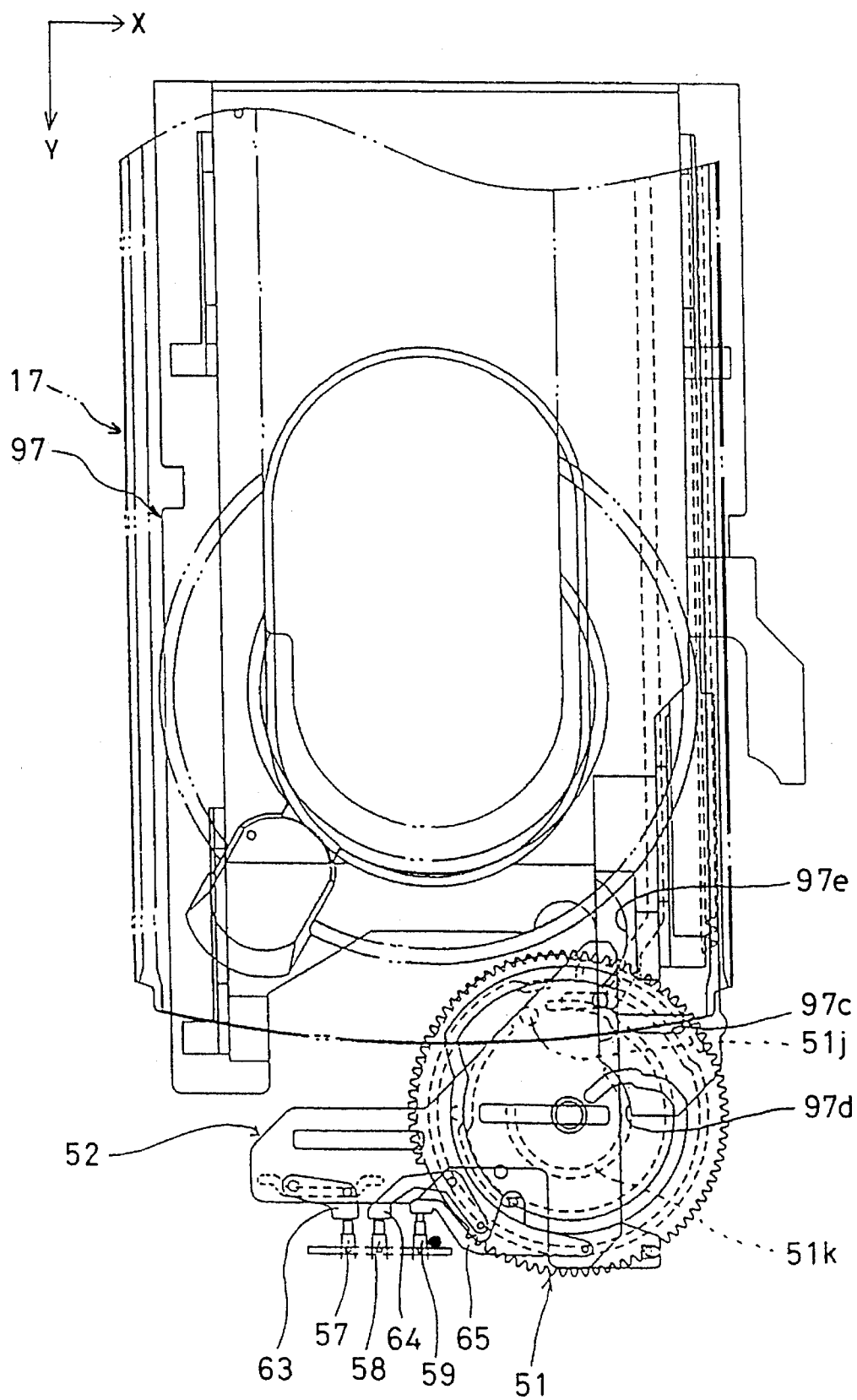
Figure 54:
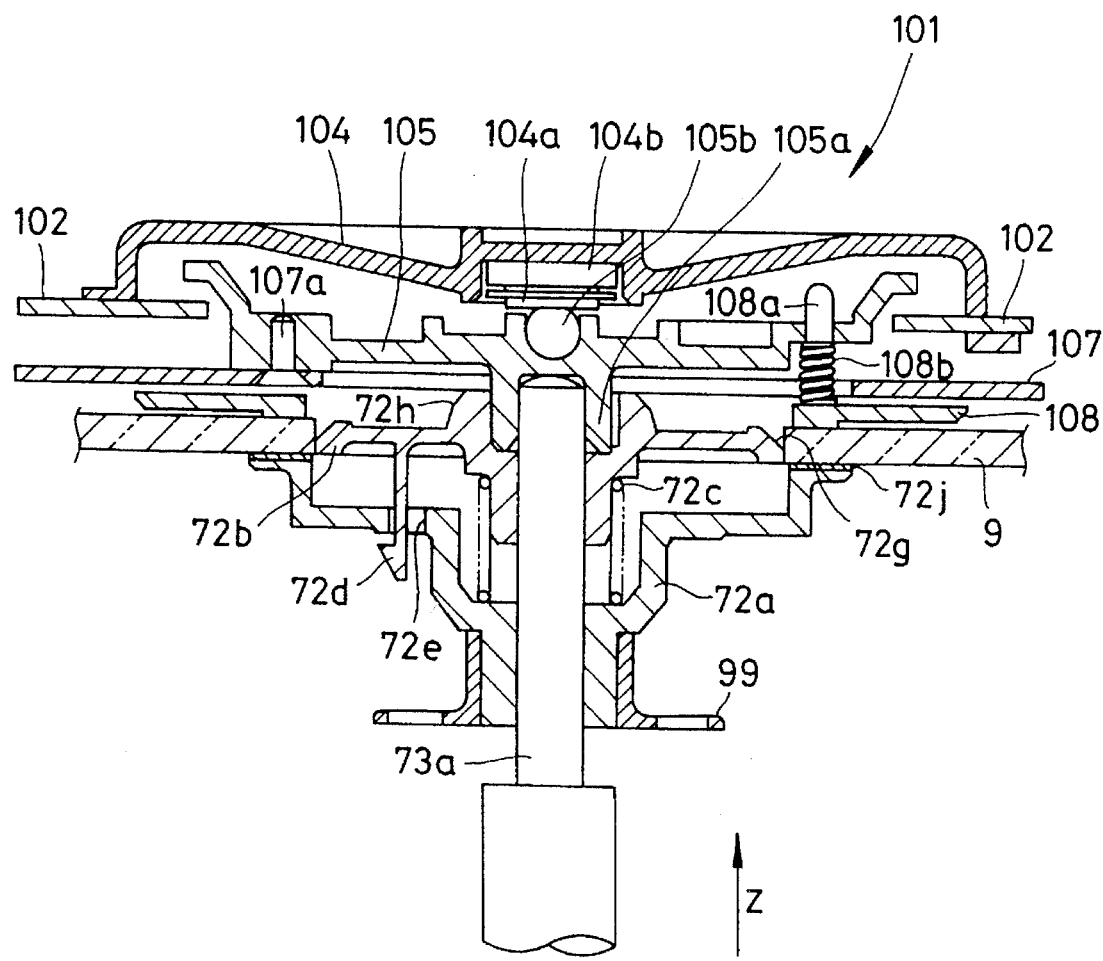
Figure 55:
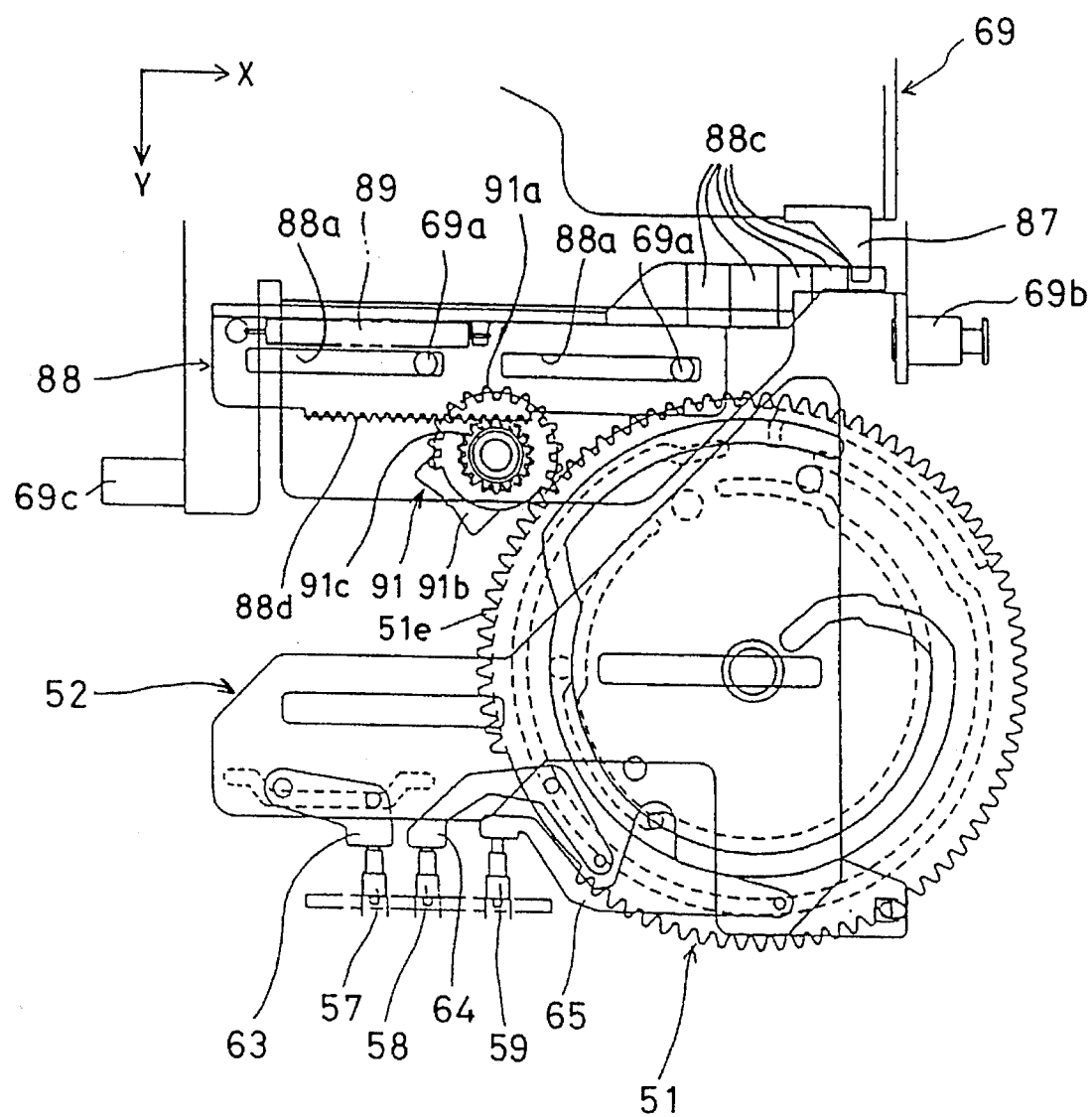

As described above, by the rotation of the cam gear wheel 51, the semicircular projection 51k formed at the central part of the under face of the cam gear wheel 51 comes off from the semicircular gain 97d of the moving member 97 which controls the clamping operation, so that the moving member 97 is released from a fixed state at the most retroceded position (the limit position of the frontward movement) with respect to the base member 35, as illustrated in FIGS. 50 through 52. In synchronism with this movement, the pin 51j provided on the cam gear wheel 51 enters into the groove 97c of the moving member 97, to move the latter member in the backward direction, also as illustrated in FIG. 52. Afterwards, the pin 51j of the cam gear wheel 51 comes off from the groove 97c as illustrated in FIG. 53. In this position, the semicircular protrusion 51k of the cam gear wheel 51 is engaged in the semicircular gain 97d of the moving member 97, so that the latter member is securely held with respect to the base member 35 at the most proceeded position (the limit position of the backward movement) thereof. By the backward movement of the moving member 97 caused by the above-described series of operations, the pins 69b and 69c which are slidably in contact with the oblique cam grooves 97b provided on both sides of the moving member 97 are all moved upward, so that the playing means supporting part 67, to which the pins 69b and 69c are fixed, is moved upwardly. As a result of this movement, the spindle motor 73 and pickup 75 mounted on the playing means carrying part are also moved to access the LD 9 supported on the first tray 12. By the access of the spindle motor 73, the LD 9 is moved away from the tray 12 while it is raised by the turntable 72 connected to the spindle motor 73. As shown in FIG. 54, the disc clamping operation by the disc clamping mechanism standing-by in the above position is performed as a result of this upward movement. The completion of the disc clamping operation is detected by turn on of the sensing switch 59.

After the disc clamping operation is completed in the manner described above, the cam gear wheel 51 is further rotated, so that the following tilting operation will be performed.

Figure 56:
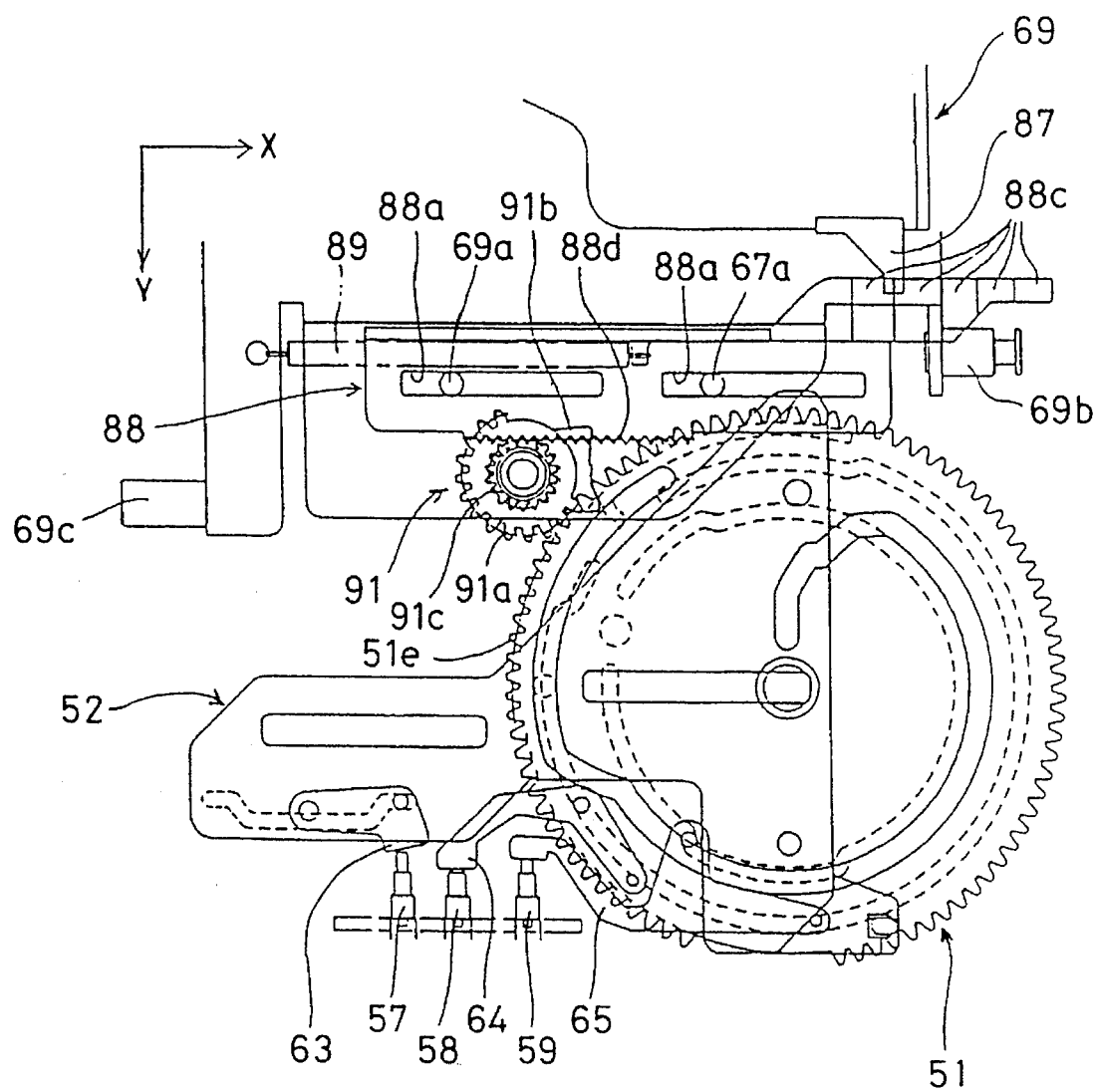
Figure 57:
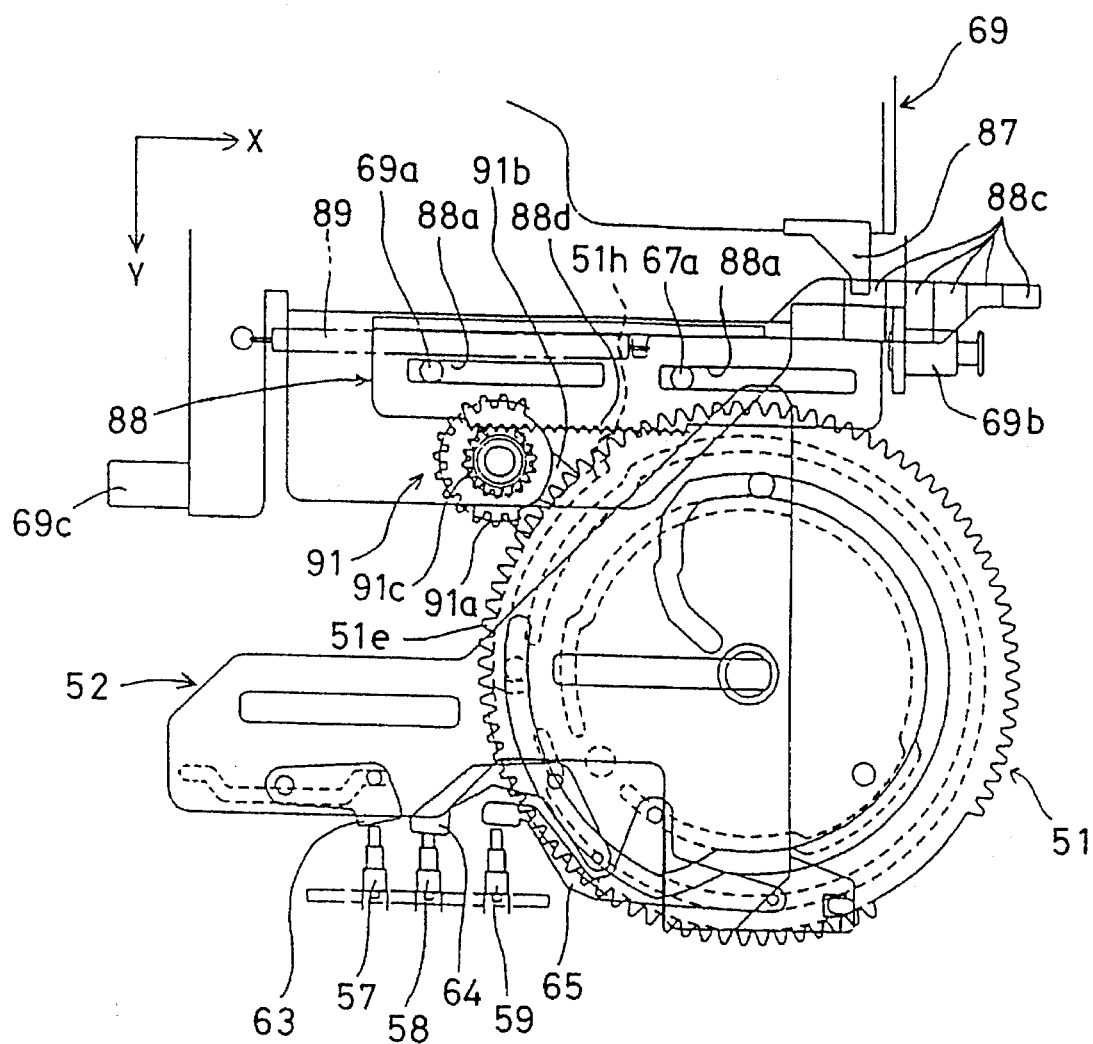

Specifically, by the elevation of the playing means carrying part 67 in the manner described above, the large-sized gear portion 91a of the tilt gear wheel 91 mounted on the motor base 69, provided as a structural element of the playing means carrying part, comes to be meshed with the gear portion 51e of the cam gear wheel 51. Since the rotation of the cam gear wheel is continued while maintaining this state, the tilt gear wheel is rotated in the clockwise direction as illustrated in FIGS. 56 and 57. Therefore, the tilt cam 88 engaged with the small gear portion 91c of the tile gear wheel 91 at the toothed rack portion 88d is moved in the rightward direction. As shown in the figures, the tilt cam 88 has the cam surface 88c, and slidably in contact with the cam follower 87 provided in the front end of the motor base described above, at its cam surface 88c. By the rightward movement of the tilt cam 88, the cam surface 88c functions to raise the cam follower 87 upwardly. By this movement, the motor base 69 is swingingly moved so that the tilting operation is performed. As shown in FIG. 57, when the tilt gear wheel 91 is rotated by a predetermined angle, its cam follower 91b portion comes to be slidably in contact with the cam groove 51h of the cam gear 51, so that its further rotation is prevented. This completion of the tilting operation is confirmed by turning-off of the sensing switch 59 shown in the figure.

After the above operations, the player is ready to play the disc, and the LD is rotated by the spindle motor 73, and the pickup 75 starts its operation to play the LD. It is needless to say that the protruding and withdrawing movements of the trays are performed when the playing means described above is in its lowered position.

Now, explanation will be made on the latching operation of the first and second trays 12 and 17 when the trays being locked to each other are protruded outside the player housing 2 as illustrated in FIGS. 4 and 9 for the above-mentioned playing of LD.

Before the protrusion of each tray, as the CD play mode is not set, the pickup 75 is moved to the LD discrimination position (shown in FIG. 47) as illustrated in FIG. 16. As is clear from this figure, the front extended portion 78a of the toothed rack 78 attached to the pickup 75 is placed, as a result of the above movement, at a position in which it will not engage with the pin 94c of the latch plate 94. In this state, the latch lever 23 for latching the first and second trays 12 and 17 to each other, urged by the coil spring 24, pushes the latch plate 94 in the leftward direction (the direction opposite to arrow X), to be placed at the latching position e.g. a position for the mutual latching of the first and second trays, as indicated by the two-dot chain line in FIG. 6. Therefore, the trays being locked to each other are protruded outwardly from the player housing 2, as illustrated in FIGS. 4 and 49, by the rotation of the gear wheels 31 and 32 caused by the torque of the motor 41.

The operation for protruding only the second tray 17 outside the player housing 2 will be described in the following.

Figure 58:
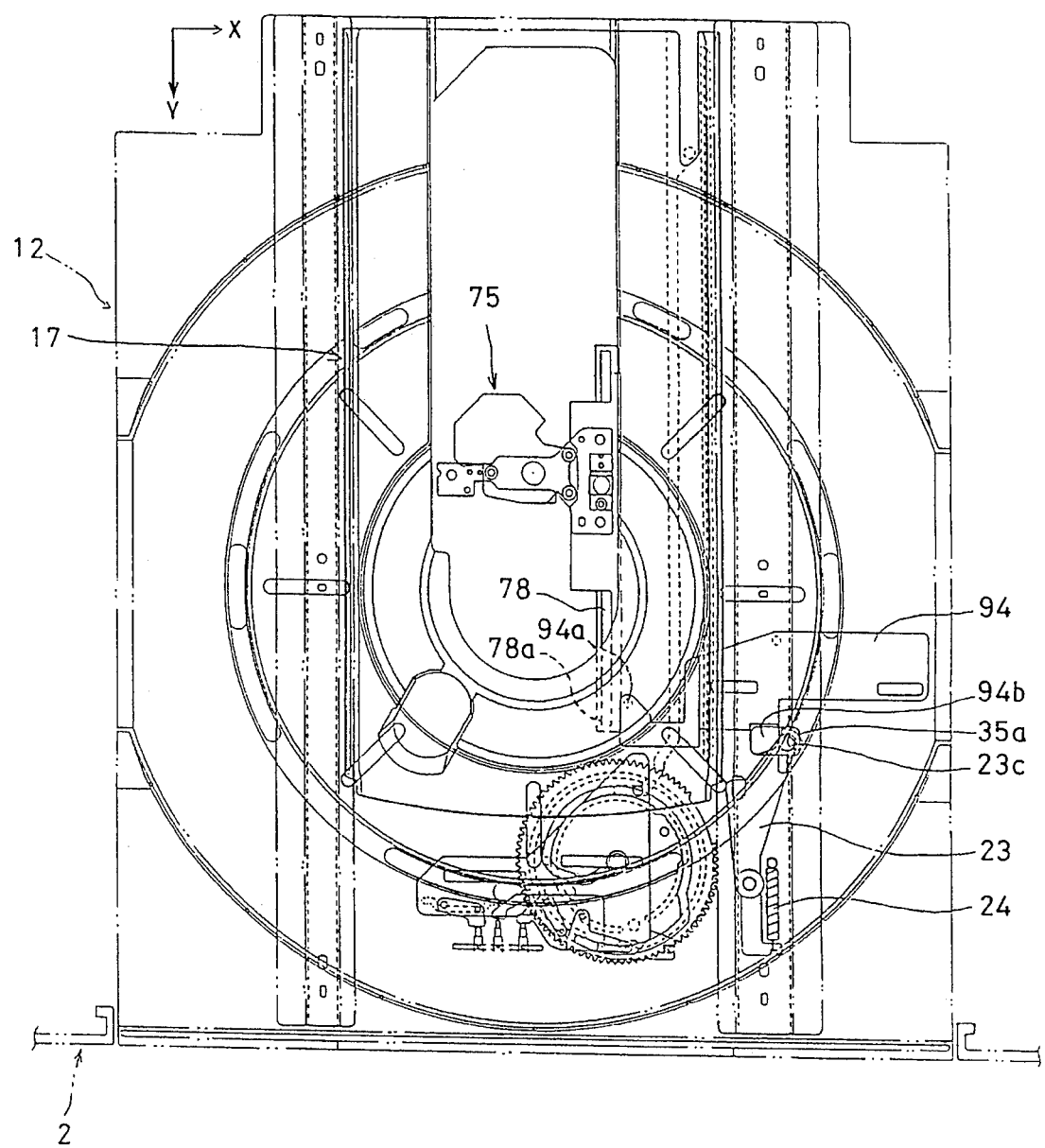
Figure 59:
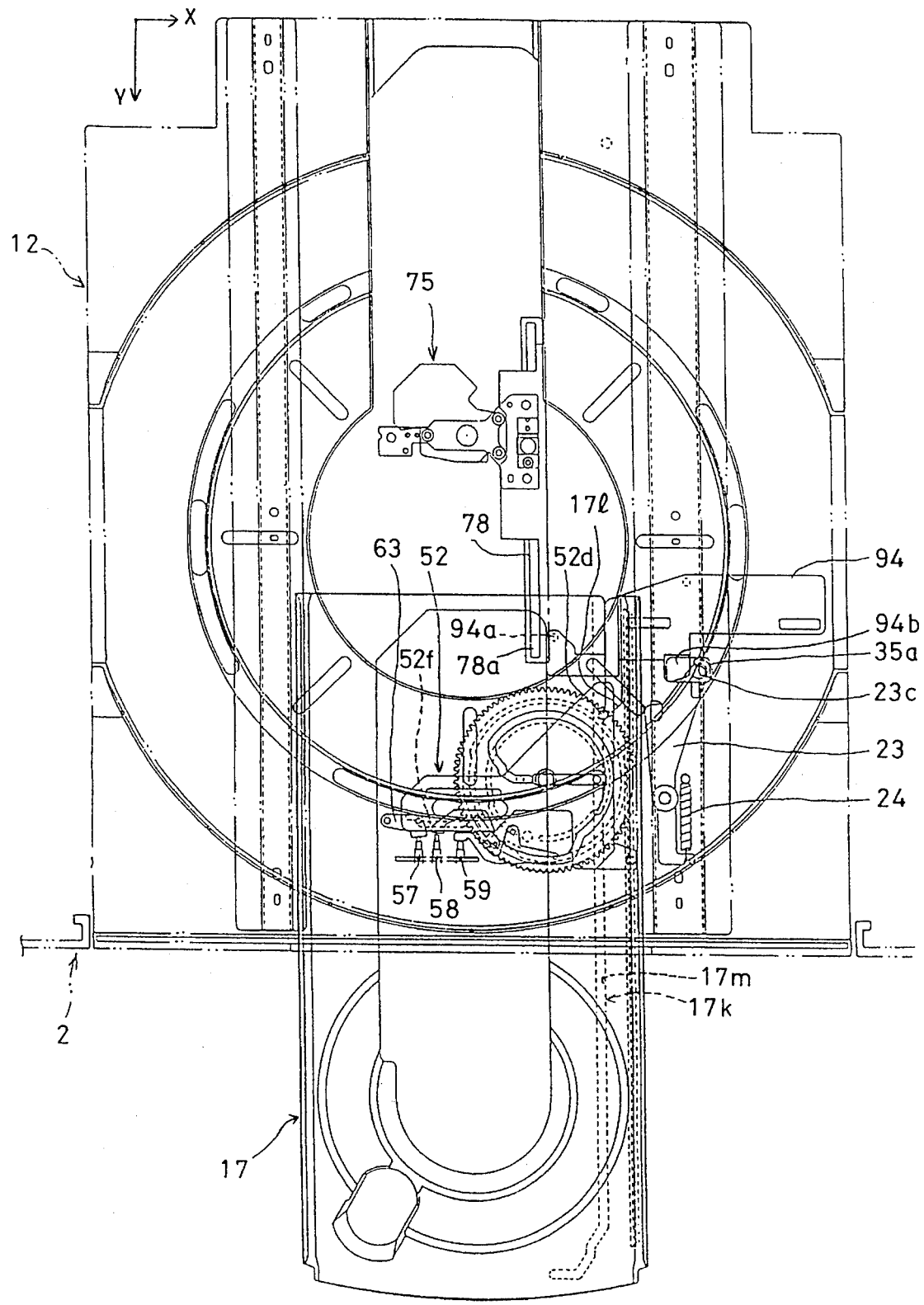

By the setting of the CD play mode, the pickup 75 is moved to the CD play start position (shown in FIG. 47), as illustrated in FIG. 58. As a result, the front extended portion 78a of the toothed rack 78 attached to the pickup 75 comes to contact with the pin 94c of the latch plate 94, so that the movement of the latch plate 94 in the leftward direction (the direction opposite to arrow X) is prevented, as shown in FIG. 58. In this state, the latch lever 23 for the mutual latching of the first and second trays 12 and 17 is held in the state in which the pin 23c provided at its rear end is sandwiched between the latch projection 94b of the latch plate 94 and the hooked projection 35a formed on the base member 35 (shown in FIG. 13). This means that the latch lever 23 is held at a non-latching position (shown by the solid line in FIG. 6) for releasing the first and second trays 12 and 17, so that the trays are separately movable with respect to each other. In this state, when the motor 41 (shown in FIG. 16) rotates to drive the gear wheels 31 and 32, the second tray 17 only is protruded from the player housing 2 as illustrated in FIG. 59.

In the play ready state in which the playing means including the pickup 75 is in access with the disc, the moving member 97 is located at the most proceeded position (the limit position of the backward movement) as shown in FIG. 16, and restricts the leftward movement of the latch plate 94 by the latching of its cam surface 97h to the pin 94b of the latch plate 94. By this feature, the latch plate 94 is prevented from contacting with the toothed rack portion 87 while the disc is being played, to ensure a smooth operation of the pickup 75.

In the structure described above, the action of the latch lever 23 is restricted by creating an engaged state between the toothed rack 78 of the pickup 75 and the latch lever 23 via the latch plate 94. However, it is also possible to employ a structure that an additional driving means such as a solenoid plunger is provided to restrict the action of the latch lever 23. In the case of the explained structure, cost reduction is attained since the toothed rack 78 of the pickup 75 is utilized to restrict the action of the latch lever 23, thereby eliminating the necessity of any additional driving means.

The completion of the protrusion of the second tray 17 having been described above is confirmed by turn off of the sensing switch 57 for generating the tray position signal when sensing the completion of the protrusion of the first and second trays 12 and 17 for the transportation of a LD in the aforesaid manner. To discriminate these different situations, the timing of operation of the switch 57 is made different between the case where only the second tray 17 is protruded, and the case where both of the first and second trays 12 and 17 are protruded. By this feature, discrimination between the different protruding operations is enabled. In the following, operations causing the difference in timing of the switch operation will be described.

The case where only the second tray 17 is protruded outside the player housing 2 will be described at first.

As shown in FIG. 59, slightly before the completion of the protrusion of the second tray 17, the pin 52d protruding from the cam plate 52 moves from the first straight section 17m of the cam groove 17k provided on the second tray 17 to the first inclined section 17l thereof, to turn off the sensing switch 57. More specifically, by the change of the relative position of the pin 52d, the cam plate 52 urged by the coil spring 54 is translated sideways in the rightward direction (in the direction of arrow X) as illustrated in FIG. 22, so that switch lever 63 is swingingly moved by the cam groove 52f formed on the cam plate 52, thereby the operating element of the sensing switch 57 returns to the released position.

Then, the case where both of the first and second trays are protruded will be explained.

Operations in this case will be understood when viewing FIGS. 48 and 49, which have been used for the explanation of the withdrawal movement of the trays, by supposing that the figures show a state in the protruding operation being performed in the reverse order. As shown in FIGS. 48 and 49, the pin 12d is provided on the under face of the right-rear end portion of the first tray 12. This position of the pin 12d results in the delay of turn off of the switch 57 as compared with the above-described case of the protrusion of the second tray 17 only. More specifically, when the first and second trays 12 and 17 are locked to each other, the pin 12d is located near to the first inclined section 17l of the cam groove 17k of the second tray 17. Therefore, when the trays are protruded by a certain distance so that the first inclined section 17l approaches to a position where the section 17l can slidably contact with the pin 52d of the cam plate 52, the latter pin 52d comes to abut with the pin 12d. Therefore, the movement of the cam plate 52 urged by the coil spring 54 (shown in FIG. 22) in the rightward direction (the direction of arrow X) is restricted in this state. The position of the second tray 17 in this state is near to the position shown in FIG. 59 at which the protrusion is completed. Afterwards, the protruding movement of the trays is further continued so that the pin 12d moves along the linear cam surface 52g of the cam plate 52 while being slidably in contact with the latter cam surface 52g. This period of movement causes the delay in timing of the operation of the sensing switch 57. When the pin 12 reaches the oblique cam surface 52h of the cam plate 12 as shown in FIG. 49, the cam plate 52 moves in the rightward direction (the direction of arrow X) by the action of the oblique cam surface 52h and the resilient force of the coil spring 54 (shown in FIG. 22). As a result, the cam groove 52f of the cam plate 52 causes a swinging movement of the switch lever 63, to turn off the sensing switch 57.

With the above-described configuration, the positions of the first and second trays, especially the state that the trays are protruded completely, are detected by the action of the single sensing switch 57.

As specifically described in the foregoing, the compatible player according to the present invention is constructed to apply driving force only to the second tray, of which the latching state between the first and second trays by the latching means are canceled, so that it is protruded or withdrawn from or into the player housing when transporting the second type disc of the smaller diameter. When, on the other hand, when the first type disc of the larger diameter is to be transported, the first and second trays are locked to each other so that both of the trays are moved together to be protruded or withdrawn with respect to the player housing. Thus, the transportation of the disc is performed most appropriately for either of the large and small discs. This means that the player according to the present invention gives an impression of smart operation.

Furthermore, the compatible disc player according to the present invention is constructed to perform the above described operations by applying the driving force only to the second tray for transporting the second type disc, and by switching between the state of mutual latching of the first and second trays and the released state by means of the latch mechanism, the structure of driving means for the transportation of several types of discs is simplified. Thus, reduction in cost is attained by the use of the simple internal construction.

Moreover, since the compatible player according to the present invention has a configuration that the second tray for transporting the second type disc is disposed in the central portion of the first tray for transporting the first type disc, the single spindle motor and pickup are commonly used for the playing of all types of discs, so that a further simplification of the internal structure is accomplished.

In addition, in the compatible disc player according to the present invention, the position sensing means for sensing the position of the first and second trays is made up of a single switch for generating the tray position signal, an operating element for turning on and off the switch, and a transmission mechanism for transmitting the movement of the first and second trays to the operating element, wherein the transmission mechanism is configured to create a difference in timing of transmission in the case of movement of the second tray alone as compared with the movement of the first tray. With this provision, the detection of the position of the two trays, the completely protruded position for example, can be sensed by the single sensing switch. Also by this arrangement, the reduction in cost is accomplished in connection with the simplification of the internal structure. Although the operating element and the transmission mechanism mentioned above are provided as independent parts, it is also possible adopt an arrangement in which the functions of these parts are also performed by other parts provided for other functions of the player. When such an arrangement is adopted, increase in number of parts can be further prevented.

Furthermore, in the compatible disc player according to the present invention, a pickup position control means is provided for hoding the pickup to stand-by at a position appropriate for each of the first and second discs, depending on the playing mode selected in relation to the first and second discs, and the operation of the latch mechanism is restriced by an engagement with the pickup. In other words, switching operation between the mutual latching and the releasing of the first and second trays by the latch mechanism is performed by the stand-by position of the pickup. With this structure, no additional driving means, such as a solenoid plunger, for operating the latch mechanism is required. Therefore, control is performed mechanically by the engagement and disengagement of the pickup with the latch mechanism, so that generation of an additional load to the control circuit for such a control is avoided. By this measure, the simplification of the player's intenal structure is attained, and the reduction in cost is accomplished.

What is claimed is:

1. A compatible disc player comprising:

a disc transporting mechanism for transporting a first disc of a larger diameter or a second disc of a smaller diameter to be played, between a playing position and a loading-unloading position respectively inside and outside a player housing; and a command means for commanding, in response to a manual operation, setting and canceling respectively of playing modes for said first and second discs, wherein said disc transporting mechanism comprises:

a first tray, capable of protruding and withdrawing from and into said player housing and capable of carrying said first disc, a second tray mounted at a center position of said first tray, in such a manner as to be movable in directions of movement of said first tray, capable of protruding from said player housing independently of said first tray, and capable of carrying said second disc, a latch mechanism for latching said first and second trays to each other and for releasing said first and second trays from each other, a drive means for driving said second tray, wherein said compatible disc player further comprises a pickup position control means for positioning a pickup at one of play start positions of said first and second discs and for holding said pickup to stand by at the play start position, and wherein operation of said latch mechanism is restricted by an engagement between said pickup and said latch mechanism.

2. A compatible disc player as claimed in claim 1, wherein said pickup is arranged, when positioned at a play start position corresponding to the playing mode of said second disc, to engage with said latch mechanism so as to restrict said latching operation of said latch mechanism.

3. A compatible disc player comprising:

a disc transporting mechanism for transporting a first disc of a larger diameter or a second disc of a smaller diameter to be played, between a playing position and a loading-unloading position respectively inside and outside a player housing; and a command means for commanding, in response to a manual operation, setting and canceling respectively of playing modes for said first and second discs, wherein said disc transporting mechanism comprises:

(a) a first tray, capable of protruding and withdrawing from and into said player housing and capable of carrying said first disc, (b) a second tray mounted at a center position Of said first tray, in such a manner as to be movable separate from said first tray in directions of parallel movement relative to a path of movement of said first tray, capable of protruding from said player housing independently of said first tray, and capable of carrying said second disc, the length of said second tray in the direction of its movement being shorter than the length of said first tray in the direction of its movement, (c) a latch mechanism for latching said first and second trays to each other in a state that disc receiving areas respectively of said first and second trays are concentrically aligned, and for releasing said first and second trays from each other, and (d) a drive means for driving said second tray, wherein said compatible disc player further comprises a control means for operating said latch mechanism to perform latching and releasing operations in response to a setting command and a releasing command by said command means, wherein said drive means comprises a toothed rack portion provided on said second tray along directions of its movement, at least two gear wheels arranged in a direction parallel with said directions of movement of said second tray, to be meshed with said toothed rack portion, and a torque apply means for applying a driving torque to said gear wheels, wherein said at least two gear wheels are driven in the same direction, and a total number of rotations of said at least two gears when displacing said first and second trays for loading a first disc is greater than their total number of rotations when only displacing said second tray for loading a second disc.

* * * * *